(12) United States Patent
Kimura et al.

(10) Patent No.: US 7,787,085 B2
(45) Date of Patent: Aug. 31, 2010

(54) OPTICAL ALIGNMENT METHOD AND LIQUID CRYSTAL DISPLAY ELEMENT

(75) Inventors: Masayuki Kimura, Tokyo (JP); Hiroshi Yokoyama, Tsukuba (JP)

(73) Assignees: JSR Corporation, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 466 days.

(21) Appl. No.: 11/936,905

(22) Filed: Nov. 8, 2007

(65) Prior Publication Data
US 2008/0123046 A1 May 29, 2008

Related U.S. Application Data

(63) Continuation-in-part of application No. 10/400,634, filed on Mar. 28, 2003, now abandoned.

(30) Foreign Application Priority Data

| Mar. 29, 2002 | (JP) | ............................. 2002-093952 |
| Oct. 24, 2002 | (JP) | ............................. 2002-309261 |
| Oct. 25, 2002 | (JP) | ............................. 2002-311733 |

(51) Int. Cl.
*G02F 1/1337* (2006.01)

(52) U.S. Cl. ..................... 349/124; 349/123; 349/134

(58) Field of Classification Search .......... 349/123–130
See application file for complete search history.

(56) References Cited

U.S. PATENT DOCUMENTS

| 5,111,240 | A | * | 5/1992 | Boettiger et al. ............... 355/53 |
| 5,889,571 | A | | 3/1999 | Kim et al. |
| 6,143,380 | A | | 11/2000 | Gibbons et al. |
| 6,191,836 | B1 | | 2/2001 | Woo et al. |
| 6,218,501 | B1 | | 4/2001 | Choi et al. |
| 6,224,788 | B1 | | 5/2001 | Ogawa et al. |

(Continued)

FOREIGN PATENT DOCUMENTS

CN 1450394 A 10/2003

(Continued)

OTHER PUBLICATIONS

M. Kimura, et al., JPN. J. Appl. Phys., vol. 41, No. 12A, XP-002244004, pp. L1345-L1347, "Photo-Rubbing: A General Method to Induce Durable Liquid-Crystal Pretilt Angle on Photo-Alignment Films", Dec. 1, 2002.

*Primary Examiner*—Dung T. Nguyen
(74) *Attorney, Agent, or Firm*—Oblon, Spivak, McClelland, Maier & Neustadt, L.L.P.

(57) ABSTRACT

An optical alignment method which develops a pretilt angle by batch plane exposure without tilting a substrate. This optical alignment method provides liquid crystal aligning capability to the surface of a polymer film by exposing the surface of the polymer film through a slit exposure mask while the surface of the polymer film and the slit exposure mask are moved relative to each other substantially at a fixed rate. Alternatively, liquid crystal aligning capability is provided to the surface of the polymer film by exposing the surface of the polymer film through an optical exposure pattern while the optical exposure pattern having a plurality of lines with a certain width at certain intervals is formed on the surface of the polymer film continuously.

17 Claims, 6 Drawing Sheets

U.S. PATENT DOCUMENTS

| | | |
|---|---|---|
| 6,312,769 B1 | 11/2001 | Hiraoka et al. |
| 6,573,959 B1 * | 6/2003 | Molsen ..................... 349/113 |
| 6,583,835 B1 | 6/2003 | Yoshida et al. |
| 6,809,788 B2 * | 10/2004 | Yamada et al. .............. 349/129 |
| 2001/0050740 A1 | 12/2001 | Goto et al. |
| 2002/0033442 A1 | 3/2002 | Toko et al. |
| 2002/0054965 A1 | 5/2002 | Ogawa |
| 2003/0087045 A1 | 5/2003 | Nakata et al. |
| 2005/0259203 A1 | 11/2005 | Kimura et al. |

FOREIGN PATENT DOCUMENTS

| | | |
|---|---|---|
| EP | 0 744 041 | 11/1999 |
| EP | 1 186 940 | 3/2002 |
| EP | 1353217 A1 | 10/2003 |
| GB | 2 314 170 | 12/1997 |
| JP | 63-291922 | 11/1988 |
| JP | 11-202336 | 7/1999 |
| JP | 2004144964 A | 5/2004 |
| JP | 2004145141 A | 5/2004 |
| JP | 3804934B2 B2 | 8/2006 |
| JP | 2003295188 A | 10/2006 |
| JP | 3844234B2 B2 | 11/2006 |
| JP | 3903177B2 B2 | 4/2007 |
| WO | WO 95/22077 | 8/1995 |
| WO | WO 01/53384 | 7/2001 |

* cited by examiner 7 im　　　7im

OPTICAL ALIGNMENT METHOD AND LIQUID CRYSTAL DISPLAY ELEMENT

FIELD OF THE INVENTION

The present invention relates to an optical alignment method and to a liquid crystal display element formed by the same.

DESCRIPTION OF THE RELATED ART

Liquid crystal display elements are widely used in monitors for notebook personal computers and image display devices for portable telephones and portable information terminals.

The liquid crystal display elements are divided into (1) display type liquid crystal elements in which pixels are turned on and off by optical switching through the selective application of a voltage to liquid crystal molecules on a desired electrode formed in the pixels after a panel having a large number of pixels is constructed by sandwiching a liquid crystal material between glass substrates at least one of which has a transparent electrode formed thereon and (2) display type liquid crystal elements in which desired pixels are turned on and off by selecting an active element after a liquid crystal panel is constructed with a substrate having an active element for selecting an electrode for each pixel and another substrate having a pair of electrodes formed thereon. The former is called "multiplex drive type" and the latter is called "active drive type". To optimize the electro-optic display characteristics of the liquid crystal display elements, liquid crystal molecules must be aligned uniformly on a substrate having an electrode.

To align the liquid crystals of an alignment film, "rubbing" and light exposure are used. The alignment of liquid crystals by rubbing is carried out by rubbing the surface of an alignment film formed on a substrate with cotton, rayon or nylon and is widely used for the production of a liquid crystal display element. However, since the surface of an alignment film is directly rubbed with cloth, the alignment film is chipped or static electricity is generated by rubbing.

When the alignment film is chipped, dust is produced or the surface of the alignment film is scratched, thereby causing the marked deterioration of display quality when the above multiplex drive type liquid crystal display element is turned on. In the active drive type liquid crystal display element, the generation of static electricity leads to the destruction of a TFT element as an active element. In either case, rubbing causes reductions in the contrast and productivity of the liquid crystal display element.

Meanwhile, since the alignment of liquid crystals by light exposure can be carried out without contacting the surface of an alignment film unlike rubbing, the production of dust and the generations of abrasion and static electricity are prevented. In this method, the alignment film formed on a substrate is exposed to polarized light from a desired direction to provide the alignment controllability of liquid crystals in the polarization direction.

As means of developing a pretilt angle in the above optical alignment method, an oblique exposure method in which the surface of a substrate having an optical alignment layer formed thereon is exposed to ultraviolet radiation obliquely has been considered as effective. For oblique exposure, the surface of an optical alignment film must be exposed to light by setting the irradiation angle to any angle from 1 to 90°. To develop a pretilt angle by oblique exposure, a substrate having an optical alignment layer formed thereon must be inclined from a horizontal direction to 90° with respect to ultraviolet radiation from the normal direction (see FIG. 1), or a beam of light must be inclined from the horizontal plane to the normal direction with respect to a substrate placed horizontally for exposure (see FIG. 2). In general, the former method is widely employed. In FIGS. 1 and 2, reference numeral 8 denotes a filter, 9 denotes a polarizer and other numerals denote the same elements as in FIG. 3.

However, this oblique exposure involves the following problems.

(1) An error in the setting of the angle of the substrate causes a great variation in pretilt angle.

(2) Since the substrate is inclined, irradiation energy varies within the plane, which causes a variation in pretilt angle within the plane.

(3) In the case of oblique exposure, the pretilt angle is changed by the complicated secondary influences of light first applied to the optical alignment layer and reflected light produced while the above light passes through the layer.

(4) When the method of FIG. 1 is used with an oblique exposure device and, for example, a 1 m×1 m glass substrate is inclined at 45° from the horizontal direction, the height of the glass storage section of the exposure device must be 50 cm or more, thereby greatly increasing the size of the device.

(5) When the method of FIG. 2 is used with an oblique exposure device, it is very difficult in the design of the exposure device to change the irradiation angle arbitrarily while a 1 m×1 m exposure area is ensured. That is, the structure of the exposure device becomes complex by making variable the irradiation angle of ultraviolet radiation in the exposure device due to the control of the optical axis of an optical element and the like.

(6) It is difficult to develop a pretilt angle large enough to be used in a homeotropic alignment mode.

SUMMARY OF THE INVENTION

It is an object of the present invention to provide a novel optical alignment method which can solve the above problems.

It is another object of the present invention to provide an optical alignment method which eliminates the need for the inclination of a substrate in the method of developing a pretilt angle in the optical alignment method and develops a pretilt angle by batch plane exposure.

It is still another object of the present invention to provide an optical alignment method which eliminates the need for the inclination of a substrate in the method of developing a pretilt angle in the optical alignment method and develops a pretilt angle large enough to be used in a homeotropic alignment mode by batch plane exposure.

It is a further object of the present invention to provide a liquid crystal display element having a liquid crystal alignment film formed by the optical alignment method of the present invention.

Other objects and advantages of the present invention will become apparent from the following description.

According to the present invention, firstly, the above objects and advantages of the present invention are attained by an optical alignment method comprising providing liquid crystal aligning capability to the surface of a polymer film by exposing the surface of the polymer film to radiation with an irradiation intensity distribution while the surface of the polymer film and radiation are moved relative to each other substantially at a fixed speed (to be referred to as "first optical alignment method" hereinafter).

According to the present invention, secondly, the above objects and advantages of the present invention are attained by an optical alignment method comprising providing liquid crystal aligning capability to the surface of a polymer film by exposing the surface of the polymer film to radiation through an optical exposure pattern while the optical exposure pattern having a plurality of lines with a certain width at certain intervals is formed on the surface of the polymer film continuously in such a manner that the lines form around a certain virtual base point on the surface of the polymer film, expand concentrically toward the periphery and disappear at the periphery, or that they start from the periphery away from the virtual point, converge concentrically on the virtual base point and disappear at the virtual base point (to be referred to as "second optical alignment method" hereinafter).

According to the present invention, thirdly, the above objects and advantages of the present invention are attained by an optical alignment method comprising providing liquid crystal aligning capability to the surface of a polymer film by exposing the surface of the polymer film to radiation through an optical exposure pattern while the optical exposure pattern having a plurality of lines with a certain width at certain intervals is formed on the surface of the polymer film continuously in such a manner that two areas sandwiching a certain virtual base line on the surface of the polymer film differ from each other in at least one of the pattern and the moving direction of the pattern, wherein the lines of the optical exposure pattern are formed in the two areas of the surface of the polymer film continuously in such a manner that they start from the respective areas, move to cover the respective areas and disappear in the respective areas.

(to be referred to as "third optical alignment method" hereinafter).

According to the present invention, in the fourth place, the above objects and advantages of the present invention are attained by a liquid crystal display element having a liquid crystal alignment film formed by the above optical alignment method of the present invention.

Other objects and advantages of the present invention will become apparent from the following description.

DETAILED DESCRIPTION OF THE PREFERRED EMBODIMENTS

Figure 1:
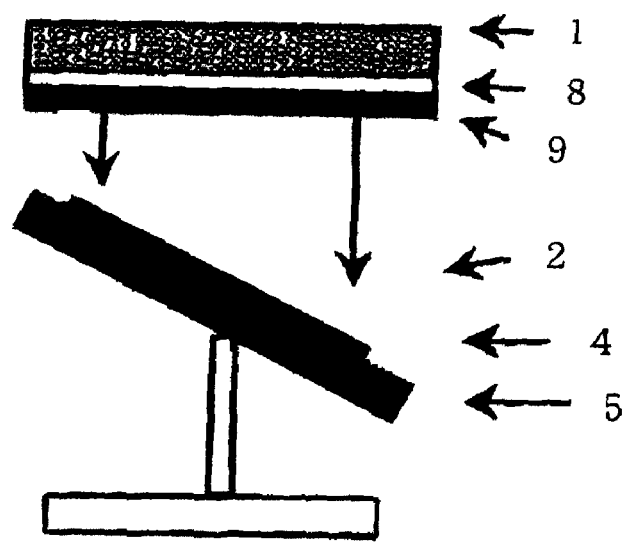
FIG. 1 is a schematic diagram (side view) for explaining the optical alignment method of the related art.
Figure 2:
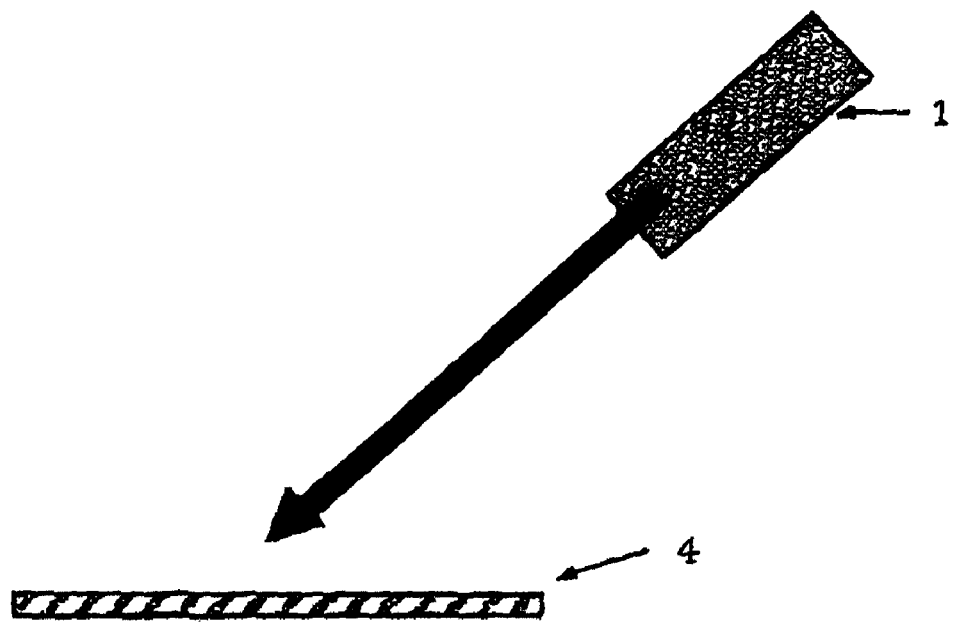
FIG. 2 is a schematic diagram (side view) for explaining another optical alignment method of the related art.

The polymer (may be referred to as "specific polymer" hereinafter) used to form a liquid crystal alignment film in the present invention is not limited to a particular kind but preferably has a structure excited by light such as a structure which can be crosslinked by light or decomposed by light. Out of these, a polymer having a structure which can be crosslinked by light is preferred.

The skeleton of the polymer used in the present invention is not particularly limited. Examples of the polymer include polyamic acid, polyamic acid ester, polyimide, polymaleimide, polystyrene, maleimide/styrene copolymer, polyester, polyamide, poly(meth)acrylate, polysiloxane and copolymers thereof. Polyamic acid, polyamic acid ester, polyimide, polystyrene and maleimide/styrene copolymer are preferred because they have excellent thermal resistance and electric properties. These polymers preferably have a glass transition temperature lower than 200° C. because polymer molecules can be easily made mobile without a risk of thermal deterioration.

The polymer used in the present invention is preferably a polymer having (A) a structure which can be crosslinked by light (to be referred to as "structure (A)" hereinafter) and/or (B) at least one group selected from the group consisting of a fluorine-containing organic group, alkyl group having 10 to 30 carbon atoms and alicyclic organic group having 10 to 30 carbon atoms (to be referred to as "structure (B)" hereinafter).

As for the proportion of the structure (A) to the structure (B) in the specific polymer, the recurring unit having the structure (A) accounts for preferably 10 to 95%, more preferably 50 to 90% of the total of all the recurring units and the recurring unit having the structure (B) accounts for preferably 5 to 50%, more preferably 10 to 25% of the total of all the recurring units.

The specific polymer may further have (C) a structure which is crosslinked by heat (may be referred to as "structure (C)" hereinafter). The structure (C) is an epoxy structure or the like.

Structure (A)

The structure (A) is not particularly limited if it is an optically crosslinkable structure. It is preferably at least one conjugated enone structure selected from the group consisting of structures represented by the following formulas (I), (II), (III), (IV) and (V).

$$—P^1—CR^1\!=\!CR^2—CO\text{-}Q^1- \quad \text{(I)}$$

$$P^2—CR^3\!=\!CR^4—CO\text{-}Q^2- \quad \text{(II)}$$

$$P^3—CR^5\!=\!CR^6—CO\text{-}Q^3- \quad \text{(III)}$$

$$—P^4—CR^7\!=\!CR^8—CO\text{-}Q^4 \quad \text{(IV)}$$

$$—P^5—CR^9\!=\!CR^{10}—CO\text{-}Q^5 \quad \text{(V)}$$

In the above formulas, $P^1$, $P^4$, $Q^1$ and $Q^3$ are each a divalent organic group having an aromatic ring, $P^2$, $P^3$, $Q^4$ and $Q^5$ are each a monovalent organic group having an aromatic ring, and $P^5$ and $Q^2$ are a trivalent organic group having an aromatic ring. $R^1$, $R^2$, $R^3$, $R^4$, $R^5$, $R^6$, $R^7$, $R^8$, $R^9$ and $R^{10}$ are each a hydrogen atom or alkyl group.

The organic group having an aromatic ring represented by $P^1$, $P^2$, $P^3$, $P^4$, $P^5$, $Q^1$, $Q^2$, $Q^3$, $Q^4$ and $Q^5$ is preferably an organic group having 6 to 20 carbon atoms.

The organic group may contain a halogen atom. Examples of the organic group represented by $P^2$, $P^3$, $Q^4$ and $Q^5$ include phenyl group, 4-methoxyphenyl group, 4-ethoxyphenyl group, 4-cryanophenyl group, 4-pentylphenyl group, 4-fluorophenyl group, 3,4-difluorophenyl group, 3,4,5-trifluorophenyl group, 4-(trifluoromethyl)phenyl group, 3,5-bis(trifluoromethyl)phenyl group, 4-octylphenyl group, 4-pentylbiphenyl group, 4-octylbiphenyl group, 4-fluorobiphenyl group, 3,4-difluorobiphenyl group, 3,4,5-trifluorobiphenyl group, 4-octyl-1-naphthyl group, 5-pentyl-1-naphthyl group, 6-octyl-2-naphthyl group, 9-anthracenyl group and 10-pentyl-9-anthracenyl group.

Of these, examples of the organic group for a polymer having a large pretilt angle are preferably 4-pentylphenyl group, 4-fluorophenyl group, 3,4-difluorophenyl group, 3,4,5-trifluorophenyl group, 4-octylphenyl group, 4-pentylbiphenyl group, 4-octylbiphenyl group, 4-fluorobiphenyl group, 3,4-difluorobiphenyl group, 3,4,5-trifluorobiphenyl group, 4-octyl-1-naphtyl group, 5-pentyl-1-naphtyl group, 6-octyl-2-naphtyl group, 9-anthryl group, 10-pentyl-9-antyryl group.

Examples of the organic group represented by $P^1$, $P^4$, $Q^1$ and $Q^3$ include 1,2-phenylene group, 1,3-phenylene group, 1,4-phenylene group and 4,4'-biphenylene group.

Examples of the organic group represented by $P^5$ and $Q^2$ include trivalent skeletons such as benzene skeleton, biphenyl skeleton, naphthalene skeleton and anthracene skeleton.

These groups may be the same or different.

In the above formulas, $R^1$, $R^2$, $R^3$, $R^4$, $R^5$, $R^6$, $R^7$, $R^8$, $R^9$ and $R^{10}$ are each a hydrogen atom or alkyl group, preferably a hydrogen atom or alkyl group having 1 to 6 carbon atoms. These alkyl groups may be linear or branched and the same or different.

In the present invention, out of the structures represented by the above formula (IV), a chalcone structure represented by the following formula (IV)-4 is particularly preferred:

$$—P^{41}—CR^7=CR^8—CO—Q^4 \qquad (IV)\text{-}4$$

wherein $Q^4$, $R^7$ and $R^8$ are as defined in the above formula (IV), and $P^{41}$ is represented by the following formula (IV)-4' or (IV)-4":

(IV)-4'

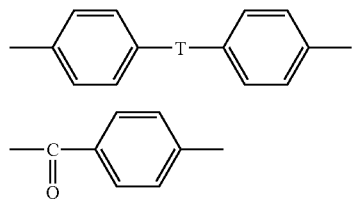
(IV)-4"

wherein T is a single bond or a divalent organic group having 1 to 15 carbon atoms which may contain an oxygen atom.

In the formula (IV)-4', T is a single bond or a divalent organic group having 1 to 15 carbon atoms which may contain an oxygen atom. The divalent organic group having 1 to 15 carbon atoms which may contain an oxygen atom is, for example, an organic group represented by the following formula (IV)-4''':

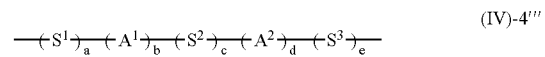
(IV)-4''' wherein $S^1$, $S^2$ and $S^3$ are each independently an alkylene group having 1 to 15 carbon atoms or cycloalkylene group, $A^1$ and $A^2$ are each independently a divalent organic group represented by

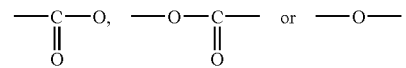

and a, b, c, d and e are each independently 0 or 1, with the proviso that at least one of a to e is 1.

Examples of the divalent organic group represented by the formula (IV)-4' include 4,4'-bisphenylene group and organic groups represented by the following formulas.

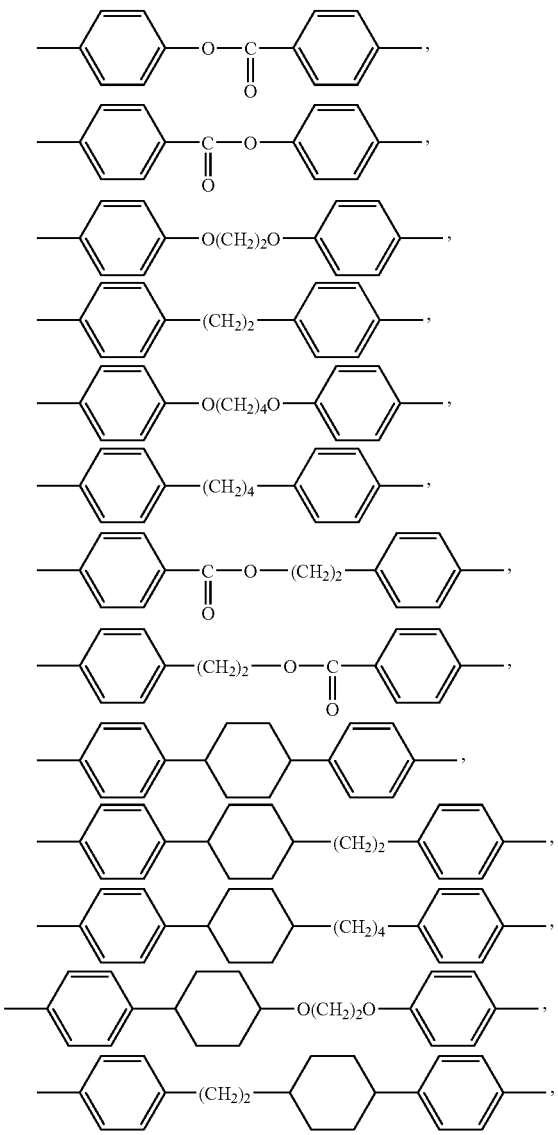

-continued

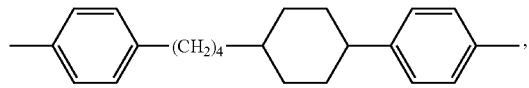

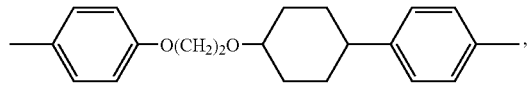

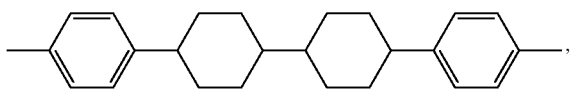

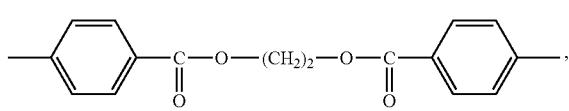

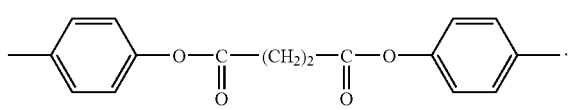

Other examples of the structure (A) include cinnamic acid derivative structures, stilbene derivative structures, benzophenone derivative structures and cinnamoyl structures. These structures may be linear or part of a cyclic structure like a coumarin structure. These structures (A) may be used alone or in combination in the polymer component.

Structure (B)

The structure (B) is at least one selected from the group consisting of fluorine-containing organic group, alkyl group having 10 to 30 carbon atoms and alicyclic organic group having 10 to 30 carbon atoms. It has the function of providing a pretilt angle to a liquid crystal alignment film obtained from the liquid crystal aligning agent of the present invention.

Examples of the fluorine-containing organic group include trifluoromethyl group, pentafluoroethyl group, 4-fluorocyclohexyl group, pentafluorocyclohexyl group, 4-fluorophenyl group and pentafluorophenyl group. Examples of the alkyl group having 10 to 30 carbon atoms include n-decyl group, n-dodecyl group, n-tetradecyl group, n-pentadecyl group, n-hexadecyl group, n-octadecyl group and n-eicosyl group. Examples of the alicyclic organic group having 10 to 30 carbon atoms include cholesteryl group and cholestanyl group. The above fluorine-containing organic group and alkyl group may be bonded by a bond group such as —O—, —CO—, —COO—, —OCO—, —NHCO—, —CONH— or —S— in the structure (B).

Specific Polymer

The above polyamic acid and polyimide which are examples of the specific polymer are obtained by reacting (a) a tetracarboxylic dianhydride with (b) a diamine compound to produce a polyamic acid and by dehydrating and closing the ring of the polyamic acid to produce a polyimide, respectively. In the production of the polyamic acid and polyimide, a compound having the structure (A) and/or a compound having the structure (B) are/is used as at least one of the above components (a) and (b). Further, the polyamic acid ester is obtained by reacting the above polymeric acid with a halide, alcohol or phenol. In the production of the polyamic acid ester, it is preferable that a compound having the structure (B) is used as at least one of the above components (a) and (b) used in the production of polyamic acid and a compound having the structure (A) is used as a halide, alcohol or phenol.

Examples of the tetracarboxylic dianhydride having the structure (A) include (a) 3,3'4,4'-chalconetetracarboxylic dianhydride, 4,4',5,5'-chalconetetracarboxylic dianhydride, 3,3'4,5'-chalconetetracarboxylic dianhydride, 4,4'-dihydroxychalconebistrimellitate, 3,4'-dihydroxychalconebistrimellitate, 3',5'-dihydroxychalconebistrimellitate, 2,4-dihydroxychalconebistrimellitate, 2,2'-bis(4-(4-chalconyl)phenoxy)-3,3',4,4'-biphenyltetracarboxylic dianhydride, 3,3'-bis(4-(4-chalconyl)phenoxy)-4,4',5,5'-biphenyltetracarboxylic dianhydride, 2,2'-bis(4-(4-chalconyl)phenoxy)-4,4', 5,5'-biphenyltetracarboxylic dianhydride, 4,4'-bis(4-(4-chalconyl)phenoxy)-2,2',3,3'-biphenyltetracarboxylic dianhydride, 6,6'-bis(4-(4-chalconyl)phenoxy)-2,2',3,3'-biphenyltetracarboxylic dianhydride, 5,5'-bis(4-(4-chalconyl)phenoxy)-2,2',3,3'-biphenyltetracarboxylic dianhydride, 2,2'-bis(4-(4-chalconyl)phenoxy)-3,3',4,4'-diphenylether tetracarboxylic dianhydride, 3,3'-bis(4-(4-chalconyl)phenoxy)-4,4',5,5'-diphenylether tetracarboxylic dianhydride, 2,2'-bis(4-(4-chalconyl)phenoxy)-4,4',5,5'-diphenylether tetracarboxylic dianhydride, 4,4'-bis(4-(4-chalconyl)phenoxy)-2,2',3,3'-diphenylether tetracarboxylic dianhydride, 6,6'-bis(4-(4-chalconyl)phenoxy)-2,2',3,3'-diphenylether tetracarboxylic dianhydride, 5,5'-bis(4-(4-chalconyl)phenoxy)-2,2',3,3'-diphenylether tetracarboxylic dianhydride, compounds represented by the following formulas (1) to (10).

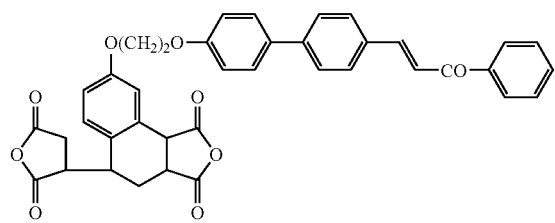

(1)

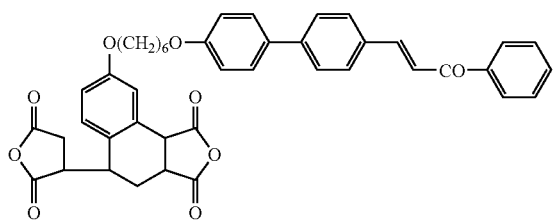

(2)

-continued
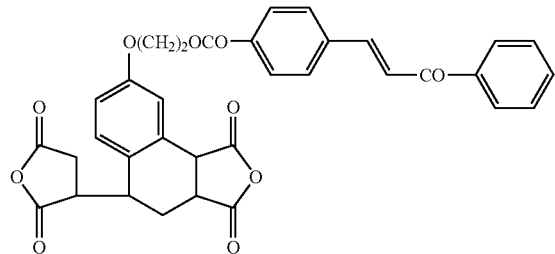
(3)
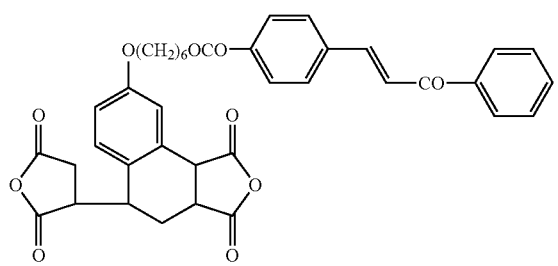
(4)
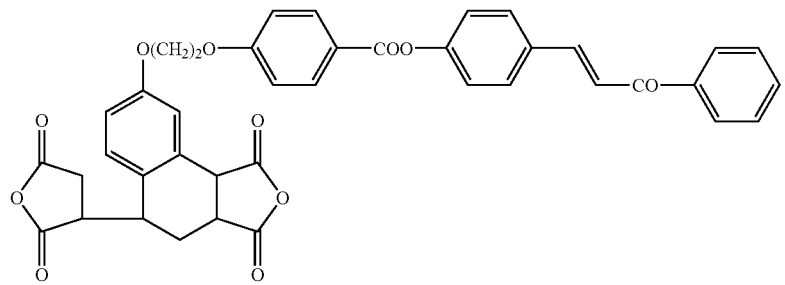
(5)
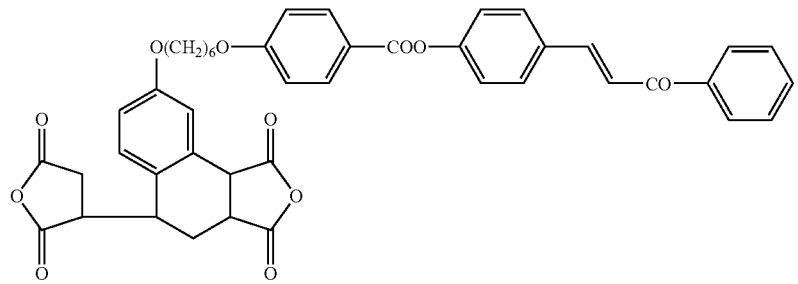
(6)
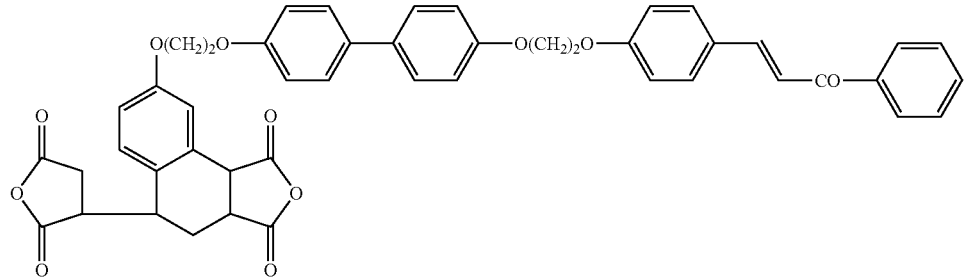
(7)
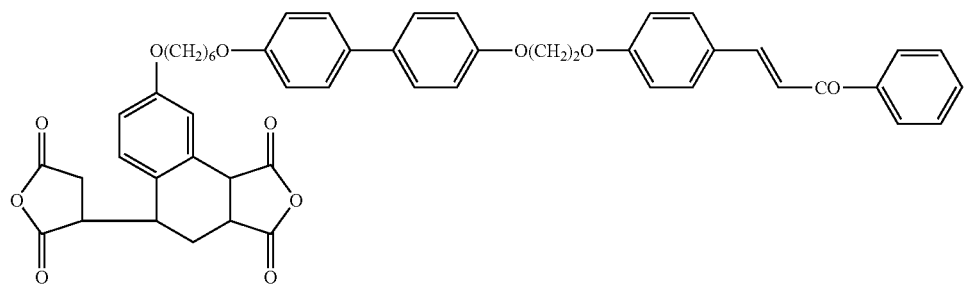
(8)

-continued

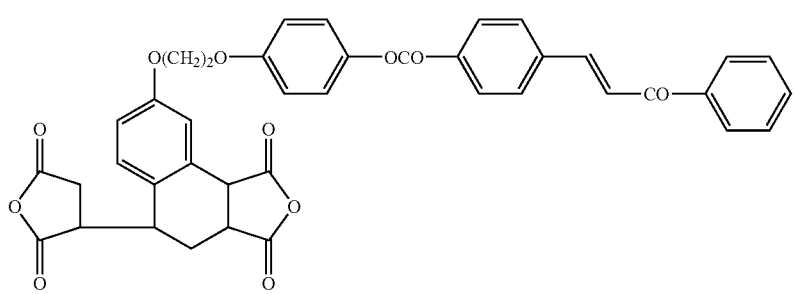

(9)

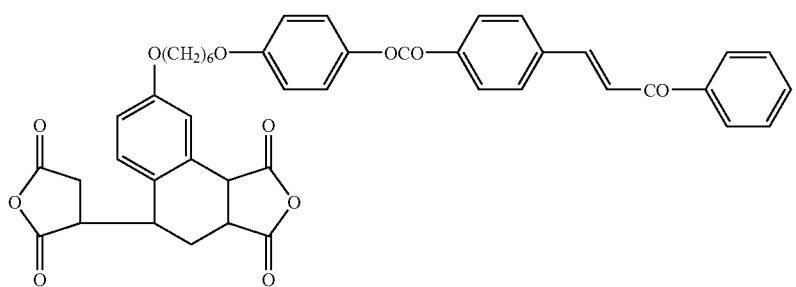

(10)

(b) 2,2'-bis(4-chalconyloxy)-3,3',4,4'-biphenyltetracarboxylic dianhydride, 3,3'-bis(4-chalconyloxy)-4,4',5,5'-biphenyltetracarboxylic dianhydride, 2,2'-bis(4-chalconyloxy)-4,4',5,5'-biphenyltetracarboxylic dianhydride, 4,4'-bis(4-chalconyloxy)-2,2',3,3'-biphenyltetracarboxylic dianhydride, 6,6'-bis(4-chalconyloxy)-2,2',3,3'-biphenyltetracarboxylic dianhydride, 5,5'-bis(4-chalconyloxy)-2,2',3,3'-biphenyltetracarboxylic dianhydride, 2,2'-bis(4-chalconyloxy)-3,3',4,4'-diphenylether tetracarboxylic dianhydride, 3,3'-bis(4-chalconyloxy)-4,4',5,5'-diphenylether tetracarboxylic dianhydride, 2,2'-bis(4-chalconyloxy)-4,4',5,5'-diphenylether tetracarboxylic dianhydride, 4,4'-bis(4-chalconyloxy)-2,2',3,3'-diphenylether tetracarboxylic dianhydride, 6,6'-bis(4-chalconyloxy)-2,2',3,3'-diphenylether tetracarboxylic dianhydride, 5,5'-bis(4-chalconyloxy)-2,2',3,3'-diphenylether tetracarboxylic dianhydride, 2,2'-bis(6-(4-chalconyloxy)hexyloxy)-3,3',4,4'-biphenyltetracarboxylic dianhydride, 2,2'-bis(6-(4'-fluoro-4-chalconyloxy)hexyloxy)-3,3',4,4'-biphenyltetracarboxylic dianhydride, 3,3'-bis(6-(4-chalconyloxy)hexyloxy)-4,4',5,5'-biphenyltetracarboxylic dianhydride, 3,3'-bis(6-(4'-fluoro-4-chalconyloxy)hexyloxy)-4,4',5,5'-biphenyltetracarboxylic dianhydride, 2,2'-bis(6-(4-chalconyloxy)hexyloxy)-4,4',5,5'-biphenyltetracarboxylic dianhydride, 2,2'-bis(6-(4'-fluoro-4-chalconyloxy)hexyloxy)-4,4',5,5'-biphenyltetracarboxylic dianhydride, 4,4'-bis(6-(4-chalconyloxy)hexyloxy)-2,2',3,3'-biphenyltetracarboxylic dianhydride, 4,4'-bis(6-(4'-fluoro-4-chalconyloxy)hexyloxy)-2,2',3,3'-biphenyltetracarboxylic dianhydride, 6,6'-bis(6-(4-chalconyloxy)hexyloxy)-2,2',3,3'-biphenyltetracarboxylic dianhydride, 6,6'-bis(6-(4'-fluoro-4-chalconyloxy)hexyloxy)-2,2',3,3'-biphenyltetracarboxylic dianhydride, 5,5'-bis(6-(4-chalconyloxy)hexyloxy)-2,2',3,3'-biphenyltetracarboxylic dianhydride, 5,5'-bis(6-(4'-fluoro-4-chalconyloxy)hexyloxy)-2,2',3,3'-biphenyltetracarboxylic dianhydride, 2,2'-bis(6-(4-chalconyloxy)hexyloxy)-3,3',4,4'-diphenylether tetracarboxylic dianhydride, 2,2'-bis(6-(4'-fluoro-4-chalconyloxy)hexyloxy)-3,3',4,4'-diphenylether tetracarboxylic dianhydride, 3,3'-bis(6-(4-chalconyloxy)hexyloxy)-4,4',5,5'-diphenylether tetracarboxylic dianhydride, 3,3'-bis(6-(4'-fluoro-4-chalconyloxy)hexyloxy)-4,4',5,5'-diphenylether tetracarboxylic dianhydride, 2,2'-bis(6-(4-chalconyloxy)hexyloxy)-4,4',5,5'-diphenylether tetracarboxylic dianhydride, 2,2'-bis(6-(4'-fluoro-4-chalconyloxy)hexyloxy)-4,4',5,5'-diphenylether tetracarboxylic dianhydride, 4,4'-bis(6-(4-chalconyloxy)hexyloxy)-2,2',3,3'-diphenylether tetracarboxylic dianhydride, 4,4'-bis(6-(4'-fluoro-4-chalconyloxy)hexyloxy)-2,2',3,3'-diphenylether tetracarboxylic dianhydride, 6,6'-bis(6-(4-chalconyloxy)hexyloxy)-2,2',3,3'-diphenylether tetracarboxylic dianhydride, 6,6'-bis(6-(4'-fluoro-4-chalconyloxy)hexyloxy)-2,2',3,3'-diphenylether tetracarboxylic dianhydride, 5,5'-bis(6-(4-chalconyloxy)hexyloxy)-2,2',3,3'-diphenylether tetracarboxylic dianhydride, 5,5'-bis(6-(4'-fluoro-4-chalconyloxy)hexyloxy)-2,2',3,3'-diphenylether tetracarboxylic dianhydride, 2,2'-bis(6-(4-chalconyloxy)hexyloxy)-3,3',4,4'-benzophenonetetracarboxylic dianhydride, 2,2'-bis(6-(4'-fluoro-4-chalconyloxy)hexyloxy)-3,3',4,4'-benzophenonetetracarboxylic dianhydride, 3,3'-bis(6-(4-chalconyloxy)hexyloxy)-4,4',5,5'-benzophenonetetracarboxylic dianhydride, 3,3'-bis(6-(4'-fluoro-4-chalconyloxy)hexyloxy)-4,4',5,5'-benzophenonetetracarboxylic dianhydride, 2,2'-bis(6-(4-chalconyloxy)hexyloxy)-4,4',5,5'-benzophenonetetracarboxylic dianhydride, 2,2'-bis(6-(4'-fluoro-4-chalconyloxy)hexyloxy)-4,4',5,5'-benzophenonetetracarboxylic dianhydride, 4,4'-bis(6-(4-chalconyloxy)hexyloxy)-2,2',3,3'-benzophenonetetracarboxylic dianhydride, 4,4'-bis(6-(4'-fluoro-4-chalconyloxy)hexyloxy)-2,2',3,3'-benzophenonetetracarboxylic dianhydride, 6,6'-bis(6-(4-chalconyloxy)hexyloxy)-2,2',3,3'-benzophenonetetracarboxylic dianhydride, 6,6'-bis(6-(4'-fluoro-4-chalconyloxy)hexyloxy)-2,2',3,3'-benzophenonetetracarboxylic dianhydride, 5,5'-bis(6-(4-chalconyloxy)hexyloxy)-2,2',3,3'-benzophenonetetracarboxylic dianhydride, 5,5'-bis(6-(4'-fluoro-4-chalconyloxy)hexyloxy)-2,2',3,3'-benzophenonetetracarboxylic dianhydride, 3(6-(4-chalconyloxy)hexyloxy)-pyromellitic dianhydride, 3(6-(4'-fluoro-4-chalconyloxy)hexyloxy)-pyromellitic dianhydride, 3,6-bis(6-(4-chalconyloxy)hexyloxy)-pyromellitic dianhydride, 3,6-bis(6-(4'-fluoro-4-chalconyloxy)hexyloxy)-pyromellitic dianhydride, compounds represented by the following formulas (11) to (32):
(11)
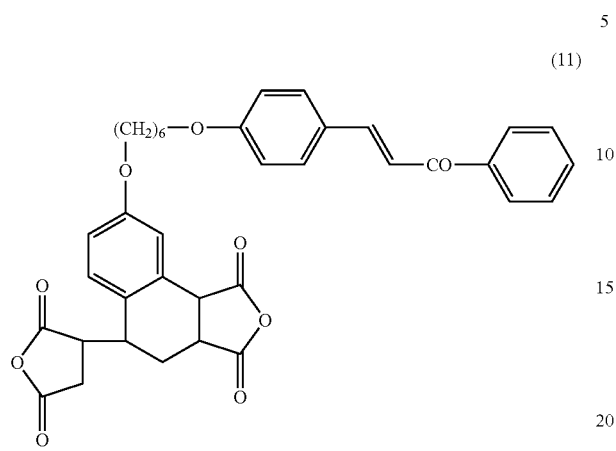
(12)
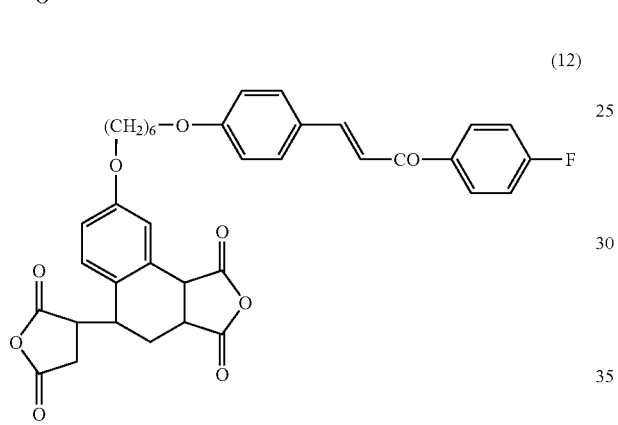
(13)
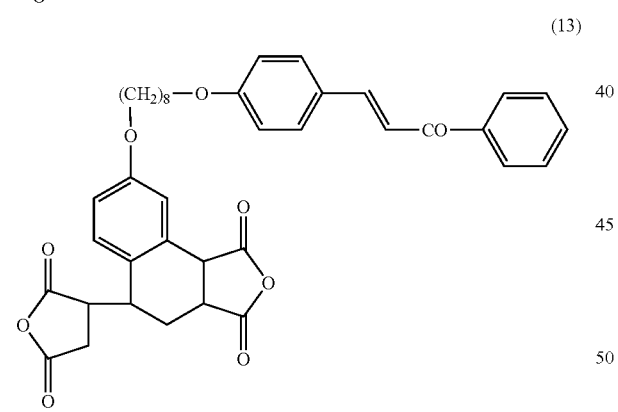
(14)
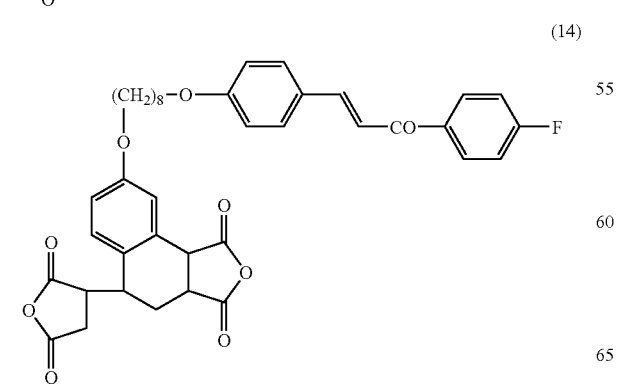
(15)
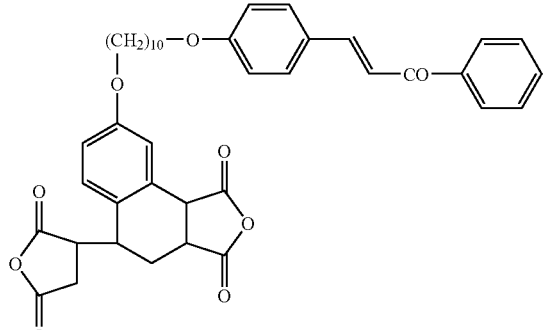
(16)
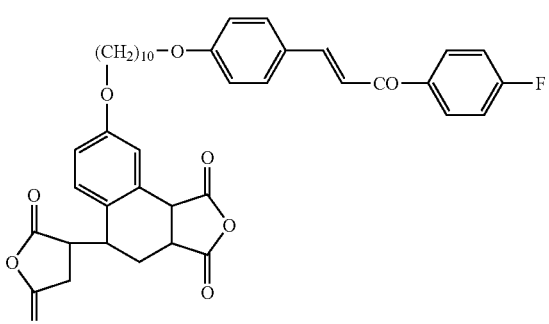
(17)
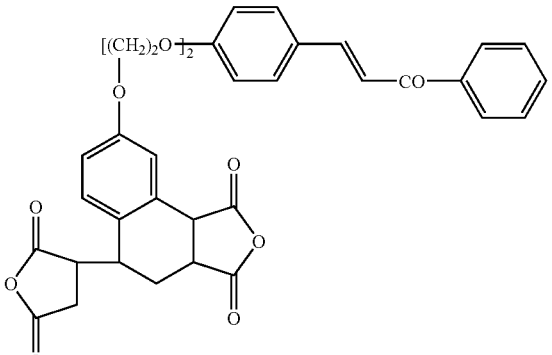
(18)
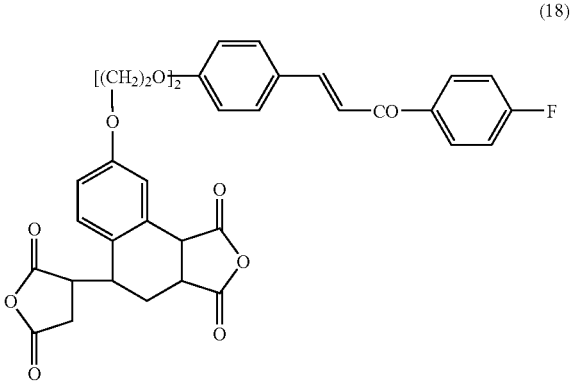

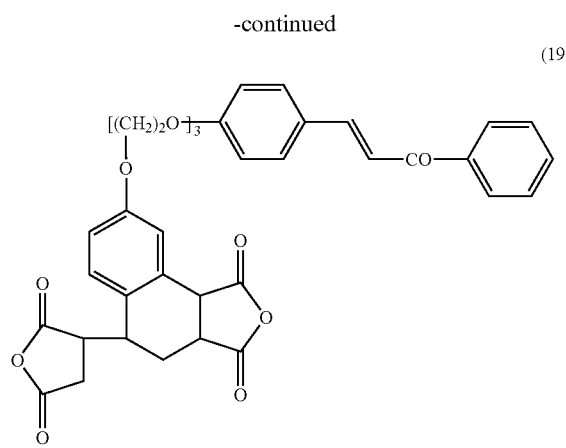
(19)
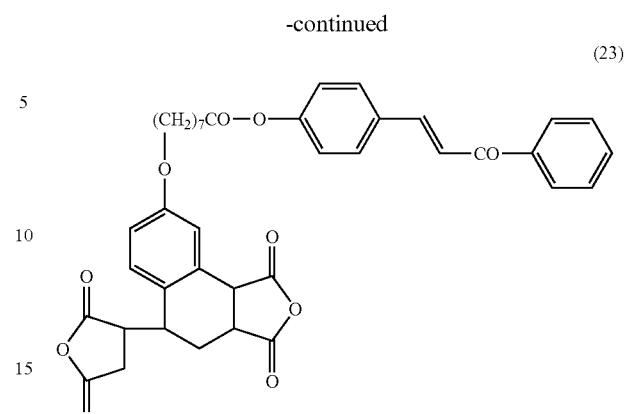
(23)
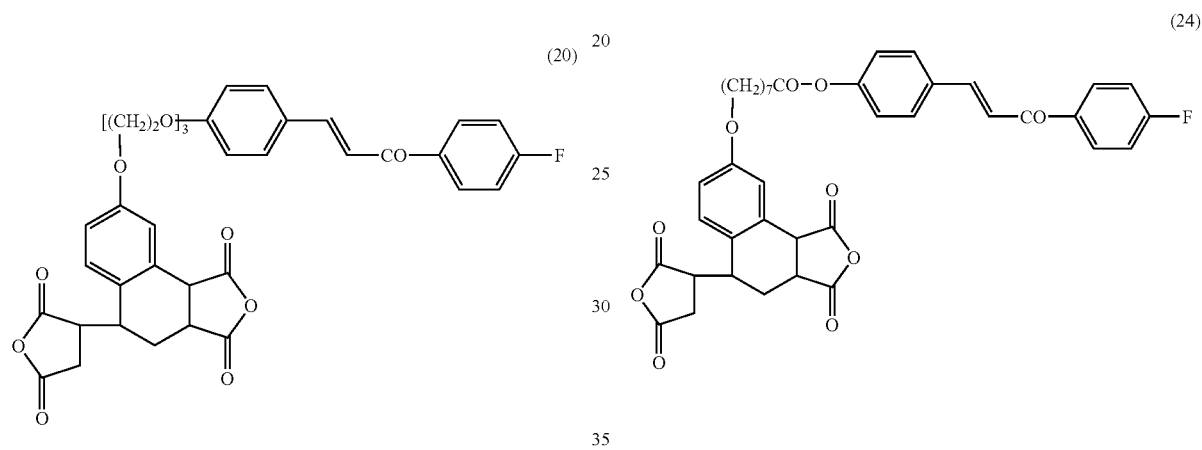
(20) (24)
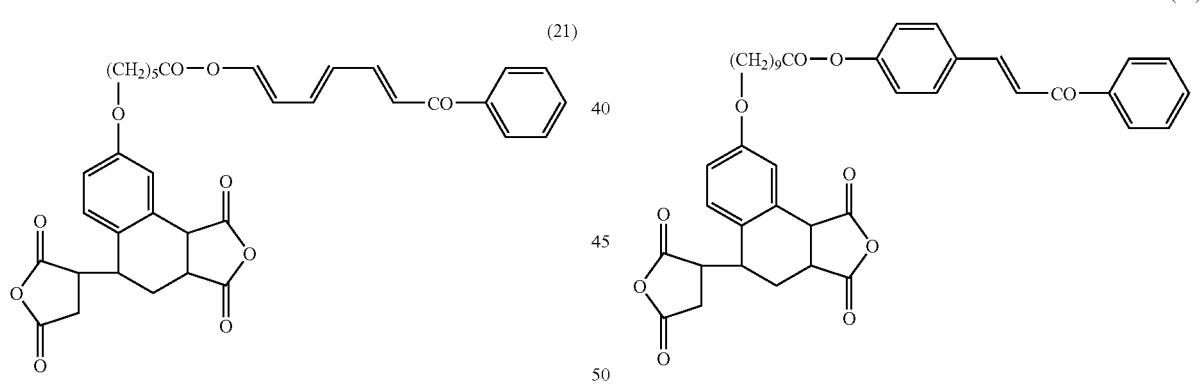
(21) (25)
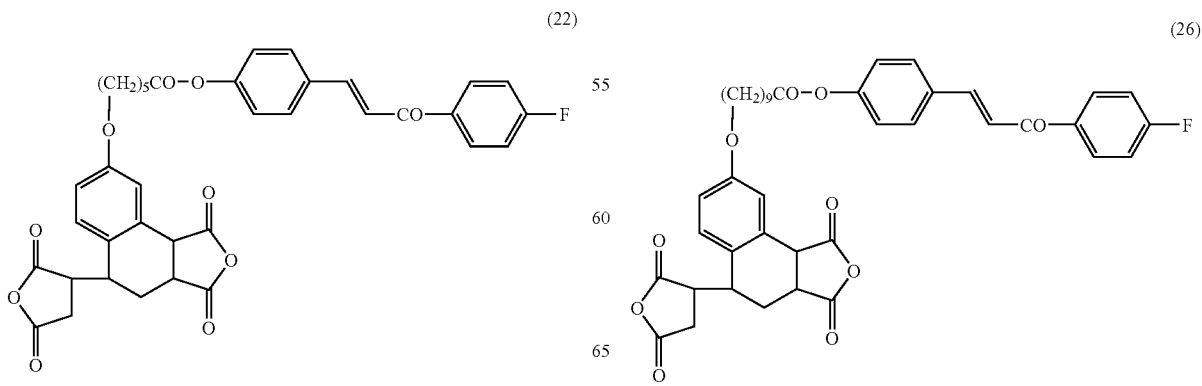
(22) (26)

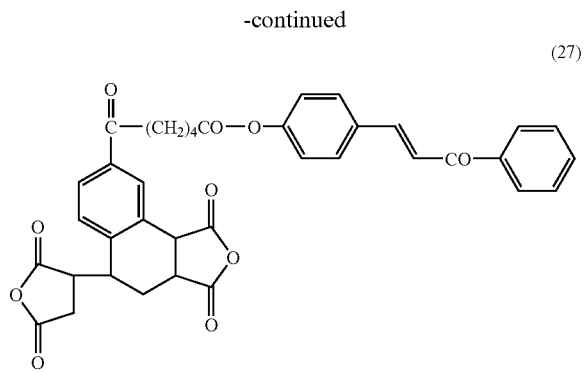
(27)

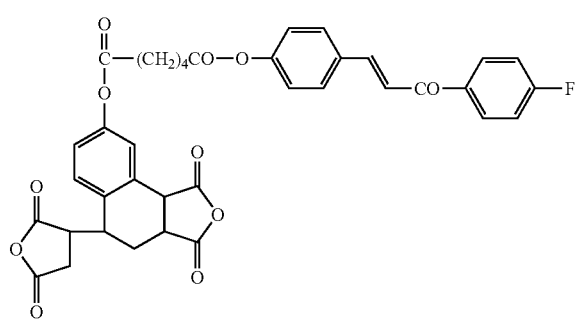
(28)

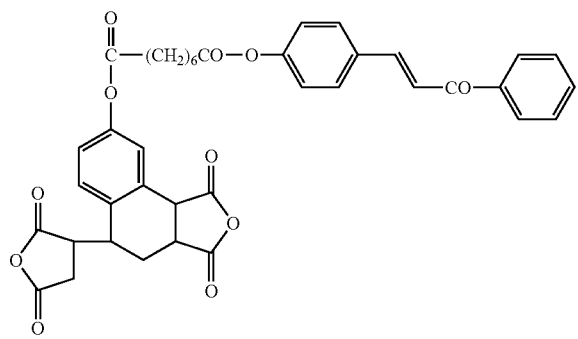
(29)

(30)

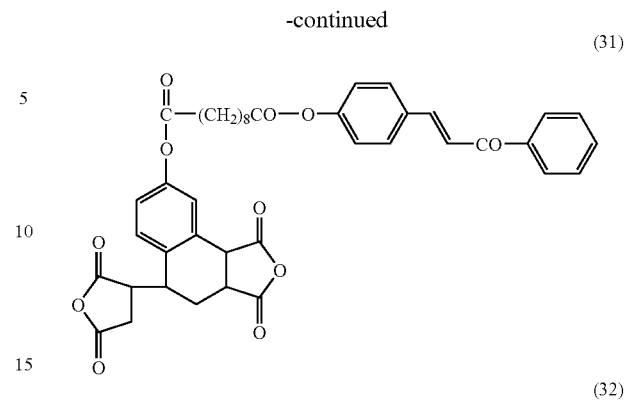
(31)

(32)

2,2'-bis(4-(4-chalconyl)phenoxy)-3,3',4,4'-biphenyltetracarboxylic dianhydride, 3,3'-bis(4-(4-chalconyl)phenoxy)-4,4',5,5'-biphenyltetracarboxylic dianhydride, 2,2'-bis(4-(4-chalconyl)phenoxy)-4,4',5,5'-biphenyltetracarboxylic dianhydride, 4,4'-bis(4-(4-chalconyl)phenoxy)-2,2'3,3'-biphenyltetracarboxylic dianhydride, 6,6'-bis(4-(4-chalconyl)phenoxy)-2,2',3,3'-biphenyltetracarboxylic dianhydride, 5,5'-bis(4-(4-chalconyl)phenoxy)-2,2',3,3'-biphenyltetracarboxylic dianhydride, 2,2'-bis(4-(4-chalconyl)phenoxy)-3,3',4,4'-diphenylether tetracarboxylic dianhydride, 3,3'-bis(4-(4-chalconyl)phenoxy)-4,4',5,5'-diphenylether tetracarboxylic dianhydride, 2,2'-bis(4-(4-chalconyl)phenoxy)-4,4',5,5'-diphenylether tetracarboxylic dianhydride, 4,4'-bis(4-(4-chalconyl)phenoxy)-2,2',3,3'-diphenylether tetracarboxylic dianhydride, 6,6'-bis(4-(4-chalconyl)phenoxy)-2,2',3,3'-diphenylether tetracarboxylic dianhydride and 5,5'-bis(4-(4-chalconyl)phenoxy)-2,2',3,3'-diphenylether tetracarboxylic dianhydride. They may be used alone or in combination of two or more.

The above compounds listed in (b) are preferably used to obtain a polymer which provides a large pretilt angle.

Examples of the diamine compound having the structure (A) include (C) 3,3'-diaminochalcone, 4,4'-diaminochalcone, 3,4'-diaminochalcone, 3,4-diaminochalcone, 4-(3,5-diaminophenoxy)chalcone, 4'-(2,4-diaminophenoxy)chalcone, 4-(4-(2,4-diaminophenoxy)phenyl)chalcone, 4-(4-(2-(2,4-diaminophenoxy)ethoxy)phenyl)chalcone, 4-(4-(6-(2,4-diaminophenoxy)hexanoxy)phenyl)chalcone, 4-(2-(2,4-diaminophenoxy)ethyl)chalcone carboxylate, 4-(6-(2,4-diaminophenoxy)hexyl)chalcone carboxylate, 4-(4-(2,4-diaminophenoxy)benzoyloxy)chalcone, 4-(4-(2,4-diaminophenoxy)phenyl)chalcone carboxylate, 4-(4-(2-(2,4-diaminophenoxy)ethoxy)benzoyloxy)chalcone, 4-(4-(2-(2,4-diaminophenoxy)ethoxy)phenyl)chalcone carboxylate, 4-(4-(6-(2,4-diaminophenoxy)hexanoxy)benzoyloxy)chalcone, 4-(4-(6-(2,4-diaminophenoxy)hexanoxy)phenyl)chalcone carboxylate, 4-(4-(3,5-diaminobenzoyloxy)phenyl)

chalcone, 4-(4-(2-(3,5-diaminobenzoyloxy)ethoxy)phenyl)chalcone, 4-(4-(6-(3,5-diaminobenzoyloxy)hexanoxy)phenyl)chalcone, 4-(2-(3,5-diaminobenzoyloxy)ethyl)chalcone carboxylate, 4-(6-(3,5-diaminobenzoyloxy)hexyl)chalcone carboxylate, 4-(3,5-diaminobenzoyloxy)benzoyloxy)chalcone, 4-(4-(3,5-diaminobenzoyloxy)phenyl)chalcone carboxylate, 4-(4-(2-(3,5-diaminobenzoyloxy)ethoxy)benzoyloxy)chalcone, 4-(4-(2-(3,5-diaminobenzoyloxy)ethoxy)phenyl)chalcone carboxylate, 4-(4-(6-(3,5-diaminobenzoyloxy)hexanoxy)benzoyloxy)chalcone, 4-(4-(6-(3,5-diaminobenzoyloxy)hexanoxy)phenyl)chalcone carboxylate, compounds represented by the following formulas (41) to (46).

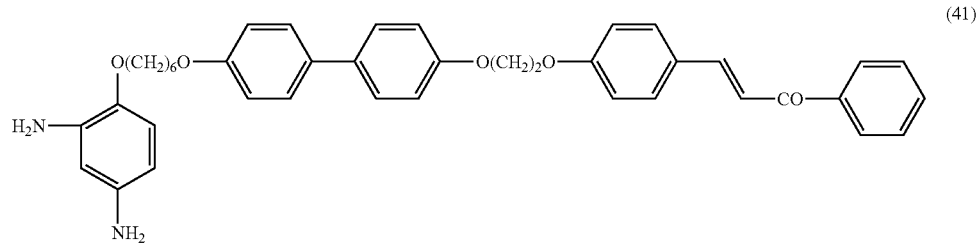
(41)

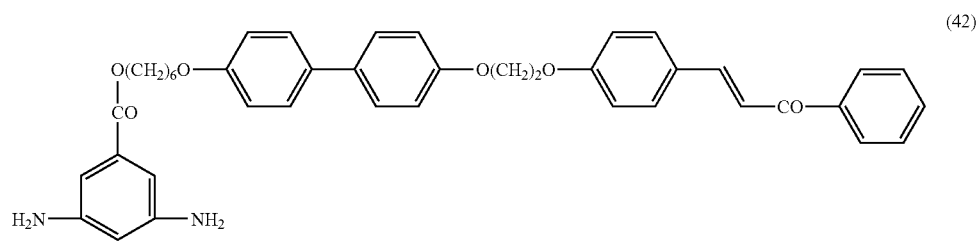
(42)

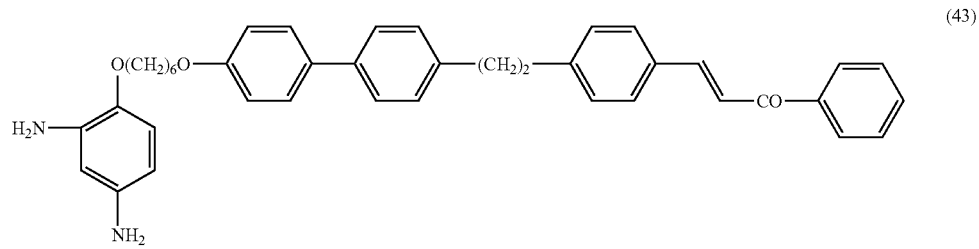
(43)

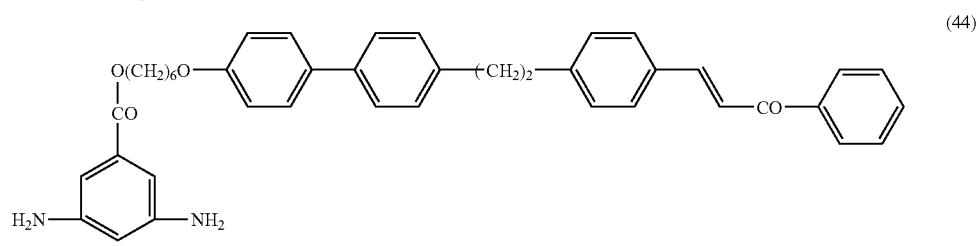
(44)

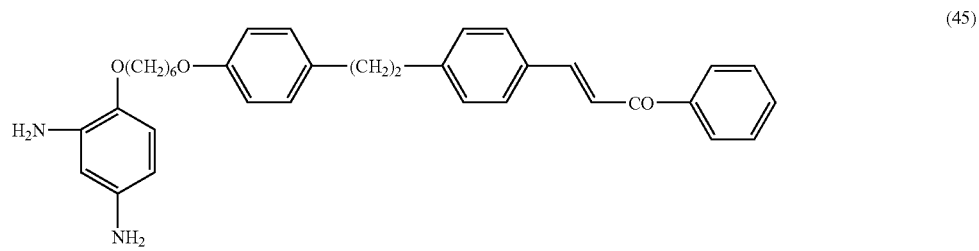
(45)

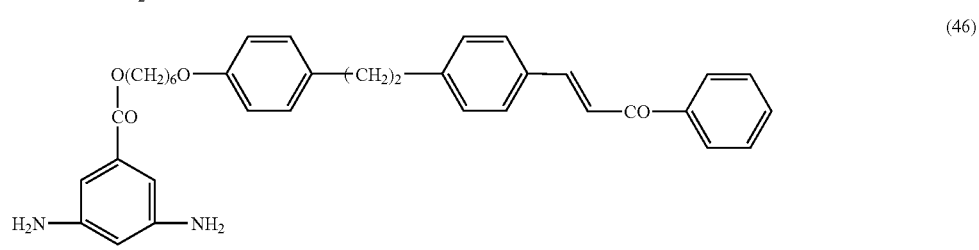
(46)

and a compound represented by the following formula (VI):

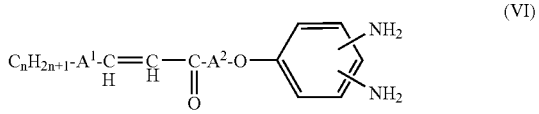

wherein $A^1$ and $A^2$ are each a divalent aromatic group, and n is an integer of 1 to 10.

In the above formula (VI), the alkyl group represented by $C_nH_{2n+1}$— may be linear or branched, preferably linear. Examples of the divalent aromatic group represented by $A^1$ and $A^2$ include phenylene group, biphenylene group, naphthylene group, binaphthylene group, anthrylene group and phenanthrylene group, and organic groups obtained by excluding two hydrogen atoms from a polycyclic aromatic compound such as pyrene, chrysene or naphthacene.

Examples of the compound represented by the above formula (VI) include
4-isopropyl-4'-(3,5-diaminophenoxy)chalcone,
4-amyl-4'-(3,5-diaminophenoxy)chalcone,
4-pentyl-4'-(3,5-diaminophenoxy)chalcone,
4-octyl-4'-(3,5-diaminophenoxy)chalcone,
4-pentyl-2-methyl-4'-(2,4-diaminophenoxy)chalcone,
4-pentyl-2,5-dimethyl-4'-(3,5-diaminophenoxy)chalcone,
4-octyl-2-methyl-4'-(3,5-diaminophenoxy)chalcone,
4-pentyl-4'-(2,4-diaminophenoxy)chalcone,
4-octyl-4'-(2,4-diaminophenoxy)chalcone,
4-pentyl-4'-(3,5-diaminobenzoyloxy)chalcone,
4-octyl-4'-(3,5-diaminobenzoyloxy)chalcone,
4-pentyl-3'-(2,4-diaminobenzoyloxy)chalcone and 4-octyl-3'-(2,4-diaminobenzoyloxy)chalcone.

Other examples of the diamine compound having the structure (A) include (d)
4-(3,5-diaminophenoxy)-4'-isopropylchalcone,
4-(3,5-diaminophenoxy)-4'-pentylchalcone,
4-(3,5-diaminophenoxy)-4'-octylchalcone,
4-(2,4-diaminophenoxy)-4'-pentylchalcone,
4-(2,4-diaminophenoxy)-4'-octylchalcone,
4-(3,5-diaminobenzoyloxy)-4'-pentylchalcone,
4'-(4-pentylphenyl)-4-(3,5-diaminophenoxy)chalcone,
6-(4-chalconyloxy)hexyloxy(2,4-diaminobenzene),
6-(4'-fluoro-4-chalconyloxy)hexyloxy(2,4-diaminobenzene),
8-(4-chalconyloxy)octyloxy(2,4-diaminobenzene),
8-(4'-fluoro-4-chalconyloxy)octyloxy(2,4-diaminobenzene),
10-(4-chalconyloxy)decyloxy(2,4-diaminobenzene),
10-(4'-fluoro-4-chalconyloxy)decyloxy(2,4-diaminobenzene),
2-(2-(4-chalconyloxy)ethoxy)ethyl(3,5-diaminobenzoate),
2-(2-(4'-fluoro-4-chalconyloxy)ethoxy)ethyl(3,5-diaminobenzoate),
2-(2-(4-chalconyloxy)ethoxy)ethoxy(2,4-diaminobenzene),
2-(2-(4'-fluoro-4-chalconyloxy)ethoxy)ethoxy(2,4-diaminobenzene), 1-((4-chalconyloxy)ethoxy)-2-((2,4-diaminophenoxy)ethoxy)ethane,
1-((4'-fluoro-4-chalconyloxy)ethoxy)-2-((2,4-diaminophenoxy)ethoxy)ethane,
1-((4-chalconyloxy)ethoxy)-2-((3,5-diaminobenzoyloxy)ethoxy)ethane,
1-((4'-fluoro-4-chalconyloxy)ethoxy)-2-((3,5-diaminobenzoyloxy)ethoxy)ethane,
6-(4-chalconyloxy)hexyloxy(3,5-diaminobenzoyl),
6-(4'-fluoro-4-chalconyloxy)hexyloxy(3,5-diaminobenzoyl),
8-(4-chalconyloxy)octyloxy(3,5-diaminobenzoyl),
8-(4'-fluoro-4-chalconyloxy)octyloxy(3,5-diaminobenzoyl),
10-(4-chalconyloxy)decyloxy(3,5-diaminobenzoyl),
10-(4'-fluoro-4-chalconyloxy)decyloxy(3,5-diaminobenzoyl),
6-(4-chalconyloxy)hexanoic acid (2,4-diaminophenyl),
6-(4'-fluoro-4-chalconyloxy)hexanoic acid (2,4-diaminophenyl), 8-(4-chalconyloxy)-octanoic acid-(2,4-diaminophenyl),
8-(4'-fluoro-4-chalconyloxy)-octanoic acid-(2,4-diaminophenyl), 10-(4-chalconyloxy)-decanoic acid-(2,4-diaminophenyl),
10-(4'-fluoro-4-chalconyloxy)-decanoic acid-(2,4-diaminophenyl),
mono(4-chalconyl)mono(2,4-diaminophenyl)adipate,
mono(4'-fluoro-4-chalconyl)mono(2,4-diaminophenyl)adipate,
mono(4-chalconyl)mono(2,4-diaminophenyl)suberate,
mono(4'-fluoro-4-chalconyl)mono(2,4-diaminophenyl)suberate,
mono(4-chalconyl)mono(2,4-diaminophenyl)sebacate,
mono(4'-fluoro-4-chalconyl)mono(2,4-diaminophenyl)sebacate,
bis-1,1-(4-aminophenyl)-6-(4-chalconyloxy)hexane,
bis-1,1-(4-aminophenyl)-6-(4'-fluoro-4-chalconyloxy)hexane,
bis-1,1-(4-aminophenyl)-8-(4-chalconyloxy)octane,
bis-1,1-(4-aminophenyl)-8-(4'-fluoro-4-chalconyloxy)octane,
bis-1,1-(4-aminophenyl)-10-(4-chalconyloxy)decane,
bis-1,1-(4-aminophenyl)-10-(4'-fluoro-4-chalconyloxy)decane, bis-N,N-(4-aminophenyl)-N-(6-(4-chalconyloxy)hexanoxyphenyl)amine,
bis-N,N-(4-aminophenyl)-N-(6-(4'-fluoro-4-chalconyloxy)hexanoxyphenyl)amine,
bis-N,N-(4-aminophenyl)-N-(8-(4-chalconyloxy)octanoxyphenyl)amine,
bis-N,N-(4-aminophenyl)-N-(8-(4'-fluoro-4-chalconyloxy)octanoxyphenyl)amine,
bis-N,N-(4-aminophenyl)-N-(10-(4-chalconyloxy)decanoxyphenyl)amine,
bis-N,N-(4-aminophenyl)-N-(10-(4'-fluoro-4-chalconyloxy)decanoxyphenyl)amine,
bis-N,N-(4-aminophenyl)-N-(2-(2-(4-chalconyloxy)ethoxy)ethoxyphenyl)amine,
bis-N,N-(4-aminophenyl)-N-(4-(2-(2-(4'-fluoro-4-chalconyloxy)ethoxy)ethoxy)phenyl)amine,
4-(4-(2,4-diaminophenoxy)phenyl)chalcone,
4-(4-(2-(2,4-diaminophenoxy)ethoxy)phenyl)chalcone,
4-(4-(6-(2,4-diaminophenoxy)hexanoxy)phenyl)chalcone,
4-(2-(2,4-diaminophenoxy)ethyl)chalcone carboxylato,
4-(6-(2,4-diaminophenoxy)hexyl)chalcone carboxylato,
4-(4-(2,4-diaminophenoxy)benzoyloxy)chalcone,
4-(4-(2,4-diaminophenoxy)phenyl)chalcone carboxylato,
4-(4-(2-(2,4-diaminophenoxy)ethoxy)benzoyloxy)chalcone,
4-(4-(2-(2,4-diaminophenoxy)ethoxy)phenyl)chalcone carboxylato,
4-(4-(6-(2,4-diaminophenoxy)hexanoxy)benzoyloxy)chalcone,
4-(4-(6-(2,4-diaminophenoxy)hexanoxy)phenyl)chalcone carboxylato, 4-(4-(3,5-diaminobenzoyloxy)phenyl)chalcone,
4-(4-(2-(3,5-diaminobenzoyloxy)ethoxy)phenyl)chalcone,
4-(4-(6-(3,5-diaminobenzoyloxy)hexanoxy)phenyl)chalcone, 4-(2-(3,5-diaminobenzoyloxy)ethyl)chalcone carboxylato,
4-(6-(3,5-diaminobenzoyloxy)hexyl)chalcone carboxylato,
4-(4-(3,5-diaminobenzoyloxy)benzoyloxy)chalcone,
4-(4-(3,5-diaminobenzoyloxy)phenyl)chalcone carboxylato,
4-(4-(2-(3,5-diaminobenzoyloxy)ethoxy)benzoyloxy)chalcone, 4-(4-(2-(3,5-diaminobenzoyloxy)ethoxyl)phenyl)chalcone carboxylato,
4-(4-(6-(3,5-diaminobenzoyloxy)hexanoxy)benzoyloxy)chalcone, and
4-(4-(6-(3,5-diaminobenzoyloxy)hexanoxy)phenyl)chalcone carboxylato.

These diamine compounds may be used alone or in combination of two or more.

The compounds (d) are preferably used to obtain a polymer which provides a large pretilt angle.

Examples of the tetracarboxylic dianhydride having the structure (B) include compounds represented by the following formulas (51) to (64). They may be used alone or in combination of two or more.

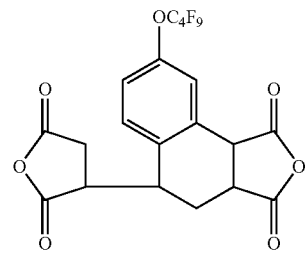
(51)

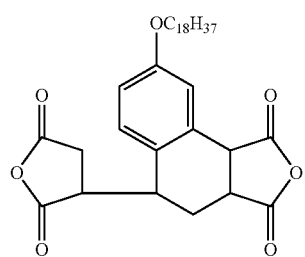
(52)

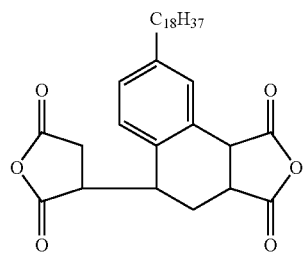
(53)

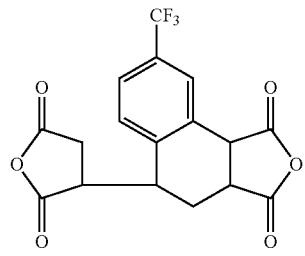
(54)

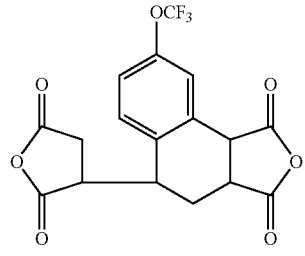

-continued

(55)

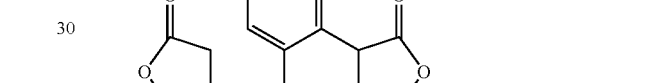
(56)

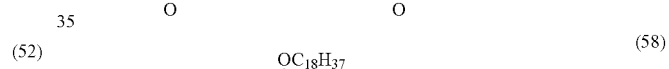
(57)

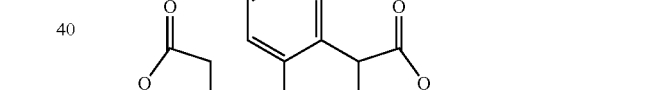
(58)

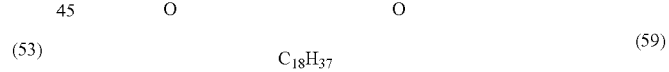
(59)

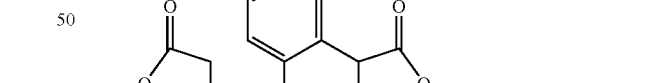
(60)

-continued

(61)
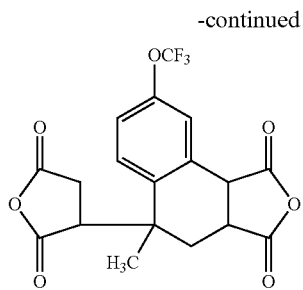

(62)
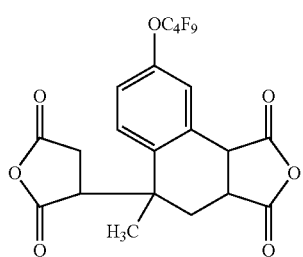

(63)
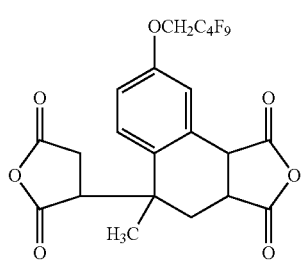

(64)
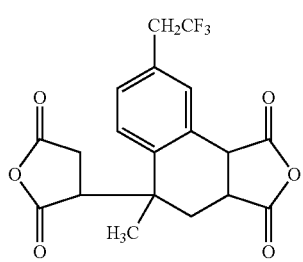

Examples of the diamine compound having the structure (B) include 1-dodecanoxy-2,4-diaminobenzene, 1-tetradecanoxy-2,4-diaminobenzene, 1-pentadecanoxy-2,4-diaminobenzene, 1-hexadecanoxy-2,4-diaminobenzene, 1-octadecanoxy-2,4-diaminobenzene, 1-cholesteryloxy-2,4-diaminobenzene, 1-cholestanyloxy-2,4-diaminobenzene, dodecanoxy(3,5-diaminobenzoyl), tetradecanoxy(3,5-diaminobenzoyl), pentadecanoxy(3,5-diaminobenzoyl), hexadecanoxy(3,5-diaminobenzoyl), octadecanoxy(3,5-diaminobenzoyl), cholesteryloxy(3,5-diaminobenzoyl), cholestanyloxy(3,5-diaminobenzoyl), (2,4-diaminophenoxy)palmitate, (2,4-diaminophenoxy)stearate, (2,4-diaminophenoxy)-4-trifluoromethyl benzoate and compound represented by the following formula (65).

(65)
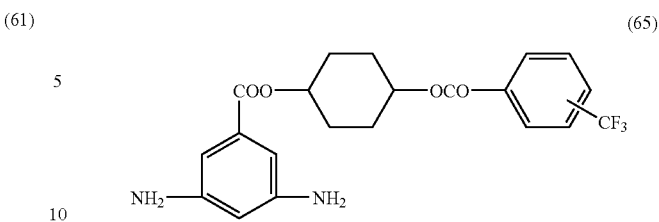

The polyimide used in the present invention may be used in conjunction with another tetracarboxylic dianhydride and/or diamine compound in limits that do not impair the effect of the present invention. These components are preferably used in a total amount of 80 mol % or less based on the total of the compound having the above structure (A) and/or the compound having the structure (B). Particularly when a polymer having a large pretilt angle is to be obtained, the amount is more preferably 60 mol % or less, much more preferably 20 mol % or less.

Examples of the other tetracarboxylic dianhydride include aliphatic and alicyclic tetracarboxylic dianhydrides such as 2,3,5-tricarboxycyclopentylacetic dianhydride, butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 3,5,6-tricarboxynorbornane-2-acetic dianhydride, 2,3,4,5-tetrahydrofurantetracarboxylic dianhydride, 1,3,3a,4,5,9b-hexahydro-5-(tetrahydro-2,5-dioxo-3-furanyl)-naphtho[1,2-c]-furan-1,3-dione, 5-(2,5-dioxotetrahydrofural)-3-methyl-3-cyclohexene-1,2-dicarboxylic dianhydride and bicyclo[2.2.2]-oct-7-ene-2,3,5,6-tetracarboxylic dianhydride; and aromatic tetracarboxylic dianhydrides such as pyromellitic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenetetracarboxylic dianhydride, 3,3',4,4'-biphenyltetracarboxylicdianhydride, bis(phthalic acid)phenylphosphine oxide dianhydride, p-phenylene-bis(triphenylphthalic acid)dianhydride, m-phenylene-bis(triphenylphthalic acid)dianhydride, bis(triphenylphthalic acid)-4,4'-diphenylether dianhydride and bis(triphenylphthalic acid)-4,4'-diphenylmethane dianhydride.

Out of these, preferred are 2,3,5-tricarboxycyclopentylacetic dianhydride, butanetetracarboxylic dianhydride, 1,3-dimethyl-1,2,3,4-cyclobutanetetracarboxylic dianhydride, 1,2,3,4-cyclobutanetetracarboxylic dianhydride, pyromellitic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride. They may be used alone or in combination of two or more.

Examples of the other diamine compounds include aromatic diamines such as p-phenylenediamine, m-phenylenediamine, 4,4'-diaminodiphenylmethane, 4,4'-diaminodiphenylethane, 4,4'-diaminodiphenyl sulfide, 4,4'-diaminodiphenylsulfone, 3,3'-dimethyl-4,4'-diaminobiphenyl, 4,4'-diaminobenzanilide, 4,4'- diaminodiphenyl ether, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 3,4'-diaminodiphenyl ether, 2,2-bis(4-aminophenoxy)propane, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 2,7-diaminofluorene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, 4,4'-diamino-2,2'-bis(trifluoromethyl)biphenyl and 4,4'-bis[(4-amino-2-trifluoromethyl)phenoxy]-octafluorobiphenyl; aromatic diamines having a hetero atom such as diaminotetraphenyl thiophene; aliphatic and alicyclic diamines such as 1,1-metaxylylenediamine, 1,3-propanediamine, tetramethylenediamine, pentamethylenediamine, hexamethylenediamine, heptamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-metanoindanylenedimethylenediamine, tricyclo[6.2.1.0$^{2.7}$]-undecylenedimethyldiamine and 4,4'-methylenebis(cyclohexylamine); and diaminoorganosiloxanes such as diaminohexamethyldisiloxane.

Of these, preferred are p-phenylenediamine, 4,4'-diaminodiphenylmethane, 1,5-diaminonaphthalene, 2,7-diaminofluorene, 4,4'-diaminodiphenyl ether, 4,4'-(p-phenyleneisopropylidene)bisaniline, 2,2-bis[4-(4-aminophenoxy)phenyl]hexafluoropropane, 2,2'-bis[4-(4-amino-2-trifluoromethylphenoxy)phenyl]hexafluoropropane, 4,4'-diamino-2,2'-bis(trifluoromethyl)biphenyl, 4,4'-bis[(4-amino-2-trifluoromethyl)phenoxy]-octafluorobiphenyl. They may be used alone or in combination of two or more.

The polyimide used in the present invention is obtained by polycondensing the above tetracarboxylic dianhydride component (A) with the above diamine component (B) to obtain a polyamic acid and heating the polyamic acid, if necessary, in the presence of a dehydrating agent and an imidizing catalyst to imidize it. The reaction temperature for imidization by heating is preferably 60 to 300° C., more preferably 100 to 170° C. When the reaction temperature is lower than 60° C., the reaction proceeds slowly and when the reaction temperature is higher than 300° C., the molecular weight of the polyamic acid may greatly lower. The reaction for imidization in the presence of a dehydrating agent and an imidizing catalyst may be carried out in an organic solvent. The reaction temperature is preferably 0 to 180° C., more preferably 60 to 150° C. The dehydrating agent is an acid anhydride such as acetic anhydride, propionic anhydride or trifluoroacetic anhydride. The imidizing catalyst is a tertiary amine such as pyridine, collidine, lutidine or triethylamine. The amount of the dehydrating agent is preferably 1.6 to 20 mols based on 1 mol of the recurring unit of the polyamic acid. The amount of the imidizing catalyst is preferably 0.5 to 10 mols based on 1 mol of the dehydrating agent used. The content of the amic acid residue in the polyimide can be adjusted by the amounts of the imidizing catalyst and the dehydrating agent.

Examples of the halide having the structure (A) used in the production of polyamic acid ester include 1-bromo-3-(4'-chalconyloxy)propane, 1-bromo-3-(4'-chalconyloxy)propane, 1-bromo-4-(4-chalconyloxy)butane, 1-bromo-4-(4'-chalconyloxy)butane, 1-bromo-6-(4-chalconyloxy)hexane, 1-bromo-6-(4'-chalconyloxy)hexane, 1-chloro-3-(4-chalconyloxy)propane, 1-chloro-3-(4'-chalconyloxy)propane, 1-chloro-4-(4-chalconyloxy)butane, 1-chloro-4-(4'-chalconyloxy)butane, 1-chloro-6-(4-chalconyloxy)hexane, 1-chloro-6-(4'-chalconyloxy)hexane, 1-bromo-3-(4'-fluoro-4-chalconyloxy)propane, 1-bromo-3-(4-fluoro-4'-chalconyloxy)propane, 1-bromo-4-(4'-fluoro-4-chalconyloxy)butane, 1-bromo-4-(4-fluoro-4'-chalconyloxy)butane, 1-bromo-6-(4'-fluoro-4-chalconyloxy)hexane, 1-bromo-6-(4-fluoro-4'-chalconyloxy)hexane, 1-chloro-3-(4'-fluoro-4-chalconyloxy)propane, 1-chloro-3-(4-fluoro-4'-chalconyloxy)propane, 1-chloro-4-(4'-fluoro-4-chalconyloxy)butane, 1-chloro-4-(4-fluoro-4'-chalconyloxy)butane, 1-chloro-6-(4'-fluoro-4-chalconyloxy)hexane and 1-chloro-6-(4-fluoro-4'-chalconyloxy)hexane. They may be used alone or in combination of two or more.

Out of these, 1-bromo-6-(4-chalconyloxy)hexane and 1-bromo-6-(4'-fluoro-4-chalconyloxy)hexane are preferred.

Examples of the alcohol having the structure (A) include 3-(4-chalconyloxy)-1-propanol, 3-(4'-chalconyloxy)-1-propanol, 1-4-(4-chalconyloxy)-1-butanol, 4-(4'-chalconyloxy)-1-butanol, 6-(4-chalconyloxy)-1-hexanol, 6-(4'-chalconyloxy)-1-hexanol, 3-(4'-fluoro-4-chalconyloxy)-1-propanol, 3-(4-fluoro-4'-chalconyloxy)-1-propanol, 4-(4'-fluoro-4-chalconyloxy)-1-butanol, 4-(4-fluoro-4'-chalconyloxy)-1-butanol, 6-(4'-fluoro-4-chalconyloxy)-1-hexanol and 6-(4-fluoro-4'-chalconyloxy)-1-hexanol. They may be used alone or in combination of two or more. Out of these, 6-(4-chalconyloxy)-1-hexanol and 6-(4'-fluoro-4-chalconyloxy)-1-hexanol are preferred.

Examples of the phenol having the structure (A) include 4-hydroxychalcone, 4'-hydroxychalcone, 4'-hydroxyfluoro-4-chalcone and 4-fluoro-4'-hydroxychalcone. They may be used alone or in combination of two or more.

For the production of the polyamic acid ester used in the present invention, a halide, alcohol or phenol containing no structure (A) may also be used.

Examples of the above other halide include cetyl bromide, stearyl bromide, methyl bromide, ethyl bromide, propyl bromide, cetyl chloride, stearyl chloride, methyl chloride, ethyl chloride, propyl chloride and 1,1,1-trifluoro-2-iodoethane. Out of these, stearyl bromide, 1,1,1-trifluoro-2-iodoethane, cetyl chloride and stearyl chloride are preferred. They may be used alone or in combination of two or more.

Examples of the other alcohol include cetyl alcohol, stearyl alcohol, 1,1,1-trifluoroethanol, methanol, ethanol, isopropanol and normal propanol. Out of these, cetyl alcohol, stearyl alcohol and 1,1,1-trifluoroethanol are preferred. They may be used alone or in combination of two or more.

Examples of the other phenol include phenol, cresol, 4-cetyloxyphenol, 4-cetylphenol, 4-stearyloxyphenol, 4-stearylphenol and 4-trifluoromethylphenol. They may be used alone or in combination of two or more.

The polyamic acid ester used in the present invention is prepared by obtaining polyamic acid by polycondensing (a) the tetracarboxylic dianhydride component and (b) the diamine component as described above and then reacting the polyamic acid with a halide, an alcohol or a phenol in the presence of a catalyst as required.

Examples of the catalyst used in the reaction between the polyamic acid and the halide as required include basic catalysts such as lithium hydroxide, sodium hydroxide, potassium hydroxide, lithium carbonate, sodium carbonate, potassium carbonate, sodium methoxide, potassium methoxide, sodium ethoxide, potassium ethoxide, sodium propoxide, potassium propoxide, sodium butoxide, potassium butoxide, trimethylamine, triethylamine and pyridine.

Example of the catalyst used in the reaction between the polyamic acid and the alcohol or phenol as required is a dehydrating catalyst such as dicyclohexyl carbodimide and methyl chloroformate. The dehydrating catalyst may be used in combination with a cocatalyst such as dimethylamino pyridine as required.

The polymaleimide, polystyrene and maleimide/styrene copolymer as other examples of the specific polymer are polymers having a chalcone structure represented by the following formula (IV)-2 having the above structure (IV):

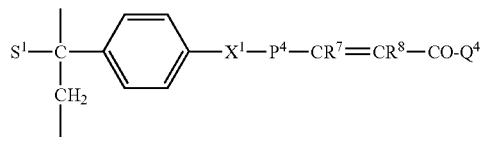

(IV)-2 wherein $P^4$, $Q^4$, $R^7$ and $R^8$ are as defined in the above formula (IV), $S^1$ is a hydrogen atom or monovalent organic group, and $X^1$ is a divalent bond group or single bond, and/or a chalcone structure represented by the following formula (IV)-3 having the above structure (IV):

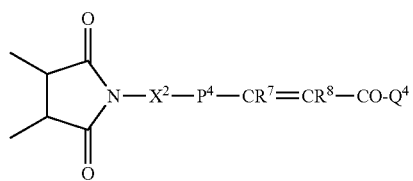

(IV)-3 wherein $P^4$, $Q^4$, $R^7$ and $R^8$ are as defined in the above formula (IV), and $X^2$ is a divalent bond group or single bond, as the polymers having the structure (A).

That is, they are a styrene polymer having a chalcone structure represented by the above formula (IV)-2, a maleimide polymer having a chalcone structure represented by the above formula (IV)-3 and a copolymer having chalcone structures represented by the above formulas (IV)-2 and (IV)-3, respectively.

$X^1$ and $X^2$ in the above formulas (IV)-2 and (IV)-3 are each a divalent bond group or single bond. The divalent bond group is preferably an organic group containing an ether bond and/or an ester bond, more preferably an organic group having 6 to 24 carbon atoms and containing an ether bond and/or an ester bond. It is particularly preferably an organic group containing an ether bond and/or an ester bond and a linear alkylene structure having 6 or more carbon atoms. $S^1$ is a hydrogen atom or monovalent organic group, preferably a hydrogen atom or methyl group.

The above polymers are obtained by radically polymerizing monomer components containing at least one monomer selected from the group consisting of a styrene derivative having a conjugated enone structure (A) represented by the following formula (IV)-2M and a maleimide derivative having a conjugated enone structure (A) represented by the following formula (IV)-3M in the presence of an initiator.

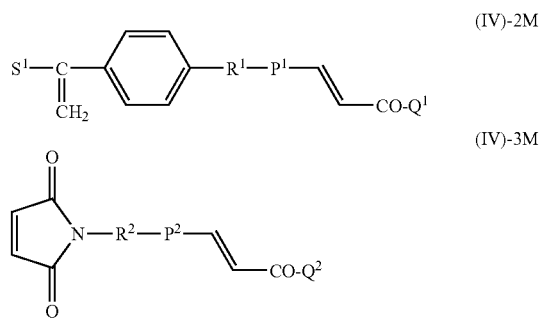

(IV)-2M (IV)-3M

Examples of the styrene derivative having the structure (A) include 4-(4-chalconyloxy)styrene, 4-(4-chalconyloxy)α-methylstyrene, 4-(2-(4-chalconyloxy)ethoxy)styrene, 4-(2-(4-chalconyloxy)ethoxy)α-methylstyrene, 4-(4-(4-chalconyloxy)butoxy)styrene, 4-(4-(4-chalconyloxy)butoxy)α-methylstyrene, 4-(6-(4-chalconyloxy)hexanoxy)styrene, 4-(6-(4-chalconyloxy)hexanoxy)α-methylstyrene, 4-(8-(4-chalconyloxy)octanoxy)styrene, 4-(8-(4-chalconyloxy)octanoxy)α-methylstyrene, 4-(4-chalconylcarboxy)styrene, 4-(4-chalconylcarboxy)α-methylstyrene, 4-(2-(4-chalconylcarboxy)ethoxy)styrene, 4-(2-(4-chalconylcarboxy)ethoxy)α-methylstyrene, 4-(4-(4-chalconylcarboxy)butoxy)styrene, 4-(4-(4-chalconylcarboxy)butoxy)α-methylstyrene, 4-(6-(4-chalconylcarboxy)hexanoxy)styrene, 4-(6-(4-chalconylcarboxy)hexanoxy)α-methylstyrene, 4-(8-(4-chalconylcarboxy)octanoxy)styrene, 4-(8-(4-chalconylcarboxy)octanoxy)α-methylstyrene, 4-(2-(4-chalconyl)ethoxy)styrene, 4-(2-(4-chalconyl)ethoxy)α-methylstyrene, 4-(4-(4-chalconyl)butoxy)styrene, 4-(4-(4-chalconyl)butoxy)α-methylstyrene, 4-(6-(4-chalconyl)hexanoxy)styrene, 4-(6-(4-chalconyl)hexanoxy)α-methylstyrene, 4-(8-(4-chalconyl)octanoxy)styrene, 4-(8-(4-chalconyl)octanoxy)α-methylstyrene, 4-(2-(4-chalconyloxy)ethyl)styrene, 4-(2-(4-chalconyloxy)ethyl)α-methylstyrene, 4-(4-(4-chalconyloxy)butyl)styrene, 4-(4-(4-chalconyloxy)butyl)α-methylstyrene, 4-(6-(4-chalconyloxy)hexyl)styrene, 4-(6-(4-chalconyloxy)hexyl)α-methylstyrene, 4-(8-(4-chalconyloxy)octyl)styrene, 4-(8-(4-chalconyloxy)octyl)α-methylstyrene, 4-(2-(4-chalconylcarboxy)ethyl)styrene, 4-(2-(4-chalconylcarboxy)ethyl)α-methylstyrene, 4-(4-(4-chalconylcarboxy)butyl)styrene, 4-(4-(4-chalconylcarboxy)butyl)α-methylstyrene, 4-(6-(4-chalconylcarboxy)hexyl)styrene, 4-(6-(4-chalconylcarboxy)hexyl)α-methylstyrene, 4-(8-(4-chalconylcarboxy)octyl)styrene, 4-(8-(4-chalconylcarboxy)octyl)α-methylstyrene, 4-(2-(4-chalconyl)ethyl)styrene, 4-(2-(4-chalconyl)ethyl)α-methylstyrene, 4-(4-(4-chalconyl)butyl)styrene, 4-(4-(4-chalconyl)butyl)α-methylstyrene, 4-(6-(4-chalconyl)hexyl)styrene, 4-(6-(4-chalconyl)hexyl)α-methylstyrene, 4-(8-(4-chalconyl)octyl)styrene, 4-(8-(4-chalconyl)octyl)α-methylstyrene, 4-(4-chalconyloxymethyl)styrene, 4-(4-chalconyloxymethyl)α-methylstyrene, 4-(2-(4-chalconyloxy)ethoxymethyl)styrene, 4-(2-(4-chalconyloxy)ethoxymethyl)α-methylstyrene, 4-(4-(4-chalconyloxy)butoxymethyl)styrene, 4-(4-(4-chalconyloxy)butoxymethyl)α-methylstyrene, 4-(6-(4-chalconyloxy)hexanoxymethyl)styrene, 4-(6-(4-chalconyloxy)hexanoxymethyl)α-methylstyrene, 4-(8-(4-chalconyloxy)octanoxymethyl)styrene, 4-(8-(4-chalconyloxy)octanoxymethyl)α-methylstyrene, 4-(4-chalconylcarboxymethyl)styrene, 4-(4-chalconylcarboxymethyl)α-methylstyrene, 4-(2-(4-chalconylcarboxy)ethoxymethyl)styrene, 4-(2-(4- chalconylcarboxy)ethoxymethyl)α-methylstyrene, 4-(4-(4-chalconylcarboxy)butoxymethyl)styrene, 4-(4-(4-chalconylcarboxy)butoxymethyl)α-methylstyrene, 4-(6-(4-chalconylcarboxy)hexanoxymethyl)styrene, 4-(6-(4-chalconylcarboxy)hexanoxymethyl)α-methylstyrene, 4-(8-(4-chalconylcarboxy)octanoxymethyl)styrene, 4-(8-(4-chalconylcarboxy)octanoxymethyl)α-methylstyrene, 4-(2-(4-chalconyl)ethoxymethyl)styrene, 4-(2-(4-chalconyl)ethoxymethyl)α-methylstyrene, 4-(4-(4-chalconyl)butoxymethyl)styrene, 4-(4-(4-chalconyl)butoxymethyl)α-methylstyrene, 4-(6-(4-chalconyl)hexanoxymethyl)styrene, 4-(6-(4-chalconyl)hexanoxymethyl)α-methylstyrene, 4-(8-(4-chalconyl)octanoxymethyl)styrene, 4-(8-(4-chalconyl)octanoxymethyl)α-methylstyrene, 4-(4'-fluoro-4-chalconyloxy)styrene, 4-(4'-fluoro-4-chalconyloxy)α-methylstyrene, 4-(2-(4'-fluoro-4-chalconyloxy)ethoxy)styrene, 4-(2-(4'-fluoro-4-chalconyloxy)ethoxy)α-methylstyrene, 4-(4-(4'-fluoro-4-chalconyloxy)butoxy)styrene, 4-(4-(4'-fluoro-4-chalconyloxy)butoxy)α-methylstyrene, 4-(6-(4'-fluoro-4-chalconyloxy)hexanoxy)styrene, 4-(6-(4'-fluoro-4-chalconyloxy)hexanoxy)α-methylstyrene, 4-(8-(4'-fluoro-4-chalconyloxy)octanoxy)styrene, 4-(8-(4'-fluoro-4-chalconyloxy)octanoxy)α-methylstyrene, 4-(4'-fluoro-4-chalconylcarboxy)styrene, 4-(4'-fluoro-4-chalconylcarboxy)α-methylstyrene, 4-(2-(4'-fluoro-4-chalconylcarboxy)ethoxy)styrene, 4-(2-(4'-fluoro-4-chalconylcarboxy)ethoxy)α-methylstyrene, 4-(4-(4'-fluoro-4-chalconylcarboxy)butoxy)styrene, 4-(4-(4'-fluoro-4-chalconylcarboxy)butoxy)α-methylstyrene, 4-(6-(4'-fluoro-4-chalconylcarboxy)hexanoxy)styrene, 4-(6-(4'-fluoro-4-chalconylcarboxy)hexanoxy)α-methylstyrene, 4-(8-(4'-fluoro-4-chalconylcarboxy)octanoxy)styrene, 4-(8-(4'-fluoro-4-chalconylcarboxy)octanoxy)α-methylstyrene, 4-(2-(4'-fluoro-4-chalconyl)ethoxy)styrene, 4-(2-(4'-fluoro-4-chalconyl)ethoxy)α-methylstyrene, 4-(4-(4'-fluoro-4-chalconyl)butoxy)styrene, 4-(4-(4'-fluoro-4-chalconyl)butoxy)α-methylstyrene, 4-(6-(4'-fluoro-4-chalconyl)hexanoxy)styrene, 4-(6-(4'-fluoro-4-chalconyl)hexanoxy)α-methylstyrene, 4-(8-(4'-fluoro-4-chalconyl)octanoxy)styrene, 4-(8-(4'-fluoro-4-chalconyl)octanoxy)α-methylstyrene, 4-(2-(4'-fluoro-4-chalconyloxy)ethyl)styrene, 4-(2-(4'-fluoro-4-chalconyloxy)ethyl)α-methylstyrene, 4-(4-(4'-fluoro-4-chalconyloxy)butyl)styrene, 4-(4-(4'-fluoro-4-chalconyloxy)butyl)α-methylstyrene, 4-(6-(4'-fluoro-4-chalconyloxy)hexyl)styrene, 4-(6-(4'-fluoro-4-chalconyloxy)hexyl)α-methylstyrene, 4-(8-(4'-fluoro-4-chalconyloxy)octyl)styrene, 4-(8-(4'-fluoro-4-chalconyloxy)octyl)α-methylstyrene, 4-(2-(4'-fluoro-4-chalconylcarboxy)ethyl)styrene, 4-(2-(4'-fluoro-4-chalconylcarboxy)ethyl)α-methylstyrene, 4-(4-(4'-fluoro-4-chalconylcarboxy)butyl)styrene, 4-(4-(4'-fluoro-4-chalconylcarboxy)butyl)α-methylstyrene, 4-(6-(4'-fluoro-4-chalconylcarboxy)hexyl)styrene, 4-(6-(4'-fluoro-4-chalconylcarboxy)hexyl)α-methylstyrene, 4-(8-(4'-fluoro-4-chalconylcarboxy)octyl)styrene, 4-(8-(4'-fluoro-4-chalconylcarboxy)octyl)α-methylstyrene, 4-(2-(4'-fluoro-4-chalconyl)ethyl)styrene, 4-(2-(4'-fluoro-4-chalconyl)ethyl)α-methylstyrene, 4-(4-(4'-fluoro-4-chalconyl)butyl)styrene, 4-(4-(4'-fluoro-4-chalconyl)butyl)α-methylstyrene, 4-(6-(4'-fluoro-4-chalconyl)hexyl)styrene, 4-(6-(4'-fluoro-4-chalconyl)hexyl)α-methylstyrene, 4-(8-(4'-fluoro-4-chalconyl)octyl)styrene, 4-(8-(4'-fluoro-4-chalconyl)octyl)α-methylstyrene, 4-(4'-fluoro-4-chalconyloxymethyl)styrene, 4-(4'-fluoro-4-chalconyloxymethyl)α-methylstyrene, 4-(2-(4'-fluoro-4-chalconyloxy)ethoxymethyl)styrene, 4-(2-(4'-fluoro-4-chalconyloxy)ethoxymethyl)α-methylstyrene, 4-(4-(4'-fluoro-4-chalconyloxy)butoxymethyl)styrene, 4-(4-(4'-fluoro-4-chalconyloxy)butoxymethyl)α-methylstyrene, 4-(6-(4'-fluoro-4-chalconyloxy)hexanoxymethyl)styrene, 4-(6-(4'-fluoro-4-chalconyloxy)hexanoxymethyl)α-methylstyrene, 4-(8-(4'-fluoro-4-chalconyloxy)octanoxymethyl)styrene, 4-(8-(4'-fluoro-4-chalconyloxy)octanoxymethyl)α-methylstyrene, 4-(2-(4'-fluoro-4-chalconyl)ethoxymethyl)styrene, 4-(2-(4'-fluoro-4-chalconyl)ethoxymethyl)α-methylstyrene, 4-(4'-fluoro-4-carchonylcarboxymethyl)styrene, 4-(4'-fluoro-4-carchonylcarboxymethyl)α-methylstyrene, 4-(2-(4'-fluoro-4-carchonylcarboxy)ethoxymethyl)styrene, 4-(2-(4'-fluoro-4-carchonylcarboxy)ethoxymethyl)α-methylstyrene, 4-(4-(4'-fluoro-4-chalconylcarboxy)butoxymethyl)styrene, 4-(4-(4'-fluoro-4-chalconylcarboxy)butoxymethyl)α-methylstyrene, 4-(6-(4'-fluoro-4-chalconylcarboxy)hexanoxymethyl)styrene, 4-(6-(4'-fluoro-4-chalconylcarboxy)hexanoxymethyl)α-methylstyrene, 4-(8-(4'-fluoro-4-chalconylcarboxy)octanoxymethyl)styrene, 4-(8-(4'-fluoro-4-chalconylcarboxy)octanoxymethyl)α-methylstyrene, 4-(2-(4'-fluoro-4-carchonyl)ethoxymethyl)styrene, 4-(2-(4'-fluoro-4-carchonyl)ethoxymethyl)α-methylstyrene, 4-(4-(4'-fluoro-4-chalconyl)butoxymethyl)styrene, 4-(4-(4'-fluoro-4-chalconyl)butoxymethyl)α-methylstyrene, 4-(6-(4'-fluoro-4-chalconyl)hexanoxymethyl)styrene, 4-(6-(4'-fluoro-4-chalconyl)hexanoxymethyl)α-methylstyrene, 4-(8-(4'-fluoro-4-chalconyl)octanoxymethyl)styrene, 4-(8-(4'-fluoro-4-chalconyl)octanoxymethyl)α-methylstyrene, 4-((3-(4-vinylphenyl)propionyloxy)-4'-fluorochalcone, 4-((3-(4-vinylphenyl)propionyloxy)chalcone and compounds represented by the following formulas (71) to (78);

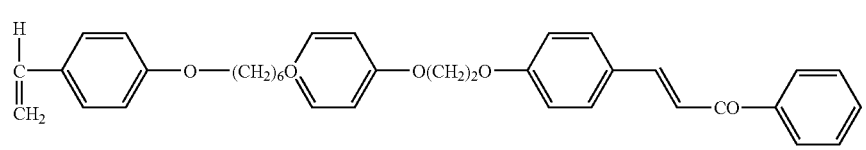

(71)

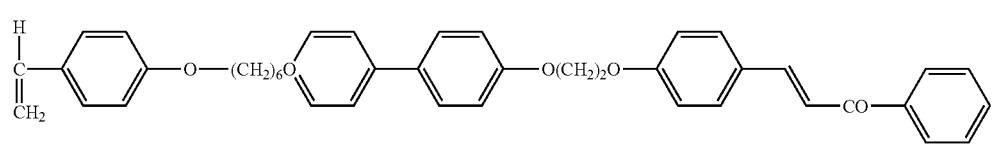

(72)

-continued

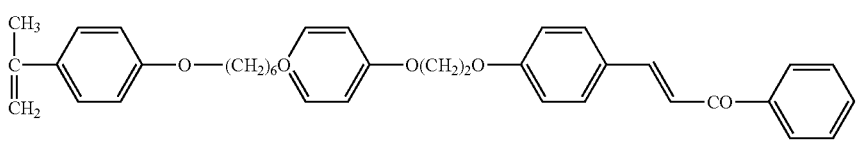 (73)

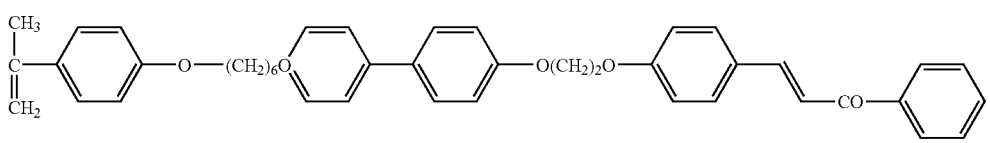 (74)

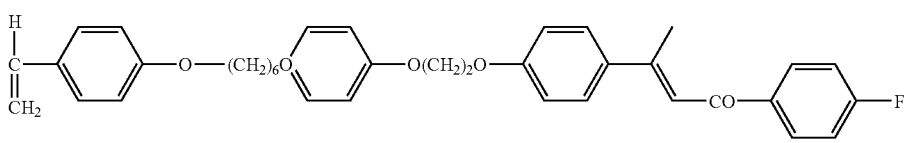 (75)

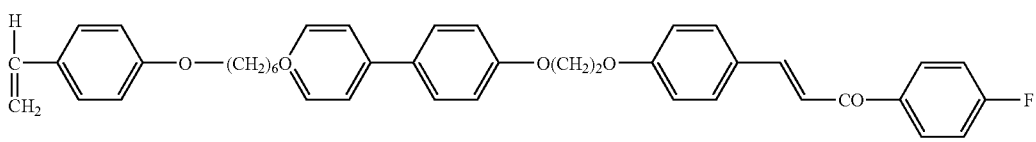 (76)

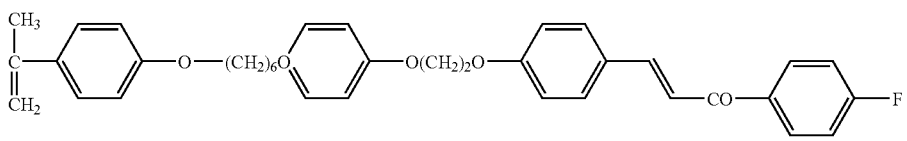 (77)

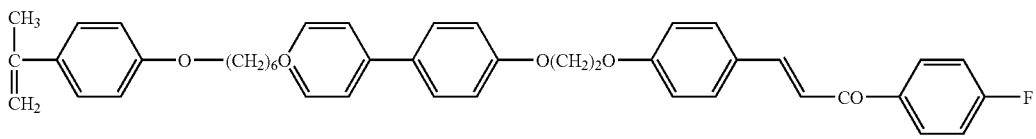 (78)

4-(8-(4-chalconyloxy)octanoxy)styrene, 4-(8-(4-chalconyloxy)octanoxy)α-methylstyrene, 4-(10-(4-chalconyloxy)decyloxy)styrene, 4-(10-(4-chalconyloxy)decyloxy)α-methylstyrene, 4-(12-(4-chalconyloxy)lauryloxy)styrene, 4-(12-(4-chalconyloxy)lauryloxy)α-methylstyrene, 4-(18-(4-chalconyloxy)stearyloxy)styrene, 4-(18-(4-chalconyloxy)stearyloxy)α-methylstyrene, 4-(8-(4-chalconylcarboxy)octanoxy)styrene, 4-(8-(4-chalconylcarboxy)octanoxy)α-methylstyrene, 4-(10-(4-chalconylcarboxy)decyloxy)styrene, 4-(10-(4-chalconylcarboxy)decyloxy)α-methylstyrene, 4-(12-(4-chalconylcarboxy)lauryloxy)styrene, 4-(12-(4-chalconylcarboxy)lauryloxy)α-methylstyrene, 4-(18-(4-chalconylcarboxy)stearyloxy)styrene, 4-(18-(4-chalconylcarboxy)stearyloxy)α-methylstyrene, 4-(8-(4-chalconyl)octanoxy)styrene, 4-(8-(4-chalconyl)octanoxy)α-methylstyrene, 4-(10-(4-chalconyl)decyloxy)styrene, 4-(10-(4-chalconyl)decyloxy)α-methylstyrene, 4-(12-(4-chalconyl)lauryloxy)styrene, 4-(12-(4-chalconyl)lauryloxy)α-methylstyrene, 4-(18-(4-chalconyl)stearyloxy)styrene, 4-(18-(4-chalconyl)stearyloxy)α-methylstyrene, 4-(8-(4-chalconyloxy)octyl)styrene, 4-(8-(4-chalconyloxy)octyl)α-methylstyrene, 4-(10-(4-chalconyloxy)decyl)styrene, 4-(10-(4-chalconyloxy)decyl)α-methylstyrene, 4-(12-(4-chalconyloxy)lauryl)styrene, 4-(12-(4-chalconyloxy)lauryl)α-methylstyrene, 4-(18-(4-chalconyloxy)stearyl)styrene, 4-(18-(4-chalconyloxy)stearyl)α-methylstyrene, 4-(8-(4-chalconylcarboxy)octyl)styrene, 4-(8-(4-chalconylcarboxy)octyl)α-methylstyrene, 4-(10-(4-chalconylcarboxy)decyl)styrene, 4-(10-(4-chalconylcarboxy)decyl)α-methylstyrene, 4-(12-(4-chalconylcarboxy)lauryl)styrene, 4-(12-(4-chalconylcarboxy)lauryl)α-methylstyrene, 4-(18-(4-chalconylcarboxy)stearyl)styrene, 4-(18-(4-chalconylcarboxy)stearyl)α-methylstyrene, 4-(8-(4-chalconyl)octyl)styrene, 4-(8-(4-chalconyl)octyl)α-methylstyrene, 4-(10-(4-chalconyl)decyl)styrene, 4-(10-(4-chalconyl)decyl)α-methylstyrene, 4-(12-(4-chalconyl)lauryl)styrene, 4-(12-(4-chalconyl)lauryl)α-methylstyrene, 4-(18-(4-chalconyl)stearyl)styrene, 4-(18-(4-chalconyl)stearyl)α-methylstyrene, 4-(8-(4-chalconyloxy)octoxymethyl)styrene, 4-(8-(4-chalconyloxy)octoxymethyl)α-methylstyrene, 4-(10-(4-chalconyloxy)decyloxymethyl)styrene, 4-(10-(4-chalconyloxy)decyloxymethyl)α-methylstyrene, 4-(12-(4-chalconyloxy)lauryloxymethyl)styrene, 4-(12-(4-chalconyloxy)lauryloxymethyl)α-methylstyrene, 4-(18-(4-chalconyloxy)stearyloxymethyl)styrene, 4-(18-(4-chalconyloxy)stearyloxymethyl)α-methylstyrene, 4-(8-(4-chalconylcarboxy)octoxymethyl)styrene, 4-(8-(4-chalconylcarboxy)octoxymethyl)α-methylstyrene, 4-(10-(4-chalconylcarboxy)decyloxymethyl)styrene, 4-(10-(4-chalconylcarboxy)decyloxymethyl)α-methylstyrene, 4-(12-(4-chalconylcarboxy)lauryloxymethyl)styrene, 4-(12-(4-chalconylcarboxy)lauryloxymethyl)α-methylstyrene, 4-(18-(4-chalconylcarboxy)stearyloxymethyl)styrene, 4-(18-(4-chalconylcarboxy)stearyloxymethyl)α-methylstyrene, 4-(8-(4-chalconyl)octoxymethyl)styrene, 4-(8-(4-chalconyl)

octoxymethyl)α-methylstyrene, 4-(10-(4-chalconyl)decyloxymethyl)styrene, 4-(10-(4-chalconyl)decyloxymethyl)α-methylstyrene, 4-(12-(4-chalconyl)lauryloxymethyl)styrene, 4-(12-(4-chalconyl)lauryloxymethyl)α-methylstyrene, 4-(18-(4-chalconyl)stearyloxymethyl)styrene, 4-(18-(4-chalconyl)stearyloxymethyl)α-methylstyrene, 4-(8-(4'-fluoro-4-chalconyloxy)octoxy)styrene, 4-(8-(4'-fluoro-4-chalconyloxy)octoxy)α-methylstyrene, 4-(10-(4'-fluoro-4-chalconyloxy)decyloxy)styrene, 4-(10-(4'-fluoro-4-chalconyloxy)decyloxy)α-methylstyrene, 4-(12-(4'-fluoro-4-chalconyloxy)lauryloxy)styrene, 4-(12-(4'-fluoro-4-chalconyloxy)lauryloxy)α-methylstyrene, 4-(18-(4'-fluoro-4-chalconyloxy)stearyloxy)styrene, 4-(18-(4'-fluoro-4-chalconyloxy)stearyloxy)α-methylstyrene, 4-(8-(4'-fluoro-4-chalconylcarboxy)octoxy)styrene, 4-(8-(4'-fluoro-4-chalconylcarboxy)octoxy)α-methylstyrene, 4-(10-(4'-fluoro-4-chalconylcarboxy)decyloxy)styrene, 4-(10-(4'-fluoro-4-chalconylcarboxy)decyloxy)α-methylstyrene, 4-(12-(4'-fluoro-4-chalconylcarboxy)lauryloxy)styrene, 4-(12-(4'-fluoro-4-chalconylcarboxy)lauryloxy)α-methylstyrene, 4-(18-(4'-fluoro-4-chalconylcarboxy)stearyloxy)styrene, 4-(18-(4'-fluoro-4-chalconylcarboxy)stearyloxy)α-methylstyrene, 4-(8-(4'-fluoro-4-chalconyl)octoxy)styrene, 4-(8-(4'-fluoro-4-chalconyl)octoxy)α-methylstyrene, 4-(10-(4'-fluoro-4-chalconyl)decyloxy)styrene, 4-(10-(4'-fluoro-4-chalconyl)decyloxy)α-methylstyrene, 4-(12-(4'-fluoro-4-chalconyl)lauryloxy)styrene, 4-(12-(4'-fluoro-4-chalconyl)lauryloxy)α-methylstyrene, 4-(18-(4'-fluoro-4-chalconyl)stearyloxy)styrene, 4-(18-(4'-fluoro-4-chalconyl)stearyloxy)α-methylstyrene, 4-(8-(4'-fluoro-4-chalconyloxy)octyl)styrene, 4-(8-(4'-fluoro-4-chalconyloxy)octyl)α-methylstyrene, 4-(10-(4'-fluoro-4-chalconyloxy)decyl)styrene, 4-(10-(4'-fluoro-4-chalconyloxy)decyl)α-methylstyrene, 4-(12-(4'-fluoro-4-chalconyloxy)lauryl)styrene, 4-(12-(4'-fluoro-4-chalconyloxy)lauryl)α-methylstyrene, 4-(18-(4'-fluoro-4-chalconyloxy)stearyl)styrene, 4-(18-(4'-fluoro-4-chalconyloxy)stearyl)α-methylstyrene, 4-(8-(4'-fluoro-4-chalconylcarboxy)octyl)styrene, 4-(8-(4'-fluoro-4-chalconylcarboxy)octyl)α-methylstyrene, 4-(10-(4'-fluoro-4-chalconylcarboxy)decyl)styrene, 4-(10-(4'-fluoro-4-chalconylcarboxy)decyl)α-methylstyrene, 4-(12-(4'-fluoro-4-chalconylcarboxy)lauryl)styrene, 4-(12-(4'-fluoro-4-chalconylcarboxy)lauryl)α-methylstyrene, 4-(18-(4'-fluoro-4-chalconylcarboxy)stearyl)styrene, 4-(18-(4'-fluoro-4-chalconylcarboxy)stearyl)α-methylstyrene, 4-(8-(4'-fluoro-4-chalconyl)octyl)styrene, 4-(8-(4'-fluoro-4-chalconyl)octyl)α-methylstyrene, 4-(10-(4'-fluoro-4-chalconyl)decyl)styrene, 4-(10-(4'-fluoro-4-chalconyl)decyl)α-methylstyrene, 4-(12-(4'-fluoro-4-chalconyl)lauryl)styrene, 4-(12-(4'-fluoro-4-chalconyl)lauryl)α-methylstyrene, 4-(18-(4'-fluoro-4-chalconyl)stearyl)styrene, 4-(18-(4'-fluoro-4-chalconyl)stearyl)α-methylstyrene, 4-(8-(4'-fluoro-4-chalconyloxy)octoxymethyl)styrene, 4-(8-(4'-fluoro-4-chalconyloxy)octoxymethyl)α-methylstyrene, 4-(10-(4'-fluoro-4-chalconyloxy)decyloxymethyl)styrene, 4-(10-(4'-fluoro-4-chalconyloxy)decyloxymethyl)α-methylstyrene, 4-(12-(4'-fluoro-4-chalconyloxy)lauryloxymethyl)styrene, 4-(12-(4'-fluoro-4-chalconyloxy)lauryloxymethyl)α-methylstyrene, 4-(18-(4'-fluoro-4-chalconyloxy)stearyloxymethyl)styrene, 4-(18-(4'-fluoro-4-chalconyloxy)stearyloxymethyl)α-methylstyrene, 4-(8-(4'-fluoro-4-chalconyl)octoxymethyl)styrene, 4-(8-(4'-fluoro-4-chalconyl)octoxymethyl)α-methylstyrene, 4-(8-(4'-fluoro-4-chalconylcarboxy)octoxymethyl)styrene, 4-(8-(4'-fluoro-4-chalconylcarboxy)octoxymethyl)α-methylstyrene, 4-(10-(4'-fluoro-4-chalconylcarboxy)decyloxymethyl)styrene, 4-(10-(4'-fluoro-4-chalconylcarboxy)decyloxymethyl)α-methylstyrene, 4-(12-(4'-fluoro-4-chalconylcarboxy)lauryloxymethyl)styrene, 4-(12-(4'-fluoro-4-chalconylcarboxy)lauryloxymethyl)α-methylstyrene, 4-(18-(4'-fluoro-4-chalconylcarboxy)stearyloxymethyl)styrene, 4-(18-(4'-fluoro-4-chalconylcarboxy)stearyloxymethyl)α-methylstyrene, 4-(8-(4'-fluoro-4-chalconyl)octoxymethyl)styrene, 4-(8-(4'-fluoro-4-chalconyl)octoxymethyl)α-methylstyrene, 4-(10-(4'-fluoro-4-chalconyl)decyloxymethyl)styrene, 4-(10-(4'-fluoro-4-chalconyl)decyloxymethyl)α-methylstyrene, 4-(12-(4'-fluoro-4-chalconyl)lauryloxymethyl)styrene, 4-(12-(4'-fluoro-4-chalconyl)lauryloxymethyl)α-methylstyrene, 4-(18-(4'-fluoro-4-chalconyl)stearyloxymethyl)styrene, 4-(18-(4'-fluoro-4-chalconyl)stearyloxymethyl)α-methylstyrene, and compounds represented by the following formulas (79) to (86).

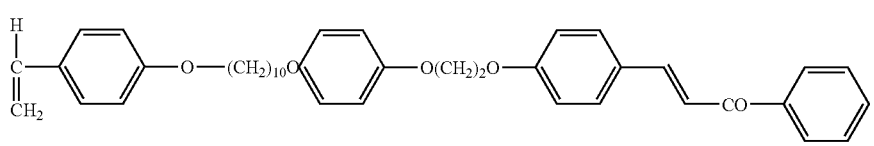

(79)

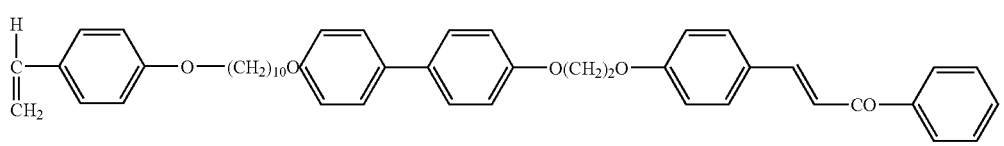

(80)

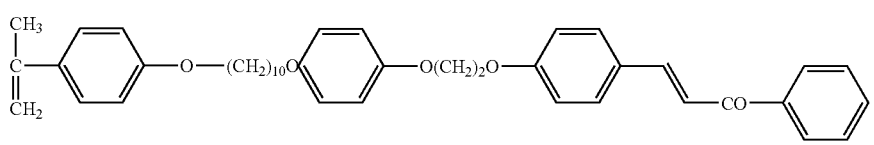

(81)

-continued

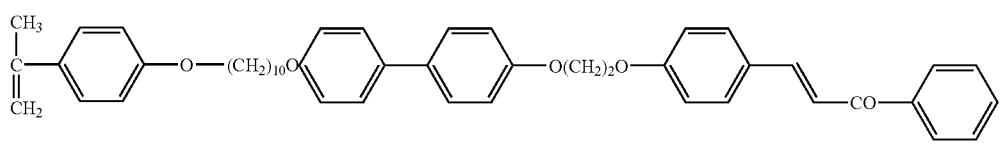
(82)

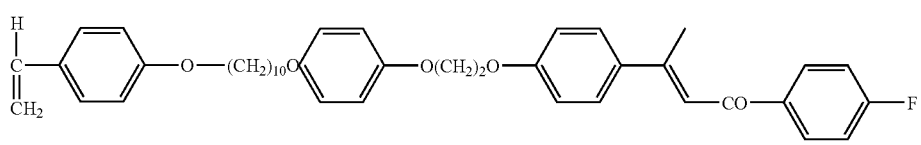
(83)

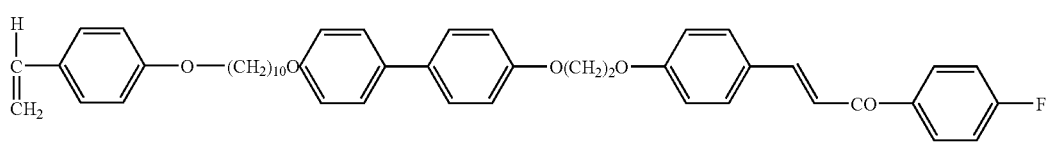
(84)

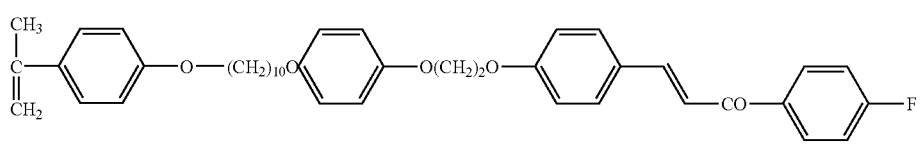
(85)

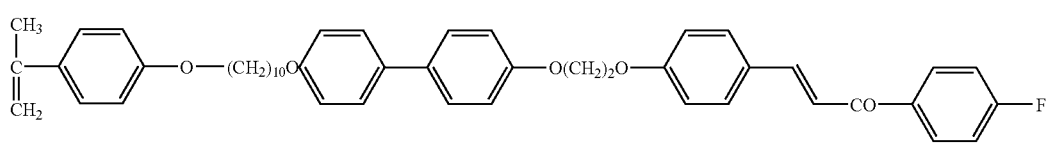
(86)

Out of these, 4-(6-(4-chalconyloxy)hexanoxy)styrene, compounds represented by the above formulas (71) to (78), 4-(10-(4-chalconyloxy)decyloxy)styrene and compounds represented by the above formulas (79) to (86) are preferred. They may be used alone or in combination of two or more.

Examples of the maleimide derivative having the structure (A) include 4-(4-chalconyloxy)phenylmaleimide, 4-(2-(4-chalconyloxy)ethoxy)phenylmaleimide, 4-(4-(4-chalconyloxy)butoxy)phenylmaleimide, 4-(6-(4-chalconyloxy)hexanoxy)phenylmaleimide, 4-(8-(4-chalconyloxy)octanoxy)phenylmaleimide, 4-(4-chalconylcarboxy)phenylmaleimide, 4-(2-(4-chalconylcarboxy)ethoxy)phenylmaleimide, 4-(4-(4-chalconylcarboxy)butoxy)phenylmaleimide, 4-(6-(4-chalconylcarboxy)hexanoxy)phenylmaleimide, 4-(8-(4-chalconylcarboxy)octanoxy)phenylmaleimide, 4-(2-(4-chalconyl)ethoxy)phenylmaleimide, 4-(4-(4-chalconyl)butoxy)phenylmaleimide, 4-(6-(4-chalconyl)hexanoxy)phenylmaleimide, 4-(8-(4-chalconyl)octanoxy)phenylmaleimide, 4-(2-(4-chalconyloxy)ethyl)phenylmaleimide, 4-(4-(4-chalconyloxy)butyl)phenylmaleimide, 4-(6-(4-chalconyloxy)hexyl)phenylmaleimide, 4-(8-(4-chalconyloxy)octyl)phenylmaleimide, 4-(2-(4-chalconylcarboxy)ethyl)phenylmaleimide, 4-(4-(4-chalconylcarboxy)butyl)phenylmaleimide, 4-(6-(4-chalconylcarboxy)hexyl)phenylmaleimide, 4-(8-(4-chalconylcarboxy)octyl)phenylmaleimide, 4-(2-(4-chalconyl)ethyl)phenylmaleimide, 4-(4-(4-chalconyl)butyl)phenylmaleimide, 4-(6-(4-chalconyl)hexyl)phenylmaleimide, 4-(8-(4-chalconyl)octyl)phenylmaleimide, 4-(4'-fluoro-4-chalconyloxy)phenylmaleimide, 4-(2-(4'-fluoro-4-chalconyloxy)ethoxy)phenylmaleimide, 4-(4-(4'-fluoro-4-chalconyloxy)butoxy)phenylmaleimide, 4-(6-(4'-fluoro-4-chalconyloxy)hexanoxy)phenylmaleimide, 4-(8-(4'-fluoro-4-chalconyloxy)octanoxy)phenylmaleimide, 4-(4'-fluoro-4-chalconylcarboxy)phenylmaleimide, 4-(2-(4'-fluoro-4-chalconylcarboxy)ethoxy) phenylmaleimide, 4-(4-(4'-fluoro-4-chalconylcarboxy)butoxy)phenylmaleimide, 4-(6-(4'-fluoro-4-chalconylcarboxy)hexanoxy)phenylmaleimide, 4-(8-(4'-fluoro-4-chalconylcarboxy)octanoxy)phenylmaleimide, 4-(2-(4'-fluoro-4-chalconyl)ethoxy)phenylmaleimide, 4-(4-(4'-fluoro-4-chalconyl)butoxy)phenylmaleimide, 4-(6-(4'-fluoro-4-chalconyl)hexanoxy)phenylmaleimide, 4-(8-(4'-fluoro-4-chalconyl)octanoxy)phenylmaleimide, 4-(2-(4'-fluoro-4-chalconyloxy)ethyl)phenylmaleimide, 4-(4-(4'-fluoro-4-chalconyloxy)butyl)phenylmaleimide, 4-(6-(4'-fluoro-4-chalconyloxy)hexyl)phenylmaleimide, 4-(8-(4'-fluoro-4-chalconyloxy)octyl)phenylmaleimide, 4-(2-(4'-fluoro-4-chalconylcarboxy)ethyl)phenylmaleimide, 4-(4-(4'-fluoro-4-chalconylcarboxy)butyl)phenylmaleimide, 4-(6-(4'-fluoro-4-chalconylcarboxy)hexyl)phenylmaleimide, 4-(8-(4'-fluoro-4-chalconylcarboxy)octyl)phenylmaleimide, 4-(2-(4'-fluoro-4-chalconyl)ethyl)phenylmaleimide, 4-(4-(4'-fluoro-4-chalconyl)butyl)phenylmaleimide, 4-(6-(4'-fluoro-4-chalconyl)hexyl)phenylmaleimide, 4-(8-(4'-fluoro-4-chalconyl)octyl)phenylmaleimide, 4-(8-(4'-fluoro-4-chalconyloxy)octanoxymethyl)phenylmaleimide, 4-(8-(4'-fluoro-4-chalconylcarboxy)octanoxymethyl) phenylmaleimide, 4-(2-(4'-fluoro-4-chalconyl)ethoxymethyl)phenylmaleimide, 4-(4-(4'-fluoro-4-chalconyl)butoxymethyl)phenylmaleimide, 4-(6-(4'-fluoro-4-chalconyl)hexanoxymethyl)phenylmaleimide, 4-(8-(4'-fluoro-4-chalconyl)octanoxymethyl)phenylmaleimide and compounds represented by the following formulas (91) to (94).

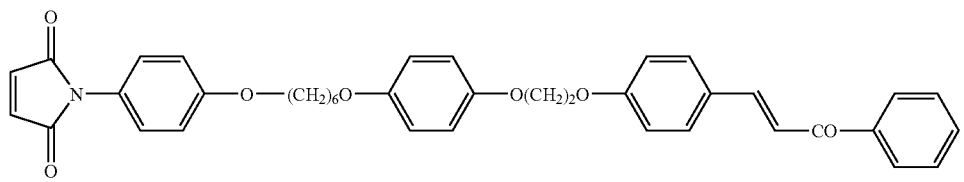

(91)

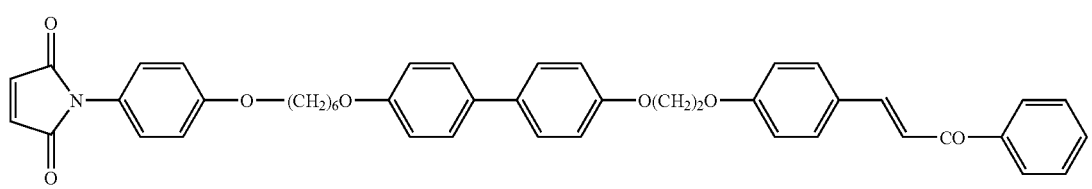

(92)

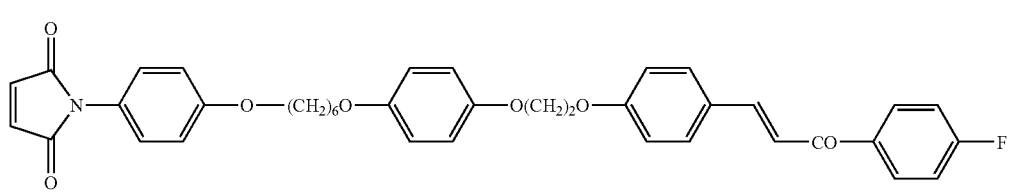

(93)

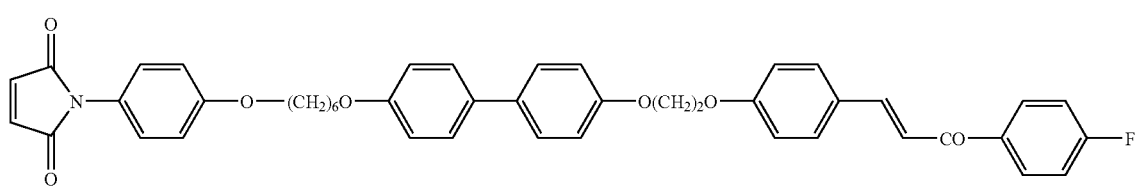

(94)

4-(8-(4-chalconyloxy)octoxy)phenylmaleimide, 4-(10-(4-chalconyloxy)decyloxy)phenylmaleimide, 4-(12-(4-chalconyloxy)lauryloxy)phenylmaleimide, 4-(18-(4-chalconyloxy)stearyloxy)phenylmaleimide, 4-(8-(4-chalconylcarboxy)octoxy)phenylmaleimide, 4-(10-(4-chalconylcarboxy)decyloxy)phenylmaleimide, 4-(12-(4-chalconylcarboxy)lauryloxy)phenylmaleimide, 4-(18-(4-chalconylcarboxy)stearyloxy)phenylmaleimide, 4-(8-(4-chalconyl)octoxy)phenylmaleimide, 4-(10-(4-chalconyl)decyloxy)phenylmaleimide, 4-(12-(4-chalconyl)lauryloxy)phenylmaleimide, 4-(18-(4-chalconyl)stearyloxy)phenylmaleimide, 4-(8-(4-chalconyloxy)octyl)phenylmaleimide, 4-(10-(4-chalconyloxy)decyl)phenylmaleimide, 4-(12-(4-chalconyloxy)lauryl)phenylmaleimide, 4-(18-(4-chalconyloxy)stearyl)phenylmaleimide, 4-(8-(4-chalconylcarboxy)octyl)phenylmaleimide, 4-(10-(4-chalconylcarboxy)decyl)phenylmaleimide, 4-(12-(4-chalconylcarboxy)lauryl)phenylmaleimide, 4-(18-(4-chalconylcarboxy)stearyl)phenylmaleimide, 4-(8-(4-chalconyl)octyl)phenylmaleimide, 4-(10-(4-chalconyl)decyl)phenylmaleimide, 4-(12-(4-chalconyl)lauryl)phenylmaleimide, 4-(18-(4-chalconyl)stearyl)phenylmaleimide, 4-(8-(4'-fluoro-4-chalconyloxy)octoxy)phenylmaleimide, 4-(10-(4'-fluoro-4-chalconyloxy)decyloxy)phenylmaleimide, 4-(12-(4'-fluoro-4-chalconyloxy)lauryloxy)phenylmaleimide, 4-(18-(4'-fluoro-4-chalconyloxy)stearyloxy)phenylmaleimide, 4-(8-(4'-fluoro-4-chalconylcarboxy)octoxy)phenylmaleimide, 4-(10-(4'-fluoro-4-chalconylcarboxy)decyloxy)phenylmaleimide, 4-(12-(4'-fluoro-4-chalconylcarboxy)lauryloxy)phenylmaleimide, 4-(18-(4'-fluoro-4-chalconylcarboxy)stearyloxy)phenylmaleimide, 4-(8-(4'-fluoro-4-chalconyl)octoxy)phenylmaleimide, 4-(10-(4'-fluoro-4-chalconyl)decyloxy)phenylmaleimide, 4-(12-(4'-fluoro-4-chalconyl)lauryloxy)phenylmaleimide, 4-(18-(4'-fluoro-4-chalconyl)stearyloxy)phenylmaleimide, 4-(8-(4'-fluoro-4-chalconyloxy)octyl)phenylmaleimide, 4-(10-(4'-fluoro-4-chalconyloxy)decyl)phenylmaleimide, 4-(12-(4'-fluoro-4-chalconyloxy)lauryl)phenylmaleimide, 4-(18-(4'-fluoro-4-chalconyloxy)stearyl)phenylmaleimide, 4-(8-(4'-fluoro-4-chalconylcarboxy)octyl)phenylmaleimide, 4-(10-(4'-fluoro-4-chalconylcarboxy)decyl)phenylmaleimide, 4-(12-(4'-fluoro-4-chalconylcarboxy)lauryl)phenylmaleimide, 4-(18-(4'-fluoro-4-chalconylcarboxy)stearyl)phenylmaleimide, 4-(8-(4'-fluoro-4-chalconyl)octyl)phenylmaleimide, 4-(10-(4'-fluoro-4-chalconyl)decyl)phenylmaleimide, 4-(12-(4'-fluoro-4-chalconyl)lauryl)phenylmaleimide, 4-(18-(4'-fluoro-4-chalconyl)stearyl)phenylmaleimide, 4-(8-(4'-fluoro-4-chalconyloxy)octanoxymethyl)phenylmaleimide, 4-(8-(4'-fluoro-4-chalconylcarboxy)octanoxymethyl)phenylmaleimide, 4-(8-(4'-fluoro-4-chalconyl)octoxymethyl)phenylmaleimide, 4-(10-(4'-fluoro-4-chalconyl)decyloxymethyl)phenylmaleimide, 4-(12-(4'-fluoro-4-chalconyl)lauryloxymethyl)phenylmaleimide, 4-(18-(4'-fluoro-4-chalconyl)stearyloxymethyl)phenylmaleimide, and compounds represented by the following formulas (95) to (98).

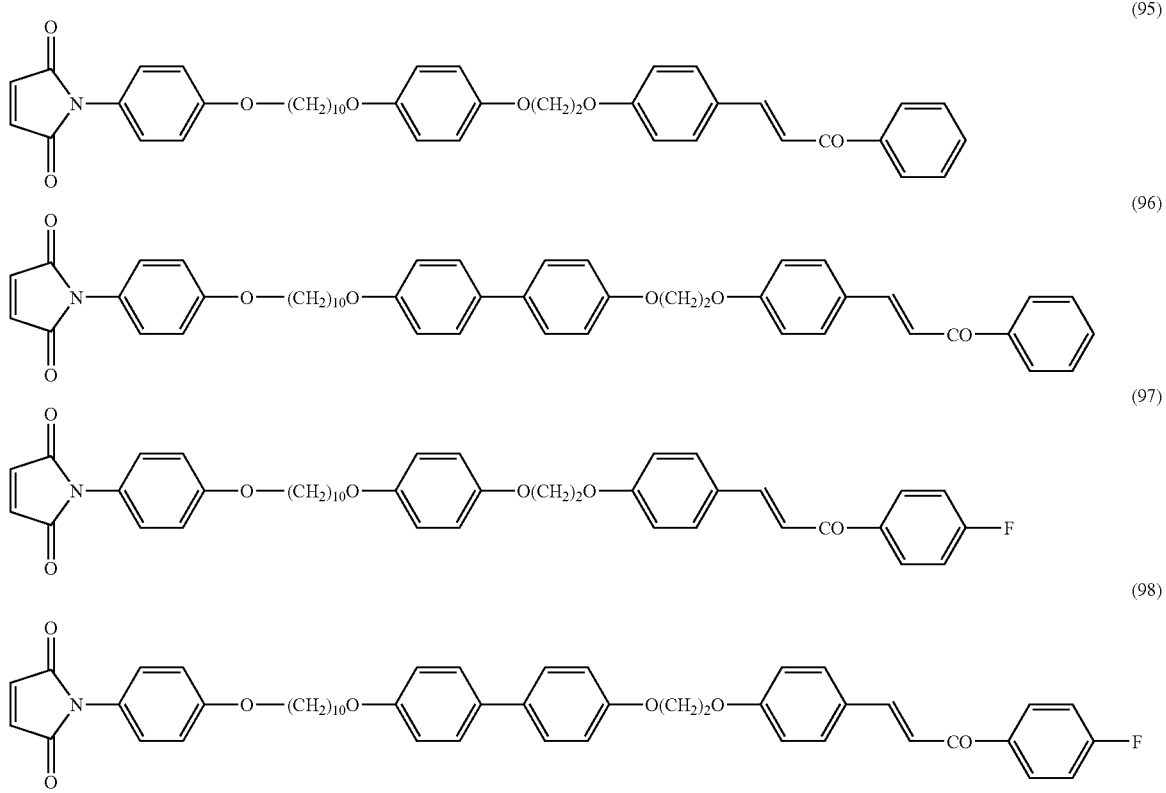

Out of these, preferred are 4-(6-(4-chalconyloxy)hexyloxy)phenylmaleimide, 4-(8-(4-chalconyloxy)octyloxy)phenylmaleimide, 4-(6-(4'-fluoro-4-chalconyloxy)hexyl)phenylmaleimide, 4-(8-(4'-fluoro-4-chalconyloxy)octyl)phenylmaleimide, compounds represented by the above formulas (91) to (94), 4-(12-(4-chalconyloxy)lauryloxy)phenylmaleimide, 4-(18-(4-chalconyloxy)stearyloxy)phenylmaleimide, 4-(12-(4'-fluoro-4-chalconyloxy)lauryl)phenylmaleimide, 4-(18-(4'-fluoro-4-chalconyloxy)stearyl)phenylmaleimide, and compounds represented by the above formulas (95) to (98). They may be used alone or in combination of two or more. They may also be used in conjunction with the above styrene derivative.

Examples of the styrene derivative having the structure (B) include p-trifluoromethylstyrene, p-trifluoromethyl-α-methylstyrene, p-trifluoromethoxystyrene, p-trifluoromethoxy-α-methylstyrene, 4-(2,2,2-trifluoroethoxy)styrene, 4-(2,2,2-trifluoroethoxy)-α-methylstyrene, p-cetyloxystyrene, p-cetyloxy-α-methylstyrene, p-palmitoyloxystyrene, p-palmitoyloxy-α-methylstyrene, p-stearyloxystyrene, p-stearyloxy-α-methylstyrene, p-stearoyloxystyrene, p-stearoyloxy-α-methylstyrene, p-cholesteryloxystyrene, p-cholesteryloxy-α-methylstyrene, p-cholestanyloxystyrene and p-cholestanyloxy-α-methylstyrene.

Examples of the maleimide derivative having the structure (B) include 4-trifluoromethylphenylmaleimide, 4-trifluoromethoxyphenylmaleimide, 4-(2,2,2-trifluoroethoxy)phenylmaleimide, 4-cetyloxyphenylmaleimide, 4-palmitoyloxyphenylmaleimide, 4-stearyloxyphenylmaleimide, 4-stearoyloxyphenylmaleimide, 4-cholesteryloxyphenylmaleimide and 4-cholestanyloxyphenylmaleimide.

The polymaleimide, polystyrene and styrene/maleimide copolymer used in the present invention may be a copolymer having the structures (A), (B) and (C) obtained by copolymerizing a monomer having the structure (C).

Examples of the monomer having the structure (C) include glycidyl acrylate, glycidyl methacrylate, glycidyl α-ethylacrylate, glycidyl α-n-propylacrylate, glycidyl α-n-butylacrylate, 3,4-epoxybutyl acrylate, 3,4-epoxybutyl methacrylate, 6,7-epoxyheptyl acrylate, 6,7-epoxyheptyl methacrylate, 6,7-epoxyheptyl α-ethylacrylate, o-vinylbenzyl glycidyl ether, m-vinylbenzyl glycidyl ether and p-vinylbenzyl glycidyl ether. These monomers may be used alone or in combination.

The polymaleimide, polystyrene and styrene/maleimide copolymer used in the present invention may be used in conjunction with another radically polymerizable monomer in limits that do not impair the effect of the present invention. The another radically polymerizable monomer is preferably used in an amount of 50 mol % based on maleimide in the case of a polymaleimide, styrene in the case of a polystyrene or the total of styrene and maleimide in the case of a styrene/maleimide copolymer.

Examples of the another radically polymerizable monomer include aliphatic (meth)acrylate compounds such as methyl (meth)acrylate, ethyl(meth)acrylate, n-butyl(meth)acrylate, i-butyl(meth)acrylate, 2-hydroxyethyl(meth)acrylate, 2-hydroxypropyl(meth)acrylate, 2-ethylhexyl(meth)acrylate, polyethylene glycol mono(meth)acrylate and trimethylolpropane tri(meth)acrylate; alicyclic (meth)acrylate compounds such as tetrahydrofurfuryl(meth)acrylate, cyclohexyl(meth)acrylate, glycidyl(meth)acrylate, dicyclopentadiene (meth)acrylate, dicyclopentanyl(meth)acrylate, tricyclodecanyl (meth)acrylate and isobornyl(meth)acrylate; aromatic (meth) acrylate compounds such as 4-(meth)acryloyloxychalcone, 4-(meth)acryloyloxy-4'-phenylchalcone, 4-(meth)acryloyloxy-4'-pentylchalcone, 4-(meth)acryloyloxy-4'-(4-pentylphenyl)chalcone, benzyl(meth)acrylate, 2-hydroxy-3-phenyloxypropyl(meth)acrylate and tris(2-hydroxyethyl) isocyanurate tri(meth)acrylate; vinyl compounds such as ethylene, propylene, butene, styrene, p-methylstyrene, p-trifluoromethylstyrene, α-methylstyrene, p-trifluoromethyl-α-methylstyrene, 4(4-trifluoromethylbenzoyloxy)styrene, p-cetyloxystyrene, p-palmitoyloxystyrene, 4-trifluoromethylphenyl-3(4-vinylphenyl)propionate, 4-cetyl-3(4-vinylphenyl)propionate, 4-stearyl-3(4-vinylphenyl)propionate, vinyl chloride, vinyl acetate and acrylonitrile; maleic acid derivatives such as maleic anhydride and phenylmaleimide; and dienes such as butadiene, isoprene and chloroprene.

Out of these, styrene, p-methylstyrene and α-methylstyrene are preferred. They may be used alone or in combination of two or more.

The polymaleimide, polystyrene and styrene/maleimide copolymer used in the present invention are obtained by polymerizing the above styrene derivative and/or maleimide derivative optionally in the presence of a catalyst, e.g., an azo compound such as azobisisobutyronitrile or a perchloride such as benzoyl peroxide. These polymers may be used alone or in combination of two or more.

As an alternative method of obtaining the polymaleimide, polystyrene and styrene/maleimide copolymer used in the present invention, an acetoxy-substituted styrene derivative and/or acetoxy-substituted phenylmaleimide derivative are/is radically polymerized with a monomer having the structure (B) and a monomer having the structure (C), and then the above acetyl group is substituted by a functional group having the structure (A).

The polyester which is still another example of the specific polymer is obtained by reacting (c) a dicarboxylic acid (dicarboxylic acid, dicarboxylic acid ester or dicarboxylic acid halide) with (d) a diol compound. The polyester used in the present invention is obtained by using a compound having the structure (A) and/or the structure (B) as at least one of (c) a dicarboxylic acid component and (d) a diol compound.

Examples of the dicarboxylic acid having the structure (A) include ester compounds such as chalcone-3,3'-dicarboxylic acid, chalcone-3,4'-dicarboxylic acid, chalcone-4,4'-dicarboxylic acid and alkyl esters thereof, and 4-(4-(3,5-dicarboxyphenoxy)phenyl)chalcone, 4-(4-(2-(3,5-dicarboxyphenoxy)ethoxy)phenyl)chalcone, 4-(4-(6-(3,5-dicarboxyphenoxy)hexanoxy)phenyl)chalcone, 4-(2-(3,5-dicarboxyphenoxy)ethyl)chalcone carboxylato, 4-(6-(3,5-dicarboxyphenoxy)hexyl)chalcone carboxylato, 4-(4-(3,5-dicarboxyphenoxy)benzoyloxy)chalcone, 4-(4-(3,5-dicarboxyphenoxy)phenyl)chalcone carboxylato, 4-(4-(2-(3,5-dicarboxyphenoxy)ethoxy)benzoyloxy)chalcone, 4-(4-(2-(3,5-dicarboxyphenoxy)ethoxy)phenyl)chalcone carboxylato, 4-(4-(6-(3,5-dicarboxyphenoxy)hexanoxy)benzoyloxy)chalcone, 4-(4-(6-(3,5-dicarboxyphenoxy)hexanoxy)phenyl)chalcone carboxylato and alkyl esters thereof, and carboxylic acid halides such as carboxylic acid chloride.

Examples of the diol compound having the structure (A) include 3,3'-dihydroxychalcone, 4,4'-dihydroxychalcone, 3,4'-dihydroxychalcone, 4-(4-(3,5-dihydroxyphenoxy)phenyl)chalcone, 4-(4-(2-(3,5-dihydroxyphenoxy)ethoxy)phenyl)chalcone, 4-(4-(6-(3,5-dihydroxyphenoxy)hexanoxy) phenyl)chalcone, 4-(2-(3,5-dihydroxyphenoxy)ethyl) chalcone carboxylato, 4-(6-(3,5-dihydroxyphenoxy)hexyl) chalcone carboxylato, 4-(4-(3,5-dihydroxyphenoxy) benzoyloxy)chalcone, 4-(4-(3,5-dihydroxyphenoxy)phenyl) chalcone carboxylato, 4-(4-(2-(3,5-dihydroxyphenoxy) ethoxy)benzoyloxy)chalcone, 4-(4-(2-(3,5-dihydroxyphenoxy)ethoxy)phenyl)chalcone carboxylato, 4-(4-(6-(3,5-dihydroxyphenoxy)hexanoxy)benzoyloxy) chalcone and 4-(4-(6-(3,5-dihydroxyphenoxy)hexanoxy) phenyl)chalcone carboxylato.

Out of these, chalcone-4,4'-dicarboxylic acid and 4,4'-dihydroxychalcone are preferred. They may be used alone or in combination of two or more. Another dicarboxylic acid and/or diol compound are/is preferably used in a total amount of 80 mol % or less based on the total of the dicarboxylic acid having the structure (A) and/or the structure (B) and the diol having the structure (A) and/or the structure (B).

The polyester used in the present invention may be used in conjunction with another dicarboxylic acid and/or diol compound in limits that do not impair the effect of the present invention.

Examples of the another dicarboxylic acid include aliphatic carboxylic acids such as oxalic acid, malonic acid, difluoromalonic acid, alkylmalonic acid, succinic acid, tetrafluorosuccinic acid, alkylsuccinic acid, (±)-malic acid, meso-tartaric acid, itaconic acid, maleic acid, methylmaleic acid, fumaric acid, methylfumaric acid, acetylenedicarboxylic acid, glutaric acid, hexafluoroglutaric acid, methylglutaric acid, glutaconic acid, adipic acid, dithioadipic acid, methyladipic acid, dimethyladipic acid, tetramethyladipic acid, methyleneadipic acid, muconic acid, galactaric acid, pimelic acid, suberic acid, perfluorosuberic acid, 3,3,6,6-tetramethylsuberic acid, azelaic acid, sebacic acid, perfluorosebacic acid, brassylic acid, dodecyldicarboxylic acid, tridecyldicarboxylic acid and tetradecyldicarboxylic acid; alicyclic carboxylic acids such as cycloalkyldicarboxylic acid, adipic acid, hexahydrophthalic acid, 1,4-(norbornene)dicarboxylic acid, bicyclcoalkyldicarboxylic acid, adamantanedicarboxylic acid and spyroheptanedicarboxylic acid; aromatic dicarboxylic acids such as phthalic acid, isophthalic acid, dithioisophthalic acid, methylisophthalic acid, dimethylisophthalic acid, chloroisophthalic acid, dichloroisophthalic acid, terephthalic acid, methylterephthalic acid, dimethylterephthalic acid, chloroterephthalic acid, bromoterephthalic acid, naphthalenedicarboxylic acid, oxofluorenedicarboxylic acid, anthracenedicarboxylic acid, biphenyldicarboxylic acid, biphenylenedicarboxylic acid, dimethylbiphenylenedicarboxylic acid, 4,4'''-p-terphenylenedicarboxylic acid, 4,4''''-p-quaterphenyldicarboxylic acid, bibenzyldicarboxylic acid, azobenzenedicarboxylic acid, homophthalic acid, phenylenediacetic acid, phenylenedipropionic acid, naphthalenedicarboxylic acid, naphthalenedipropionic acid, biphenyldiacetic acid, biphenyldipropionic acid, 3,3'-[4,4'-(methylenedi-p-biphenylene)dipropionic acid, 4,4'-bibenzyldiacetic acid, 3,3'-(4,4'-bibenzyl)dipropionic acid and oxydi-p-phenylenediacetic acid; ester compounds such as alkyl esters of the above dicarboxylic acids, and carboxylic acid halides such as carboxylic acid chloride. They may be used alone or in combination of two or more.

Examples of the another diol compound include polyphenols such as catechol, alkyl catechol and hydroquinone; and bisphenols such as methylene bisphenol, isopropylidene bisphenol, butylidene bisphenol, thiobisphenol, sulfinyl bisphenol, sulfonyl bisphenol and oxybisphenol. They may be used alone or in combination of two or more.

The polyester used in the present invention is obtained by polycondensing (c) the above dicarboxylic acid component and (d) the above diol compound, if necessary, under heating in the presence of a catalyst. For polycondensation between a dicarboxylic acid and a diol compound, sulfuric acid, protonic acid such as p-toluenesulfonic acid, oxide or salt of a heavy metal, or organic metal compound of titanium, tin or lead is used as the catalyst. For a reaction between a dicarboxylic acid ester and a diol compound, an acetate or carbonate compound of lead, zinc, manganese, calcium, cobalt or cadmium, metal magnesium, or oxide of zinc, lead, antimony or germanium may be used as the catalyst. For a reaction between a dicarboxylic acid halide and a diol compound, a basic catalyst such as pyridine or triethylamine is used as the catalyst.

The polyamide as still another example of the specific polymer is obtained by reacting (e) a dicarboxylic acid (dicarboxylic acid, dicarboxylic acid ester or dicarboxylic acid halide) with (f) a diamine compound. The polyamide used in the present invention is obtained by using a compound having the structure (A) and/or the structure (B) as at least one of (e) a dicarboxylic acid component and (f) a diamine compound component.

Examples of the dicarboxylic acid having the structure (A) are the dicarboxylic acids (c) listed above. Examples of the diamine compound having the structure (A) are the diamine compounds (b) listed above. They may be used alone or in combination of two or more.

acrylate compound. The poly(meth)acrylate used in the present invention is obtained by using a compound having the structure (A) and/or the structure (B) as (g) the (meth)acrylate compound.

Examples of the (meth)acrylate compound having the structure (A) include 4'-(meth)acryloyloxychalcone, 4-phenyl-4'-(meth)acryloyloxychalcone, 4-pentyl-4'-(meth)acryloyloxychalcone, 4-(4-pentylphenyl)-4'-(meth)acryloyloxychalcone, 4-(4-(methy)acryloyloxyphenyl)chalcone, 4-(4-(2-(meth)acryloyloxyethoxy)phenyl)chalcone, 4-(4-(6-(meth)acryloyloxyhexanoxy)phenyl)chalcone, 4-(2-(meth)acryloyloxyethyl)chalcone carboxylato, 4-(6-(meth)acryloyloxyhexyl)chalcone carboxylato, 4-(4-(meth)acryloyloxybenzoyloxy)chalcone, 4-(4-(meth)acryloyloxyphenyl)chalcone carboxylato, 4-(4-(2-(meth)acryloyloxyethoxy)benzoyloxy)chalcone, 4-(4-(2-(meth)acryloyloxyethoxy)phenyl)chalcone carboxylato, 4-(4-(6-(meth)acryloyloxyhexanoxy)benzoyloxy)chalcone, 4-(4-(6-(meth)acryloyloxyhexanoxy)phenyl)chalcone carboxylato, and compounds represented by the following formulas (101) to (103). They may be used alone or in combination of two or more.

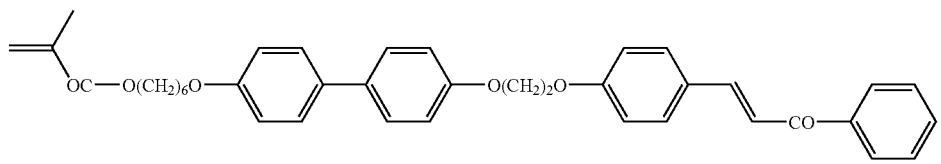

(101)

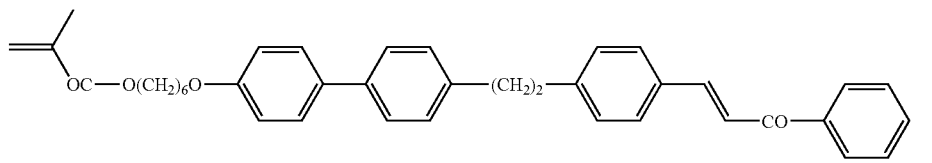

(102)

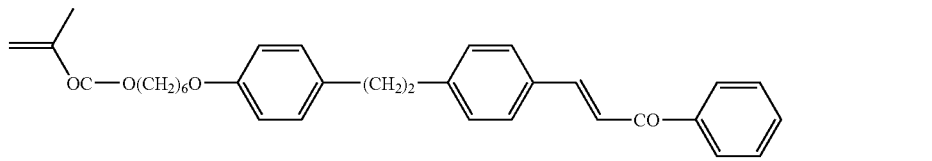

(103)

The polyamide used in the present invention may be used in conjunction with another dicarboxylic acid compound or diamine compound in limits that do not impair the effect of the present invention. Examples of the another dicarboxylic acid compound and diamine compound are the dicarboxylic acid compounds and diamine compounds listed above. They may be used alone or in combination of two or more. The another dicarboxylic acid and/or the another diamine compound are/is preferably used in a total amount of 80 mol % or less based on the total of the dicarboxylic acid having the structure (A) and/or the structure (B) and the diamine compound having the structure (A) and/or the structure (B).

The polyamide used in the present invention is obtained by polycondensing (e) the above dicarboxylic acid component and (f) the above diamine component, if necessary, in the presence of an acid catalyst such as paratoluenesulfonic acid, sulfuric acid or hydrochloric acid.

The poly(meth)acrylate which is still another example of the specific polymer is obtained by polymerizing (g) a (meth)

The above poly(meth)acrylate may be used in conjunction with another (meth)acrylate compound in limits that do not impair the effect of the present invention. The another (meth)acrylate compound is preferably used in an amount of 300 mol % or less based on the methacrylate compound having the structure (A) and/or the structure (B).

Examples of the another (meth)acrylate compound include aliphatic (meth)acrylate compounds such as methyl(meth)acrylate, ethyl(meth)acrylate, n-butyl(meth)acrylate, i-butyl (meth)acrylate, 2-hydroxyethyl(meth)acrylate, 2-hydroxypropyl(meth)acrylate, 2-ethylhexyl(meth)acrylate, polyethylene glycol mono(meth)acrylate and trimethylolpropane tri(meth)acrylate; alicyclic (meth)acrylate compounds such as tetrahydrofurfuryl(meth)acrylate, cyclohexyl(meth)acrylate, glycidyl(meth)acrylate, dicyclopentadiene (meth)acrylate, dicyclopentanyl(meth)acrylate, tricyclodecanyl (meth)acrylate and isobornyl(meth)acrylate; and aromatic (meth)acrylate compounds such as benzyl(meth)acrylate, 2-hydroxy-3-phenyloxypropyl(meth)acrylate and tris(2-hydroxyethyl)isocyanurate tri(meth)acrylate. They may be used alone or in combination of two or more.

The polysiloxane which is still another example of the specific polymer has a chalcone structure represented by the following formula (III)-1 having the above structure (III):

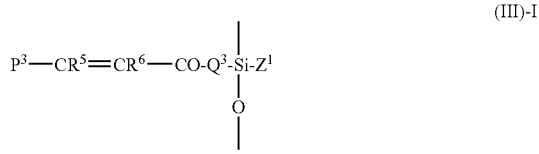

wherein $P^3$, $Q^3$, $R^5$ and $R^6$ are as defined in the above formula (III), and $Z^1$ is a hydroxyl group or methyl group, and/or the following formula (IV)-1 having the above structure (IV):

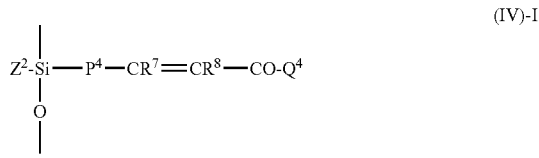

wherein $P^4$, $Q^4$, $R^7$ and $R^8$ are as defined in the above formula (IV), and $Z^2$ is a hydroxyl group or methyl group.

The above polysiloxane is obtained by ring opening polymerizing a cyclic oligosiloxane derivative in the presence of an acid or basic catalyst or by hydrolyzing a dichlorosilane derivative. The polysiloxane used in the present invention is obtained by using a compound having the above structure (A) as at least part of the cyclic oligosiloxane derivative or the dichlorosilane derivative. Alternative means of obtaining the polysiloxane used in the present invention is to react a polysiloxane derivative having an Si—H bond with a compound having the above structure (A) and an allyl group in the presence of a catalyst such as platinum chloride.

Examples of the cyclic oligosiloxane derivative having the structure (A) include 1,3,5,7-tetra(4-chalconyl)-1,3,5,7-tetramethylcyclotetrasiloxane, 1,3,5,7-tetra(4'-chalconyl)-1,3,5,7-tetramethylcyclotetrasiloxane, 1,3,5,7-tetra(3-(4-chalconyloxy)propyl)-1,3,5,7-tetramethylcyclotetrasiloxane, 1,3,5,7-tetra(3-(4'-chalconyloxy)propyl)-1,3,5,7-tetramethylcyclotetrasiloxane, 1,3,5,7-tetra(3-(4-chalconyl)propyl)-1,3,5,7-tetramethylcyclotetrasiloxane, 1,3,5,7-tetra(3-(4'-chalconyl)propyl)-1,3,5,7-tetramethylcyclotetrasiloxane, 1,3,5,7-tetra(6-(4-chalconyloxy)hexyl)-1,3,5,7-tetramethylcyclotetrasiloxane, 1,3,5,7-tetra(6-(4'-chalconyloxy)hexyl)-1,3,5,7-tetramethylcyclotetrasiloxane, 1,3,5,7-tetra(6-(4-chalconyl)hexyl)-1,3,5,7-tetramethylcyclotetrasiloxane and 1,3,5,7-tetra(6-(4'-chalconyl)hexyl)-1,3,5,7-tetramethylcyclotetrasiloxane. They may be used alone or in combination of two or more.

The cyclic oligosiloxane derivative having the structure (A) is obtained by reacting a cyclic oligosiloxane such as 1,3,5,7-tetramethylcyclotetrasiloxane with a compound having the structure (A) such as 4-allyloxychalcone in the presence of a platinum catalyst.

Examples of the dichlorosilane derivative having the structure (A) include monomethyl mono(4-chalconyl)dichlorosilane, monomethyl mono(4'-chalconyl)dichlorosilane, monomethyl mono(3-(4-chalconyloxy)propyl)dichlorosilane, monomethyl mono(3-(4'-chalconyloxy)propyl)dichlorosilane, monomethyl mono(3-(4-chalconyl)propyl)dichlorosilane and monomethyl mono(3-(4'-chalconyl)propyl) dichlorosilane. They may be used alone or in combination of two or more.

The dichlorosilane derivative having the structure (A) is obtained by reacting a dichlorosilane such as dichloromethylsilane with a compound having a specific structure such as 4-allyloxychalcone in the presence of a platinum catalyst.

Out of these, a polymer derived from 1,3,5,7-tetra(3-(4-chalconyloxy)propyl)-1,3,5,7-tetramethylcyclotetrasiloxane is preferred.

The polysiloxane used in the present invention may be used in conjunction with another cyclic oligosiloxane derivative or another dichlorosilane derivative in limits that do not impair the effect of the present invention.

Examples of the another cyclic oligosiloxane derivative include 1,1,3,3,5,5,7,7-octamethylcyclotetrasiloxane, 1,3,5,7-tetrahydroxy-1,3,5,7-tetramethylcyclotetra siloxane, 1,1,3,3,5,5,7,7-octahydroxycyclotetrasiloxane, 1,1,3,3,5,5,7,7-octaphenylcyclotetrasiloxane and 1,3,5,7-tetrahydroxy-1,3,5,7-tetraphenylcyclotetra siloxane.

Out of these, 1,1,3,3,5,5,7,7-octamethylcyclotetrasiloxane is preferred. They may be used alone or in combination of two or more.

Examples of the another dichlorosilane derivative include dichlorodimethylsilane, dichlorodiphenylsilane, dichloromethylphenylsilane and dichlorodiethylsilane.

Out of these, dichlorodimethylsilane is preferred. They may be used alone or in combination of two or more.

The weight average molecular weight in terms of polystyrene (may be referred to as "Mw" hereinafter) of the polysiloxane polymer used in the present invention is generally 5,000 to 100,000.

Liquid Crystal Aligning Agent

The polymer film used in the present invention is generally obtained by applying a liquid crystal aligning agent prepared by dissolving a polymer, preferably the above-described specific polymer in a solvent to a substrate and drying it. Any organic solvent may be used if it can dissolve the polymer. When a polyamic acid, polyamic acid ester or polyimide is used, an aprotic polar solvent such as N-methyl-2-pyrrolidone, N,N-dimethylacetamide, N,N-dimethylformamide, dimethylsulfoxide, γ-butyrolactone, tetramethylurea or hexamethylphosphortriamide; or phenol-based solvent such as m-cresol, xylenol, phenol or halogenated phenol is used. They may be used alone or in combination of two or more.

When the polymer is, for example, a polymaleimide, polystyrene or maleimide/styrene copolymer, an aprotic polar solvent such as N-methyl-2-pyrrolidone, N,N-dimethylacetamide, N,N-dimethylformamide, dimethylsulfoxide, γ-butyrolactone, tetramethylurea, dimethylimidazolidinone or hexamethylphosphortriamide; ester-based solvent such as butyl cellosolve acetate, propyl acetate, isopropyl acetate, butyl acetate, isobutyl acetate, pentyl acetate or isopentyl acetate; ketone-based solvent such as methyl ethyl ketone, methyl butyl ketone, methyl isobutyl ketone, cyclohexanone or methyl cyclohexanone; halogen-based solvent such as chlorobenzene, orthodichlorobenzene, tetrachloroethylene or 1,1,1-trichloroethane; or phenol-based solvent such as m-cresol, xylenol, phenol or halogenated phenol may be used. They may be used alone or in combination of two or more. A poor solvent for the used polymer may be used in conjunction with the above solvent in limits that the polymer does not separate out.

The solid content of the liquid crystal aligning agent in the present invention is preferably 1 to 20 wt %.

Other Additives

The liquid crystal aligning agent used in the present invention may contain a polymer other than the specific polymer in limits that do not impair the effect of the present invention. The polymer other than the specific polymer is a polyimide, polyamic acid, polyamide, polyester, poly(meth)acrylate, polysiloxane, polystyrene or polymaleimide. Out of these, a polyimide and polyamic acid are preferred because they have excellent heat resistance.

The liquid crystal aligning agent used in the present invention may contain a thermosetting crosslinking agent to improve the stability of a pretilt angle and the strength of a coating film. As the thermosetting crosslinking agent is effective a polyfunctional epoxy-containing compound such as bisphenol A epoxy resin, phenolic novolak epoxy resin, cresol novolak epoxy resin, alicyclic epoxy resin, glycidyl ester-based epoxy resin, glycidyl diamine-based epoxy resin, heterocyclic epoxy resin or epoxy group-containing acrylic resin. Commercially available products of the thermosetting crosslinking agent include Epolite 400E and 3002 (of Kyoeisha Chemical Co., Ltd.) and Epicoat 828 and 152 and Epoxy Novolak 180S (of Yuka Shell Epoxy Co., Ltd.).

Further, when the above polyfunctional epoxy-containing compound is used, a basic catalyst such as 1-benzyl-2-methylimidazole may be added to cause a crosslinking reaction efficiently.

The liquid crystal aligning agent of the present invention may contain a functional silane-containing compound to improve adhesion to a substrate. Examples of the functional silane-containing compound include 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltrimethoxysilane, N-phenyl-3-aminopropyltriethoxysilane, N-phenyl-3-aminopropyltriethoxysilane, N-bis(oxyethylene)-3-aminopropyltrimethoxysilane, N-bis(oxyethylene)-3-aminopropyltriethoxysilane and a reaction product of a tetracarboxylic dianhydride and an amino group-containing silane compound disclosed in JP-A 63-291922.

The liquid crystal aligning agent of the present invention preferably contains the above polymer having a chalcone structure in an amount of 50 wt % or more based on the total solid content.

Optical Alignment Method

The feature of the first optical alignment method of the present invention is that the surface of a polymer film is exposed to radiation with an irradiation intensity distribution while the surface of the polymer film and radiation are moved relative to each other substantially at a fixed rate. In order to provide the irradiation intensity distribution, after a linear exposure pattern is formed on the polymer film using a slit exposure mask or projector, the polymer film is exposed to radiation while the surface of the polymer film and the exposure pattern are moved relative to each other substantially at a fixed rate. A preferred concrete method will be detailed hereinbelow.

To provide liquid crystal aligning capability to the surface of the polymer film by the present invention, a polymer solution is first applied to a substrate to prepare the substrate having the polymer film formed thereon. Then, a slit exposure mask is positioned substantially in parallel to the surface of the polymer film on the substrate, and the surface of the polymer film is exposed to radiation through the slit exposure mask while the surface of the polymer film and the slit exposure mask are moved relative to each other substantially at a fixed rate. To move the polymer film and the slit exposure mask relative to each other, (i) one of the substrate having the polymer film and the slit exposure mask is fixed and the other is moved, (ii) both of them are moved in the same direction at different rates, or (iii) both of them are moved in different directions. Since the relative rate is easily controlled, the above method (i) is preferred. It is particularly preferred that the substrate be fixed and the slit board be moved.

When the relative movement is not carried out substantially at a fixed rate, liquid crystal aligning capability provided to the surface of the polymer film does not become uniform disadvantageously.

The method of the present invention is typically carried out as a method of forming a liquid crystal alignment film from a liquid crystal aligning agent. The following method will be described as an example of the method of the present invention. The liquid crystal aligning agent of the present invention is first applied to the transparent conductive film side of a substrate having the transparent conductive film by roll coating, spinner coating or printing and heated at 40 to 200° C. to form a coating film. The thickness of the coating film is preferably 0.001 to 1 μm, more preferably 0.005 to 0.5 μm.

The above substrate is, for example, a transparent substrate made from glass such as float glass or soda glass, or a plastic film of polyethylene terephthalate, polybutylene terephthalate, polyether sulfone or polycarbonate.

The above transparent conductive film is, for example, an NESA film of $SnO_2$ or ITO film of $In_2O_3$—$SnO_2$. A photo-etching technique or masking technique is used for the patterning of the transparent conductive film.

Before the application of the liquid crystal aligning agent, to further improve adhesion between the substrate/transparent conductive film and the coating film, a functional silane-containing compound or titanate may be applied to the substrate/transparent conductive film.

The method of the present invention is for the linear exposure of the surface of the film through the slit exposure mask by irradiating the coating film formed on the substrate with radiation to provide liquid crystal aligning capability as described above.

FIGS. 11(a) to 11(e) are graphs showing the influence upon the development of a liquid crystal pretilt angle of the scanning speed and the slit width. In these graphs, the horizontal axis shows the slit width and the vertical axis shows the liquid crystal pretilt angle. The radiation was near ultraviolet radiation having a wavelength of 250 to 450 nm, the scanning speed was 50 μm/sec (FIG. 11(a)), 100 μm/sec (FIG. 11(b)), 160 μm/sec (FIG. 11(c)), 200 μm/sec (FIG. 11(d)) and not more than 500 μm/sec (FIG. 11(e)), the irradiation energy was 2 J/cm$^2$, the light intensity was 9 mw/cm$^2$, and the irradiation time was 30 seconds. Close exposure was employed.

Figure 11:
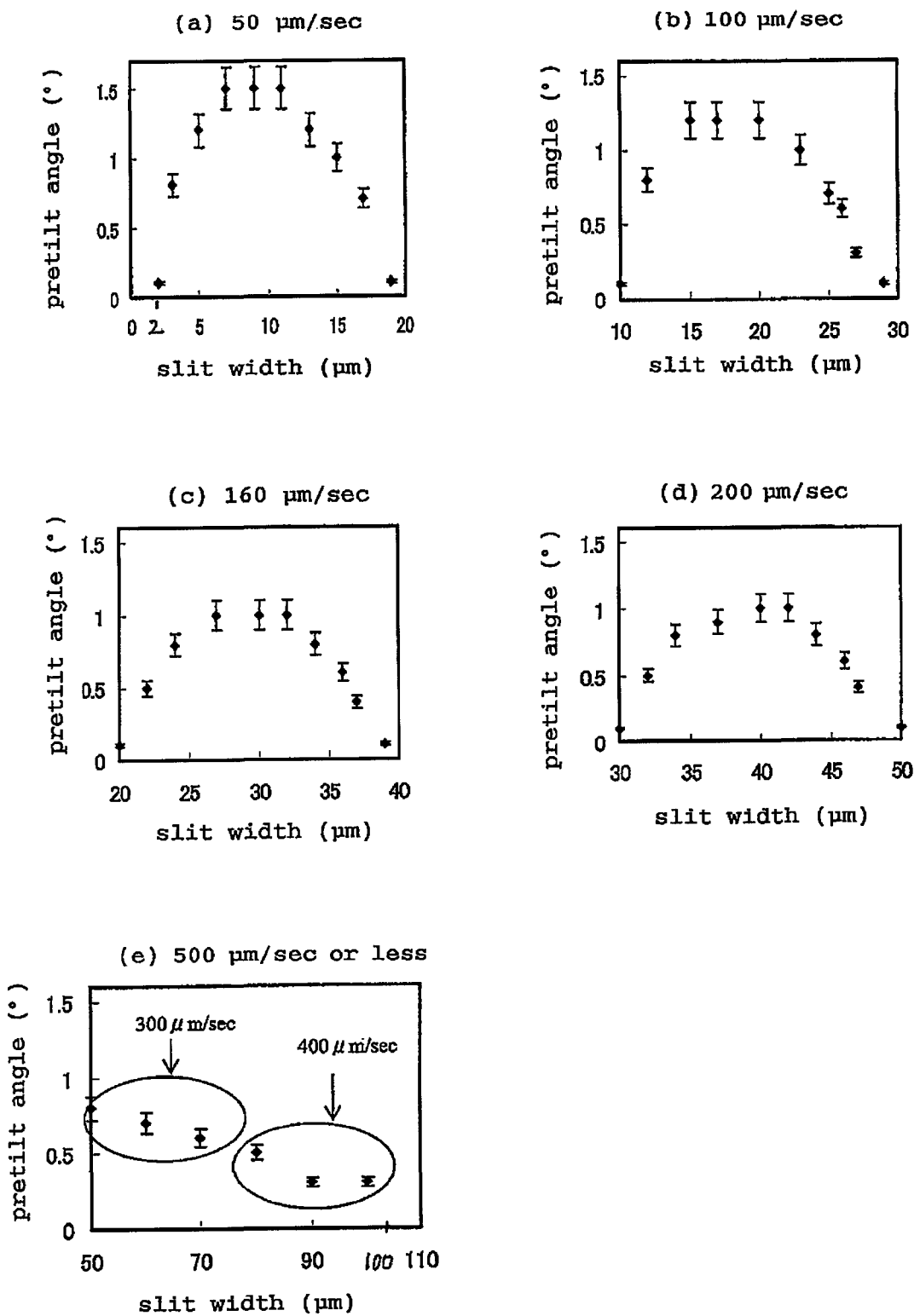
FIGS. 11($a$)-11($e$) show graphs showing the influence of the pretilt on the scanning speed and slit width.

It is understood from the above results that when a photo-alignment film is scanned with periodically intensity-modulated linearly polarized near ultraviolet radiation at a fixed speed, a pretilt angle is obtained in the scanning direction. The developed pretilt angle depends on the slit width and the scanning speed and can be controlled by the slit width and the scanning speed. FIG. 11 show that a liquid crystal pretilt angle is developed at a scanning speed of 50 to 500 μm/sec and a slit width of 2 to 100 μm.

In one embodiment, the pretilt may be in the order of 0 to 10° or 80° or more, specifically 0 to 1.5° or 80 to 90°, more specifically >0 to 10° and >0 to 1.5°.

Thereby, the light and shade is produced at the each edge of the slits as a boundary.

A pretilt angle is developed at the each boundary portion on the photo-alignment film.

Figure 3:
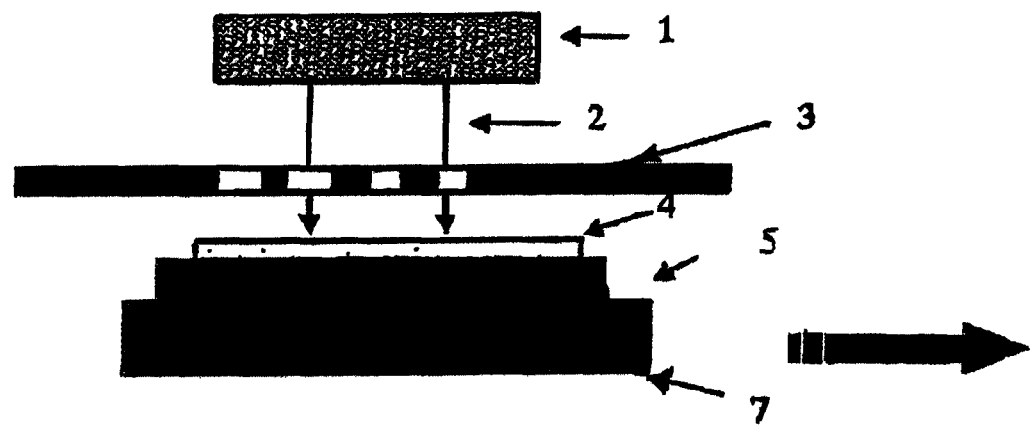
FIG. 3 is a diagram (side view) for explaining an example of the optical alignment method of the present invention.

FIG. 3 is a diagram for explaining an example of the first optical alignment method of the present invention. FIG. 3 is a side view showing that a slit exposure mask 3 is fixed and a substrate 5 having an optical alignment film 4 is moved in the right direction. The optical alignment film 4 and the substrate 5 fixed on a movable stage 6 are moved at a rate of 5 μm/sec to 1 mm/sec. A large number of slits having line and space widths of 1 μm to 1 mm, for example, are formed parallel to one another in the slit exposure mask. The distance between the slit exposure mask and the surface of the coating film is preferably maintained at about 18 μm so that 7 μm-wide radiation is projected onto the surface of the optical alignment film through slits having a width of 7 μm. Reference numeral 1 denotes an irradiating unit, and 2 denotes radiation. In figures other than FIG. 3, the same numerals represent the same elements.

Figure 4:
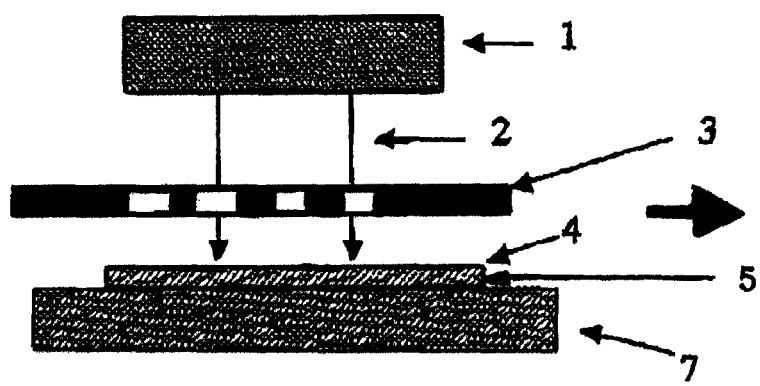
FIG. 4 is a diagram (side view) for explaining another example of the optical alignment method of the present invention.

FIG. 4 is a diagram for explaining another example of the first optical alignment method of the present invention. FIG. 4 is a side view showing that the substrate 5 having the optical alignment film 4 is fixed on a fixed stage 7 and the slit exposure mask 3 is moved in the right direction.

At the time of exposure, it is preferred that the polymer having the structure (A) and/or the structure (B) should be heated at a temperature ranging from its glass transition temperature to a temperature 100° C. higher than the glass transition temperature or that a solvent should be contained in an amount of 1 to 20 wt % based on the polymer. The solvent used to dissolve the above liquid crystal aligning agent may be directly used as the above solvent. According to the present invention, as optical alignment is carried out while the substrate having the coating film formed thereon is kept horizontal, a heater for heating the substrate at a temperature equal to or higher than the glass transition temperature of the polymer can be easily installed.

The radiation (light) used for exposure may be polarized or nonpolarized light. After exposure, the substrate is optionally further heated at a temperature of 150 to 250° C. The radiation may be ultraviolet or visible radiation having a wavelength of 150 to 800 nm, preferably ultraviolet radiation having a wavelength of 320 to 450 nm.

The light source of the above radiation is, for example, a low-pressure mercury lamp, high-pressure mercury lamp, deuterium lamp, metal halide lamp, argon resonance lamp, xenon lamp, excimer laser or the like.

The ultraviolet radiation having the above preferred wavelength range can be obtained by combining a filter or diffraction grating with the above light source. It can be simply obtained by using a Pyrex (registered trademark) glass polarizer which does not transmit ultraviolet light having a wavelength shorter than 320 nm in conjunction with the above light source.

The first optical alignment method of the present invention makes it possible to improve the view field characteristics of a liquid crystal display element by carrying out partial optical alignment through exposure using a slit exposure mask and by moving the above mask to align the liquid crystal alignment film in a different direction from that of the above partial alignment so as to change the liquid crystal aligning capability of the liquid crystal alignment film. In this method, it is particularly preferred that a linear exposure pattern be formed on the polymer by a projection method using a projector.

A description is subsequently given of the second optical alignment method and the third optical alignment method of the present invention.

According to the second optical alignment method of the present invention, an optical exposure pattern is formed on the surface of the polymer film by forming a plurality of lines having a certain width on the surface of the polymer film continuously or repeatedly in such a manner that (i) the lines form around an arbitrary virtual base point on the surface of the polymer film, expand concentrically from the virtual base point toward the periphery and disappear at the periphery, or conversely that (ii) they start from the periphery away from the virtual base point on the surface of the polymer film, converge concentrically on the virtual base point and disappear at the virtual base point. That is, it can be said that the optical exposure pattern continues to move in such a manner that it starts from the virtual base point as the center and disappears, or that it starts from the periphery and disappears at the virtual base point. While the optical exposure pattern which continues to move as described above is formed on the surface of the polymer film, the surface of the polymer film is exposed through this optical exposure pattern.

Figure 5:
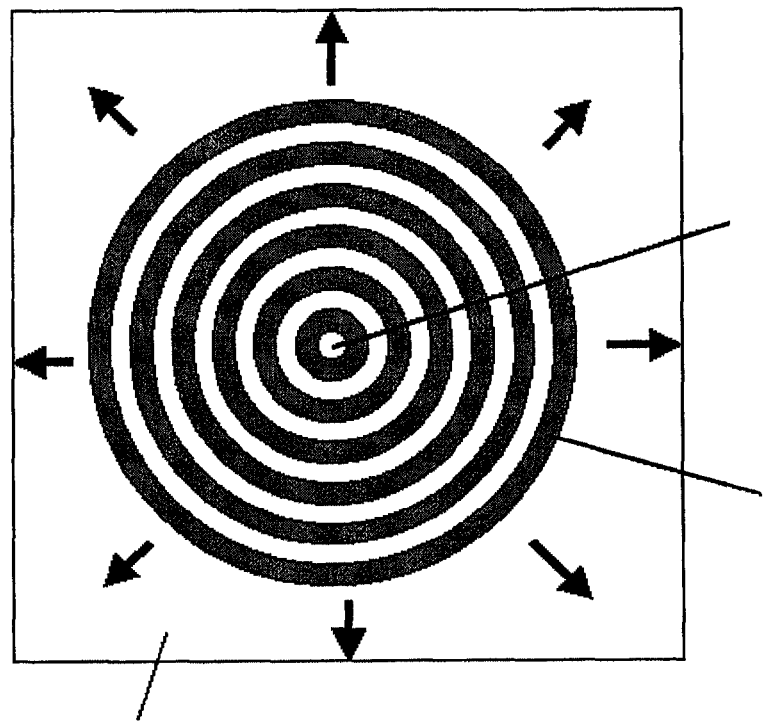
FIG. 5 is a diagram showing an example of the formation of an optical exposure pattern in the optical alignment method of the present invention.

FIG. 5 is a diagram for explaining the formation of the optical exposure pattern on the surface of the polymer film. In this example, the optical exposure pattern having circular lines starting from the virtual base point is moved in such a manner that the lines expand concentrically toward the periphery.

The optical exposure pattern may be a projection pattern projected by a projector, interference fringe or a combination thereof formed on the surface of the polymer film. The projection pattern can be easily moved as described above by the operation of the projector, and the interference fringe can be moved by shifting the phase of the interference fringe.

The lines having a certain width of the optical exposure pattern may be circular, oval or polygonal (such as rectangular or diamond-shaped).

According to the second optical alignment method, exposure can be carried out while a plurality of the above optical exposure patterns are formed adjacent to one another. When the obtained polymer film provided with liquid crystal aligning capability is a liquid crystal alignment film and exposed through a plurality of adjacent optical exposure patterns, a polymer film area exposed through each of the exposure patterns corresponds to one pixel. In this case, as easily understood, as for liquid crystal aligning capability in each area corresponding to one pixel, each area has a different liquid crystal aligning axis in the entire circumferential direction. Preferably, the lines of the optical exposure pattern disappear or start at the end of one pixel. More specifically, it is preferred that the lines should disappear or start from an area 1 mm or less away from the virtual base point.

According to the third optical alignment method of the present invention, an optical exposure pattern having a plurality of lines with a certain width formed at certain intervals is formed on the surface of the polymer film continuously in such a manner that two areas sandwiching a virtual base line on the surface of the polymer film differ from each other in at least one of the pattern and the moving direction of the pattern. That is, the lines of the optical exposure patterns in the above two areas are continuously formed in the two areas on the above surface of the polymer film in such a manner that they start in the respective areas, move to cover the respective areas and disappear in the respective areas.

When the two areas sandwiching the virtual base line are made different from each other in at least one of the optical exposure pattern and the moving direction of the pattern, the directions of the liquid crystal aligning axes in the above two areas can be made different from each other.

When the two areas differ from each other in the pattern, (i) a pattern in one of the areas has a plurality of parallel straight lines with a certain width and a pattern in the other area has a plurality of parallel curved line with a certain width, or (ii) patterns in the both areas have a plurality of parallel straight lines with a certain width but differ from each other in the interval between adjacent straight lines and/or the number of lines.

When the two areas differ from each other in the moving direction of the pattern, (i) the patterns in the both areas have a plurality of parallel straight lines with a certain width but move in opposite directions away from the virtual base line in the both areas, (ii) the patterns in the both areas have a plurality of parallel straight lines with a certain width but move toward the virtual base line in the both areas, and (iii) the patterns in the both areas have a plurality of parallel straight lines with a certain width but the straight lines of the pattern in one area move in a direction perpendicular to the virtual base line and the straight lines of the pattern in the other area move in parallel to or at an angle smaller than 90° from the virtual base line.

According to the third optical alignment method, liquid crystal aligning capability can be provided to the surface of the polymer film by exposing the surface of the polymer film through the exposure pattern. When the polymer film provided with liquid crystal aligning capability is a liquid crystal alignment film, the above two areas can correspond to one pixel. In this case, each of the two areas corresponds to a half of one pixel. Similarly, four different areas can be formed by combining together above two areas of the polymer film in such a manner that the two virtual straight lines of the polymer films become perpendicular to each other. In this case, it should be understood that each of the above two areas consists of two sub-areas. In this case, it should also be understood that each of the four areas differs from at least two areas adjacent thereto in at least one of the pattern and the moving direction of the pattern.

Preferably, the third optical alignment method of the present invention is characterized by providing liquid crystal aligning capability to the surface of the polymer film by exposing the surface of the polymer film through an optical exposure pattern having a plurality of lines with a certain width at certain intervals while the optical exposure pattern is formed on the surface of the polymer film continuously in such a manner that the lines start from a certain virtual base line on the surface of the polymer film, move in two right and left directions from the virtual base line and disappear at right and left positions, or that they start from the right and left positions away from the virtual base line, move toward the virtual base line from the right and left directions and disappear on the virtual base line.

According to this preferred mode, the optical exposure pattern is formed on the surface of the polymer film by forming the plurality of lines having a certain width of the optical exposure pattern on the surface of the polymer film continuously or repeatedly in such a manner that (i) the lines start from a certain virtual base line on the surface of the polymer film, move in two right and left directions from the virtual base line and disappear at right and left positions or, conversely, that (ii) they start from the right and left positions away from the certain virtual base line on the surface of the polymer film, move toward the virtual base line from the left and right directions and disappear on the virtual base line. Thus, the optical exposure pattern is formed on the surface of the polymer film.

The optical exposure pattern may be a projection pattern projected by a projector, an interference fringe or a combination thereof formed on the surface of the polymer film. The projection pattern can be easily moved by the operation of the projector, and the interference fringe can be moved by shifting the phase of the interference fringe. The lines having a certain width of the optical exposure pattern may be, for example, straight lines, broken lines or curved lines.

According to the third optical alignment method, exposure can be carried out while a plurality of the above optical exposure patterns are formed adjacent to one another. When the polymer film provided with liquid crystal aligning capability is a liquid crystal alignment film and exposed through a plurality of adjacent optical exposure patterns, a polymer film area exposed through each of the exposure patterns corresponds to one pixel. In this case, as easily understood, as for liquid crystal aligning capability in the areas corresponding to one pixel, the two areas sandwiching the virtual base line differ from each other in liquid crystal aligning direction. Preferably, the lines of the optical exposure pattern disappear or start at the end of one pixel or another virtual base line. More specifically, it is preferred that the lines should disappear or start from an area 1 mm or less away from the virtual base line.

Figure 6:
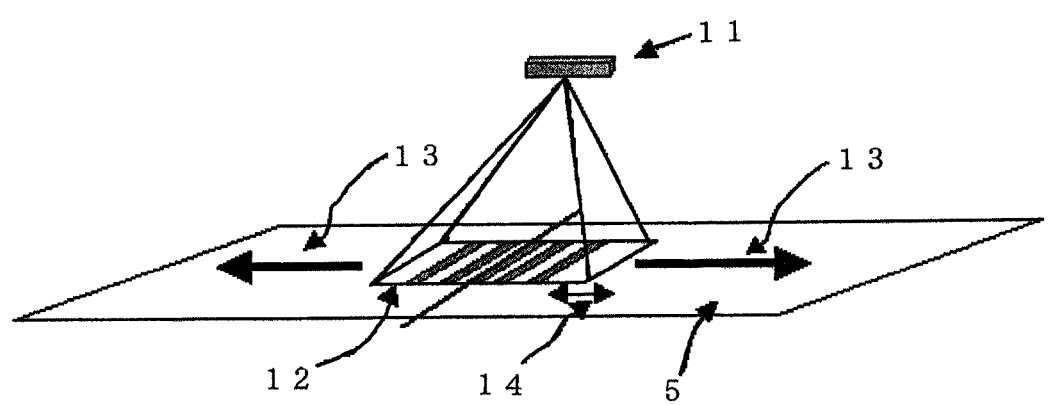
FIG. 6 is a diagram (perspective view) for explaining an example of the optical alignment method of the present invention.

FIG. 6 is a diagram for explaining an example of the third optical alignment method of the present invention. FIG. 6 is a perspective view showing that an optical alignment film is formed by projecting an optical exposure pattern from a projector 11, scanning the pattern having parallel straight lines in right and left directions from a virtual base line and exposing the surface of the polymer film through the pattern.

At the time of exposure, it is preferred that the polymer film should be heated at a temperature ranging from the glass transition temperature of the polymer to a temperature 100° C. higher than the glass transition temperature or that a solvent should be contained in an amount of 1 to 20 wt % based on the polymer. The solvent used to dissolve the above liquid crystal aligning agent may be directly used as the above solvent. According to the method of the present invention, as optical alignment is carried out while the substrate having the coating film formed thereon is kept horizontal, a heater for heating the substrate at a temperature equal to or higher than the glass transition temperature of the polymer can be easily installed.

The radiation (light) used for exposure may be polarized or nonpolarized light. After exposure, the substrate is optionally further heated at a temperature of 100 to 300° C. The radiation may be ultraviolet or visible radiation having a wavelength of 150 to 800 nm, preferably ultraviolet radiation having a wavelength of 320 to 450 nm.

The light source of the above radiation is, for example, a low-pressure mercury lamp, high-pressure mercury lamp, deuterium lamp, metal halide lamp, argon resonance lamp, xenon lamp, excimer laser or the like.

The ultraviolet radiation having the above preferred wavelength range can be obtained by combining a filter or diffraction grating with the above light source. It can be simply obtained by using a Pyrex (registered trademark) glass polarizer which does not transmit ultraviolet light having a wavelength shorter than 320 nm in conjunction with the above light source.

According to the present invention, it is possible to develop a liquid crystal pretilt angle of 1 to 100.

For instance, when a polyamic acid or polyimide having the structure (A) or a polymer having the structure (B) obtained by using at least one of a compound belonging to the examples (a) as a tetracarboxylic dianhydride and a compound belonging to the examples (d) as a diamine compound is used, a liquid crystal pretilt angle of 80° or more, for example, 80 to 90° can be developed.

Liquid Crystal Display Element

The liquid crystal display element formed by using a liquid crystal aligning agent and produced by the method of the present invention is constructed as follows. Two substrates having the above liquid crystal alignment film are opposed to each other in such a manner that the polarization directions of linearly polarized radiations irradiated onto the liquid crystal alignment films form a predetermined angle, a peripheral portion between the substrates was sealed with a sealer, liquid crystals are filled into a gap between the substrates, and a filling hole is sealed to construct a liquid crystal cell.

Thereafter, it is desired that flow-induced alignment at the time of filling liquid crystals should be removed by heating the liquid crystal cell at a temperature at which the used liquid crystals take an isotropic phase and then cooling it to room temperature.

A polarizer is affixed to the both sides of the cell in such a manner that the polarization directions of the polarizers have a predetermined angle from the polarization directions of the respective linearly polarized radiations projected onto the liquid crystal alignment films of the substrates to construct a liquid crystal display element. A liquid crystal display element having TN, STN, VA or horizontally or vertically hybrid liquid crystal cells can be obtained by adjusting the projection direction of the projected nonpolarized light or the angle formed by the polarization directions of the linearly polarized radiations and the angle between each of the substrates and each of the polarizers.

As the above sealer may be used an epoxy resin containing aluminum oxide spheres as a curing agent and spacer.

The above liquid crystals are, for example, nematic or smectic liquid crystals. In the case of a VA liquid crystal cell, the liquid crystals are preferably what form nematic liquid crystals, such as Schiff based liquid crystals, azoxy-based liquid crystals, biphenyl-based liquid crystals, phenylcyclohexane-based liquid crystals, ester-based liquid crystals, terphenyl-based liquid crystals, biphenylcyclohexane-based liquid crystals, pyrimidine-based liquid crystals, dioxane-based liquid crystals, bicyclooctane-based liquid crystals or cubane-based liquid crystals. What are obtained by adding cholesteric liquid crystals such as cholestyl chloride, cholesteryl nonanoate or cholesteryl carbonate, or a chiral agent marketed under the trade name of C-15 or CB-15 (of Merk Co., Ltd.) to the above liquid crystals may be used. Further, ferroelectric liquid crystals such as p-desiloxybenzilidene-p-amino-2-methylbutyl cinnamate may also be used.

The polarizer affixed to the exterior sides of the liquid crystal cell is a polarizer manufactured by sandwiching a polarizing film called "H film" which absorbs iodine while polyvinyl alcohol is stretched and aligned between cellulose acetate protective films, or the H film itself.

EXAMPLES

The following examples are provided for the purpose of further illustrating the present invention but are in no way to be taken as limiting.

Example 1

Optical alignment was carried out as shown in FIG. 3.

Figure 7:
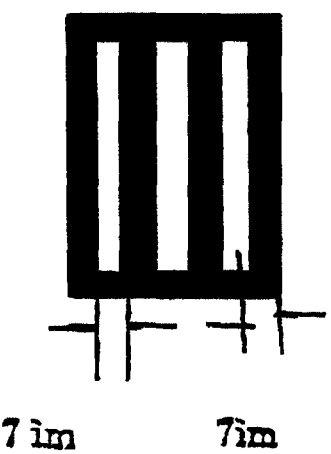
FIG. 7 is a diagram of an exposure mask pattern (slit exposure mask) used in Examples of the present invention.
Figure 8:
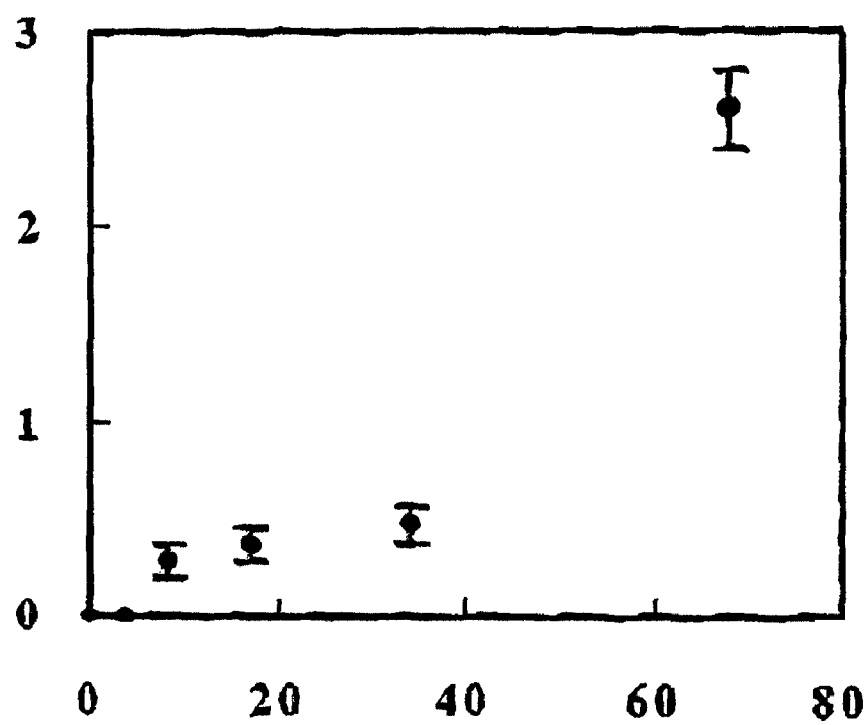
FIG. 8 is a diagram showing the relationship between the moving rate of a movable stage and pretilt angle in Examples.

A polymer (may be called to "PMI-15" hereinafter) prepared by introducing a chalcone group as a side chain into a phenylmaleimide-styrene alternating copolymer through a methylene group was dissolved in γ-butyrolactone in an amount of 3%, and the obtained solution was applied to a quartz glass substrate 5 by spin coating and dried to form a polymer film having a thickness of 70 nm. Thereafter, the surface of the polymer film was exposed to polarized UV having a central wavelength of 350 nm from a polarization irradiating unit 1 through a slit exposure mask 3 while a movable stage 6 mounting the formed substrate was moved parallel to the X-axis direction (right direction) at a rate of several tens of micrometers per second so as to expose the slit pattern. The irradiation energy was 2 J/cm$^2$. A slit exposure mask pattern having line and space widths of 7 μm as shown in FIG. 7 was used in this example. Thereafter, two exposed substrates were used to manufacture a TN cell having a thickness of 4.5 μm. The ZLI-5081 liquid crystal cells (of Merk Co., Ltd.) were used. It was confirmed in this example that a pretilt angle could be developed stably by the optical alignment method of the present invention without inclining the optical alignment film formed substrate. The pretilt angle became 0° until the stage moving rate was 4 μm/sec as shown in FIG. 8. A pretilt angle of 0.3° or more was developed when the stage moving rate was 8.5 to 34 μm/sec as shown in FIG. 8. Thus, a slight increase in the pretilt angle was seen. When the stage moving rate was further accelerated to 64 μm/sec, it was confirmed that the pretilt angle greatly increased to 2.6°.

As a result, the optical alignment strength parameter which indicates the effect of optical alignment is an exposure frequency which is determined by irradiation energy J, the width L of the slit mask and the substrate moving rate u. The exposure frequency Fp is represented by the following equation.

$$Fp=(u/2L)\times J$$

In this example, when irradiation energy J=1.1 J/cm$^2$, 2L=1.66 (sec) and u=8.425 μm/sec, exposure frequency Fp=0.6 Hz.

In other experiments on the optical alignment method using PMI-15, when the exposure frequency was changed from 0.66 Hz to 2.4 Hz, a pretilt angle of 0.5° which was characteristic of the material was obtained.

Synthesis Example 1

Polymerization of Polyamic Acid 0.1 mol (22.4 g) of 2,3,5-tricarboxycyclopentylacetic dianhydride, 0.09 mol (9.73 g) of p-phenylenediamine and 0.01 mol (5.22 g) of cholestanyloxy(3,5-diaminobenzoyl) were dissolved in 350 g of N-methyl-2-pyrrolidone and reacted at 60° C. for 6 hours. Thereafter, the reaction mixture was added to an excessive amount of methanol to precipitate a reaction product. The precipitate was then washed with methanol and dried at 40° C. under reduced pressure for 15 hours to produce 34.2 g of polyamic acid (to be referred to as "polymer a" hereinafter).

Synthesis of Specific Polymer 300 g of N-methyl-2-pyrrolidone, 41.3 g of 1-bromo-8-(4-chalconyloxy)octane and 13.8 g of potassium carbonate were added to 14.9 g of the obtained polymer a to carry out a reaction at 120° C. for 4 hours. Thereafter, the reaction mixture solution was added to water to precipitate a reaction product. The obtained precipitate was washed with water and dried under reduced pressure for 15 hours to produce 43.9 g of polyamic acid ester (to be referred to as "polymer b" hereinafter).

Example 2

The polymer "b" obtained in Synthesis Example 1 was dissolved in γ-butyrolactone to prepare a 3 wt % solution, and the obtained solution was applied to a surface polished non-alkali glass substrate by spin coating and dried by heating at 180° C. for 5 minutes to form a polymer film having a thickness of 80 nm. The surface of the polymer film was exposed to polarized UV having a central wavelength of 350 nm through a slit exposure mask while a movable stage mounting the substrate was moved parallel to the surface of the polymer film at a rate of 100 μm/sec. The irradiation energy was 5 J/cm$^2$, and the polarization direction of the polarized UV was the same as the moving direction. The slit width of the exposure mask was 7 μm. Thereafter, the exposed substrate was used to construct a non-parallel cell having a thickness of 18 μm, and the MLC6608 liquid crystals of Merk Co., Ltd. were filled to obtain a liquid crystal display element. The alignability of the liquid crystals was excellent, and the pretilt angle was 89°. A crystal rotation method was used for the evaluation of the pretilt angle.

Example 3

A liquid crystal display element was obtained in the same manner as in Example 2 except that the irradiation energy was changed to 10 J/cm$^2$. The alignability of the liquid crystals was excellent, and the pretilt angle was 89°.

Synthesis Example 2

26.2 g of 4-(8-(4-chalconyloxy)octanoxy)phenylmaleimide, 22.7 g of 4-(8-(4-chalconyloxy)octanoxy)styrene and 3.0 g of azobisisobutyronitrile were dissolved in 500 ml of dimethyl acetamide to carry out a reaction in a nitrogen atmosphere at 80° C. for 10 hours. A viscous reaction mixture was added to methanol to precipitate a polymer which was then dried to obtain 49 g of a 4-(8-(4-chalconyloxy)octanoxy) phenylmaleimide/4-(8-(4-chalconyloxy)octanoxy)styrene alternating copolymer. This polymer was designated as polymer "c".

Example 4

Figure 9:
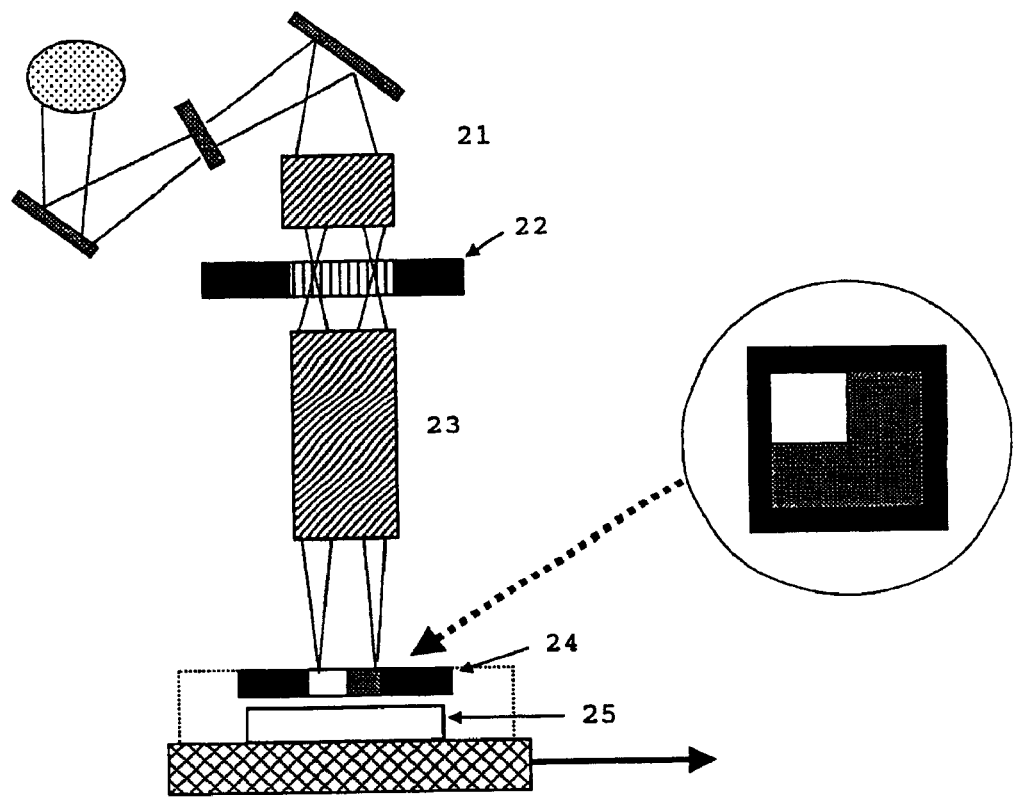
FIG. 9 is a diagram for explaining an example of the optical alignment method of the present invention reference numeral 21 denotes UV source, reference numeral 22 denotes slit mask and reference numeral 23 denotes projection lens.
Figure 10:
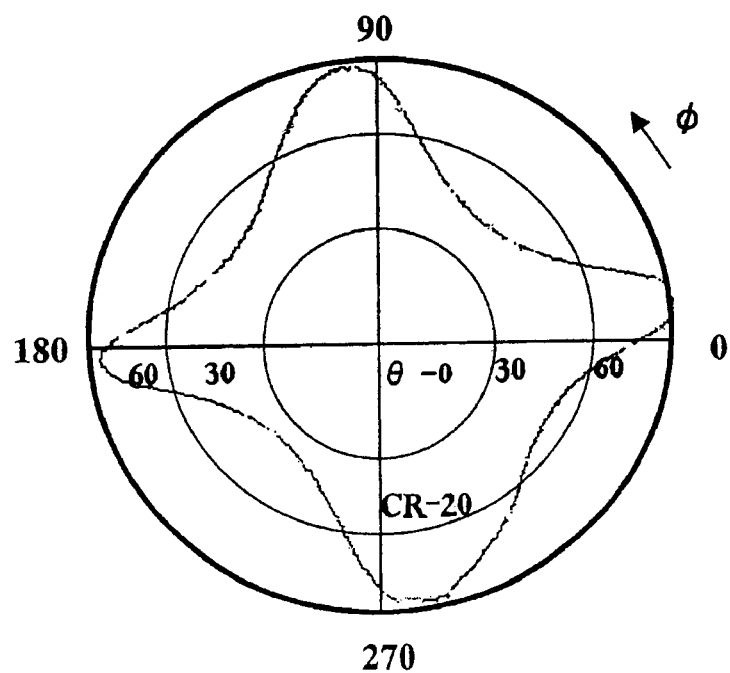
FIG. 10 is a diagram of the view field of the element of the liquid crystal element obtained by Example 4.

The polymer "c" obtained in Synthesis Example 2 was dissolved in γ-butyrolactone to prepare a solution having a solid content of 2.5 wt % which was then applied to a surface-polished non-alkali glass substrate by spin coating and dried by heating at 180° C. for 5 minutes to form a polymer film having a thickness of 80 nm. Thereafter, as shown in FIG. 9, a four-domain-divided mask 24 (3 mm×3 mm pixels were divided into four sections each having an area of 1.5 mm×1.5 mm) was placed above the substrate with aligned film 25 with a 20 μm space therebetween, and a polarization pattern having a periodical intensity distribution with a pitch of 7 μm was projected onto the substrate to expose a ¼ area of the pixels through the slit pattern while the substrate and the domain-divided mask 24 were moved parallel at a rate of 100 μm/sec. Subsequently, the above exposure was carried out four times by turning the substrate at 90° each time to obtain the substrate with aligned film 25 having four areas which differed from one another in aligning direction. Two substrates with aligned film 25 of this kind were prepared to manufacture a TN cell having a thickness of 4.5 μm. The ZLI-5081 liquid crystals (of Merk Co., Ltd.) were used. The alignability of the liquid crystals of the obtained element was excellent and the view field of the element was wide as shown in FIG. 10.

Example 5

The polymer "c" obtained in Synthesis Example 2 was dissolved in γ-butyrolactone to prepare a 2.5 wt % solution, and the obtained solution was applied to a surface polished non-alkali glass substrate by spin coating and dried by heating at 180° C. for 5 minutes to form a polymer film having a thickness of 80 nm. A polarization pattern 12 having a periodical intensity distribution with a pitch of 7 μm shown in FIG. 6 was projected onto the substrate for exposure by scanning from the base line in two right and left directions 13 at a rate of 100 μm/sec. Polarized light had a central wavelength of 350 nm and an irradiation energy of 24 mW. A non-parallel cell having a thickness of 18 μm was manufactured using the exposed substrate 5, and the K15 liquid crystals of Merk Co., Ltd. were filled to obtain a liquid crystal display element aligned and divided to two domains. The alignability of the liquid crystals was excellent and the pretilt angle of each domain was 1.0°. The crystal rotation method was used for the evaluation of the pretilt angle. In FIG. 6, reference numeral 14 denotes the polarization direction of the polarized light having a periodical intensity distribution.

As described above, according to the optical alignment method of the present invention, optical alignment can be effected by moving a glass substrate 1 mm to 10 mm in a fixed direction even when the exposure frequency Fp is 0.2 to 1 Hz without being restricted by the polarized UV exposure area of the same size as the glass substrate to be optically aligned, by the size of a slit exposure mask of the same size as the glass substrate and by the size of the glass substrate whether it is A4-sized or 1 m×1 m. That is, in this optical alignment method, the glass substrate does not need to be moved parallel a distance almost double as its size unlike the current optical alignment method, thereby making it possible to prevent a large increase in the size of an exposure device.

Further, according to the present invention, a liquid crystal display element which can be used in a homeotropic alignment mode and has been difficult to be provided with aligning capability by optical alignment can be formed.

Japanese patent application JP 2002-093952 filed Mar. 29, 2002, JP 2002-309261 filed Oct. 24, 2002, JP 2002-311733 filed Oct. 25, 2002, and U.S. application Ser. No. 10/400,634, filed Mar. 28, 2003, are incorporated herein by reference.

Numerous modifications and variations on the present invention are possible in light of the above teachings. It is therefore to be understood that within the scope of the appended claims, the invention may be practiced otherwise than as specifically described herein.

What is claimed is:

1. A pretilt angle producing method, comprising:
   preparing a photo-alignment substrate coated with a photo-alignment film material;
   preparing a light source for exposing the photo-alignment substrate to light;
   installing a photomask having slits as wide as 2 to 100 μm between the photo-alignment substrate and the light source;
   applying light toward the photomask from the light source;
   generating periodically intensity-modulated linearly polarized ultraviolet radiation toward the photo-alignment substrate through the photomask vertically; and
   moving the photo-alignment substrate and the photomask relative to each other at a scanning speed of 50 to 500 μm/sec to apply the periodically intensity-modulated linearly polarized ultraviolet radiation to the film from the photomask in a vertical direction to produce the light and shade with the each edge of the silts as a boundary so as to develop a pretilt angle at the each boundary portion on the photo-alignment film.

2. The method according to claim 1, wherein a plurality of the slits having the above width are formed at equal intervals and parallel to one another.

3. The method according to claim 1, wherein the radiation is ultraviolet radiation having a wavelength of 250 to 450 nm.

4. The method of claim 1, wherein liquid crystal aligning capability and a pretilt angle of 80° or more are provided to the surface of the photo-alignment film.

5. The method of claim 4, wherein the photo-alignment film is a polymer film comprising
   a polymer having (A) a structure crosslinkable by light and (B) at least one member selected from the group consisting of a fluorine-containing organic group, an alkyl group having 10 to 30 carbon atoms and alicylic organic group having 10 to 30 carbon atoms.

6. The method of claim 5, wherein recurring units of structure (A) account for 10-95 percent of the total of all recurring units, and recurring units having structure (B) account for 5-50 percent of the total of all recurring units.

7. The method of claim 1, wherein a surface of the photo-alignment film is exposed to radiation through a slit exposure mask, and wherein said photo-alignment film remains stationary and said slit exposure mask is moved relative to the surface of the photo-alignment film during exposure.

8. The method of claim 1, wherein said photo-alignment film is located on a transparent conductive film side of the substrate.

9. The method of claim 1, wherein the thickness of the photo-alignment film is 0.001-1 μm.

10. The method of claim 1, wherein said substrate is transparent glass or a transparent plastic film.

11. The method of claim 1, wherein said photo-alignment is a polymer film which is at a temperature ranging from its glass transition temperature to a temperature 100 degrees centigrade higher than its glass transition temperature during exposure.

12. The method of claim 1, wherein said radiation is polarized ultraviolet radiation having a wavelength of 320 to 450 nm.

13. The method of claim 1, wherein the surface of the photo-alignment film and the radiation are moved relative to each other substantially at a fixed rate without inclination of the surface of the photo-alignment film.

14. The method of claim 1, wherein the irradiation of the polarized light is conducted by batch plane exposure to develop a pretilt angle of 1 to 100 on the surface of the photo-alignment film.

15. The method of claim 1, wherein said photo-alignment film comprises a polymer having a chalcone structure.

16. The method of claim 1, wherein said pretilt angle is >0 to 10° on the surface of the photo-alignment film.

17. The method of claim 1, wherein said pretilt angle is >0 to 1.5° on the surface of the photo-alignment film.

* * * * *